(12) United States Patent
Asahi et al.

(10) Patent No.: US 11,413,582 B2
(45) Date of Patent: Aug. 16, 2022

(54) FILTRATION DEVICE

(71) Applicant: Toray Industries, Inc., Tokyo (JP)

(72) Inventors: Yuka Asahi, Kamakura (JP); Atsushi Minamino, Kamakura (JP); Hiroyuki Kurihara, Otsu (JP); Katsushige Yamada, Kamakura (JP)

(73) Assignee: Toray Industries, Inc., Tokyo (JP)

( * ) Notice: Subject to any disclaimer, the term of this patent is extended or adjusted under 35 U.S.C. 154(b) by 73 days.

(21) Appl. No.: 16/763,288

(22) PCT Filed: Nov. 29, 2018

(86) PCT No.: PCT/JP2018/043992
§ 371 (c)(1),
(2) Date: May 12, 2020

(87) PCT Pub. No.: WO2019/107498
PCT Pub. Date: Jun. 6, 2019

(65) Prior Publication Data
US 2021/0069647 A1    Mar. 11, 2021

(30) Foreign Application Priority Data

Nov. 30, 2017    (JP) .............................. JP2017-230775

(51) Int. Cl.
*B01D 61/58* (2006.01)
*B01D 61/02* (2006.01)
(Continued)

(52) U.S. Cl.
CPC ............. *B01D 61/58* (2013.01); *B01D 61/02* (2013.01); *B01D 61/14* (2013.01); *B01D 65/02* (2013.01);
(Continued)

(58) Field of Classification Search
CPC ........ B01D 61/58; B01D 61/02; B01D 61/14; B01D 65/02; B01D 2311/25;
(Continued)

(56) References Cited

U.S. PATENT DOCUMENTS 5,503,750 A * 4/1996 Russo, Jr. .............. B01D 61/58
                                                              210/259
6,303,037 B1 * 10/2001 Tamura ................ B01D 61/022
                                                              210/195.2
(Continued)

FOREIGN PATENT DOCUMENTS

JP          54-32179       3/1975
JP          53-038899      4/1978
(Continued)

OTHER PUBLICATIONS

The Extended European Search Report dated Aug. 16, 2021, of counterpart European Application No. 18882583.0.
(Continued)

*Primary Examiner* — Joseph W Drodge
(74) *Attorney, Agent, or Firm* — DLA Piper LLP (US)

(57) ABSTRACT

A filtration device includes a continuous first unit including a first membrane that separates a liquid into first permeated and non-permeated liquids, a first adjuster that adjusts a flow rate of the first permeated liquid to be substantially constant, and a first liquid scale that detects a liquid amount, a second unit including a second membrane that separates another liquid into second permeated and non-permeated liquids, a second adjuster that adjusts a flow rate of the second permeated liquid to be substantially constant, and a second liquid scale that detects another liquid amount, a first controller that controls the liquid amount in the first storage tank based on measurement values from continuous two first units or from the continuous first and second units, and a second controller that controls the another liquid amount based on a measurement value from the second unit.

19 Claims, 22 Drawing Sheets

(51) Int. Cl.
    *B01D 61/14*     (2006.01)
    *B01D 65/02*     (2006.01)
    *C02F 1/44*     (2006.01)
    *C13K 1/04*     (2006.01)

(52) U.S. Cl.
    CPC .............. *C02F 1/441* (2013.01); *C02F 1/442* (2013.01); *C02F 1/444* (2013.01); *C13K 1/04* (2013.01); *B01D 2311/25* (2013.01); *B01D 2313/18* (2013.01); *B01D 2317/022* (2013.01); *B01D 2317/025* (2013.01); *B01D 2321/12* (2013.01); *C02F 2303/16* (2013.01)

(58) Field of Classification Search
    CPC .......... B01D 2313/18; B01D 2317/022; B01D 2317/025; B01D 2321/12; B01D 2313/50; B01D 2315/10; B01D 61/20; B01D 61/22; B01D 61/10; B01D 61/12; B01D 65/00; B01D 61/022; B01D 61/142; B01D 2317/02; C02F 1/441; C02F 1/442; C02F 1/444; C02F 2303/16; C02F 1/008; C02F 2209/42; C02F 2209/40; C02F 2103/22; C02F 2301/08; C02F 1/44; C02F 2301/04; C13K 1/04; C13K 1/08; C13B 20/165; C13B 20/16
See application file for complete search history.

(56) References Cited

U.S. PATENT DOCUMENTS

| | | | |
|---|---|---|---|
| 10,093,747 B2 | 10/2018 | Kurihara et al. | |
| 2008/0230476 A1* | 9/2008 | Gilron | B01D 61/58 |
| | | | 210/652 |
| 2009/0270609 A1* | 10/2009 | Heikkila | C13B 20/165 |
| | | | 536/127 |
| 2010/0101997 A1* | 4/2010 | Tateishi | B01D 61/145 |
| | | | 210/636 |
| 2013/0313195 A1* | 11/2013 | Townsend | B01D 61/06 |
| | | | 210/257.2 |
| 2013/0330792 A1* | 12/2013 | Takeuchi | B01D 65/02 |
| | | | 435/139 |
| 2014/0308712 A1* | 10/2014 | Hanakawa | B01D 61/16 |
| | | | 435/99 |
| 2015/0360180 A1* | 12/2015 | Lutz | B01D 63/082 |
| | | | 530/412 |
| 2017/0157566 A1* | 6/2017 | Gefroh | B01D 61/145 |

FOREIGN PATENT DOCUMENTS

| | | |
|---|---|---|
| JP | 58-198299 | 11/1983 |
| JP | 60-25510 | 2/1985 |
| JP | H1-67173 | 3/1989 |
| JP | 08-965 | 1/1996 |
| JP | 2005-102519 | 4/2005 |
| JP | 2013-63076 | 4/2013 |
| JP | 2014-108382 A | 6/2014 |
| JP | 2014-184411 | 10/2014 |
| JP | 2015-136654 | 7/2015 |
| JP | 2015-199020 | 11/2015 |
| JP | 2016-032810 | 3/2016 |
| WO | 2010/067785 | 6/2010 |

OTHER PUBLICATIONS

Office Action dated Dec. 26, 2021, of counterpart Indonesian Application No. P00202004676, along with an English translation.

* cited by examiner

FILTRATION DEVICE

TECHNICAL FIELD

This disclosure relates to a filtration device.

BACKGROUND

One of the methods of separating components from a liquid to be treated is membrane filtration, and is used in various fields, for example, water treatment, wastewater treatment, and food because it has an advantage of energy savings and an advantage of preventing a change due to heat. A membrane that performs filtration is referred to as "separation membrane", which is roughly classified into a microfiltration membrane, an ultrafiltration membrane, a nanofiltration membrane, and a reverse osmosis membrane. The separation membrane can perform separation at the level from a molecular to a particle.

A microfiltration membrane can separate particles and microorganisms. It is known that the microfiltration membrane is used for bacteria elimination in beer and clarification of soy sauce. An ultrafiltration membrane can separate macromolecular components. It is known that the ultrafiltration membrane is used to concentrate and purify enzymes, concentrate protein in dairy industry, and clarify juice. A nanofiltration membrane can separate compounds having a molecular weight of hundreds to thousands. It is known that the nanofiltration membrane is used for bleaching soy sauce, fractionation of oligosaccharide, and concentrating and purifying amino acid seasonings. A reverse osmosis membrane can separate low molecular weight compounds and ions that have a molecular weight smaller than compounds separated by a nanofiltration membrane. It is known that the reverse osmosis membrane is used for seawater desalination and juice concentration.

By combining those separation membranes, it is possible to separate a plurality of components from a liquid to be treated. For example, Japanese Patent Application Laid-open No. H1-67173 discloses a method of producing vegetable and/or fruit juice having a feature that juice or an extract of vegetables or fruit is subjected to microfiltration and thereafter subjected to ultrafiltration and/or reverse osmosis filtration. International Patent Publication No. WO 2010/067785 discloses a method of obtaining a refined sugar solution from a saccharified solution of biomass that does not compete with food by combining a microfiltration membrane, an ultrafiltration membrane, a nanofiltration membrane, and a reverse osmosis membrane. Japanese Patent Application Laid-open No. 2014-184411 discloses a two-stage reverse-osmosis-membrane separation unit that manufactures pure water used in manufacturing of pharmaceuticals, cosmetics and the like.

However, the methods in Japanese Patent Application Laid-open No. H1-67173 and International Patent Publication No. WO 2010/067785 have a problem that a liquid to be treated containing organic matter is liable to be deteriorated because of growth of miscellaneous germs. Therefore, there is a need for a continuous membrane filtration device that has a minimized number of tanks that are downsized and therefore has a short residence time. However, in a constant flow-rate filtration device in which the number of tanks is minimized, the tanks are downsized, and two or more stages of separation membranes are connected to each other, there has been found a problem that a slight deviation occurs in constant flow-rate control because of a difference in clogging due to a difference in components to be separated between the stages or a difference in the type of the membrane, for example so that a liquid overflows from the tank or is depleted, which prevents stable separation.

It could therefore be helpful to provide a filtration device capable of performing stable separation from a liquid to be treated by constant flow-rate filtration by connecting separation membranes of two or more stages to each other.

SUMMARY

We thus provide:

A filtration device includes: a single or a plurality of continuous first membrane filtration units including a first storage tank configured to store therein a liquid to be treated, a first separation membrane part configured to separate the liquid to be treated into a first permeated liquid and a first non-permeated liquid, a first liquid delivery pipe configured to deliver the liquid to be treated from the first storage tank to the first separation membrane part, a first non-permeated liquid pipe configured to return the first non-permeated liquid to the first storage tank or the first liquid delivery pipe, a first permeated liquid pipe configured to cause the first permeated liquid to flow from the first separation membrane part, a first extraction pipe through which a portion of the first non-permeated liquid is extracted, a first adjustment unit configured to adjust a flow rate of the first permeated liquid to be substantially constant, and a first liquid scale configured to detect an amount of a stored liquid in the first storage tank; a second membrane filtration unit including a second storage tank configured to store therein the first permeated liquid from the first permeated liquid pipe of the single first membrane filtration unit or a last-stage one of the first membrane filtration units, a second separation membrane part configured to separate a stored liquid in the second storage tank into a second permeated liquid and a second non-permeated liquid, a second liquid delivery pipe configured to deliver the stored liquid in the second storage tank from the second storage tank to the second separation membrane part, a second non-permeated liquid pipe configured to return the second non-permeated liquid to the second storage tank or the second liquid delivery pipe, a second permeated liquid pipe configured to cause the second permeated liquid to flow from the second separation membrane part, a second extraction pipe through which a portion of the second non-permeated liquid is extracted, a second adjustment unit configured to adjust a flow rate of the second permeated liquid to be substantially constant, and a second liquid scale configured to detect an amount of the stored liquid in the second storage tank; a first controller unit configured to control an amount of a stored liquid stored in the first storage tank based on measurement values from the first liquid scales of continuous two of the first membrane filtration units or measurement values from the first and second liquid scales of the continuous first and second membrane filtration units; and a second controller unit configured to control an amount of a stored liquid stored in the second storage tank based on a measurement value from the second liquid scale.

Based on a preceding-stage measurement value from a first liquid scale of a preceding first membrane filtration unit of the continuous two first membrane filtration units or the continuous first and second membrane filtration units and a subsequent-stage measurement value from a first or second liquid scale in a subsequent first or second membrane filtration unit, the first controller unit may stop a flow of the first permeated liquid of the preceding first membrane filtration unit.

When the preceding-stage measurement value is smaller than a first threshold or when the subsequent-stage measurement value is larger than a second threshold, the first controller unit may adjust the first adjustment unit of the preceding first membrane filtration unit to stop a flow of the first permeated liquid from the first permeated liquid pipe to the subsequent first or second membrane filtration unit.

The first membrane filtration unit can further include a first open/close valve provided in the first permeated liquid pipe, and when the preceding-stage measurement value is smaller than a first threshold or when the subsequent-stage measurement value is larger than a second threshold, the first controller unit closes the first open/close valve of the preceding first membrane filtration unit to stop a flow of the first permeated liquid from the first permeated liquid pipe to the subsequent first or second membrane filtration unit.

The first membrane filtration unit can further include a first permeated liquid returning pipe configured to return the first permeated liquid from the first permeated liquid pipe to the first storage tank, and a first non-permeated liquid returning pipe configured to return the first non-permeated liquid from the first extraction pipe to the first storage tank, and when the preceding-stage measurement value is smaller than a first threshold or when the subsequent-stage measurement value is larger than a second threshold, the first controller unit returns the first permeated liquid in the first permeated liquid pipe to the first storage tank through the first permeated liquid returning pipe and returns the first non-permeated liquid in the first extraction pipe to the first storage tank through the first non-permeated liquid returning pipe in the preceding first membrane filtration unit.

Based on a subsequent-stage measurement value from a second liquid scale in a subsequent second membrane filtration unit of the continuous first and second membrane filtration units, the second controller unit may stop a flow of the second permeated liquid of the subsequent second membrane filtration unit.

When the subsequent-stage measurement value of the subsequent second membrane filtration unit is smaller than a third threshold, the second controller unit may adjust the second adjustment unit of the subsequent second membrane filtration unit to stop a flow of the second permeated liquid from the second permeated liquid pipe.

The filtration device may further include a second open/close valve provided in the second permeated liquid pipe, wherein when the subsequent-stage measurement value of the subsequent second membrane filtration unit is smaller than a third threshold, the second controller unit closes the second open/close valve of the subsequent second membrane filtration unit to stop a flow of the second permeated liquid from the second permeated liquid pipe.

The second membrane filtration unit may further include a second permeated liquid returning pipe configured to return the second permeated liquid from the second permeated liquid pipe to the second storage tank and a second non-permeated liquid returning pipe configured to return the second non-permeated liquid from the second extraction pipe to the second storage tank, and when the subsequent-stage measurement value of the subsequent second membrane filtration unit is smaller than a third threshold, the second controller unit returns the second permeated liquid in the second permeated liquid pipe to the second storage tank through the second permeated liquid returning pipe, and returns the second non-permeated liquid in the second extraction pipe to the second storage tank through the second non-permeated liquid returning pipe.

A first permeated liquid from a preceding one of the continuous first membrane filtration units may be stored in a first storage tank of a subsequent one of the continuous first membrane filtration units, and the first controller unit of each of the first membrane filtration units controls an amount of a stored liquid stored in the first storage tank of the corresponding first membrane filtration unit.

A pore diameter of a first separation membrane part of one of the continuous first membrane filtration units, which is on a downstream side in a flow of the liquid to be treated, may be smaller than a pore diameter of a first separation membrane part of the first membrane filtration unit on an upstream side, and a pore diameter of a second separation membrane part of the second membrane filtration unit of the continuous first and second membrane filtration units, which is on a downstream side in a flow of the liquid to be treated, is smaller than a pore diameter of a first separation membrane part of the first membrane filtration unit on an upstream side.

Each of the first and second separation membrane parts may be any of a microfiltration membrane, an ultrafiltration membrane, a nanofiltration membrane, and a reverse osmosis membrane.

The filtration device may further include a cleaning part connected to the first or second permeated liquid pipe and configured to cause a cleaning solution to flow from the first or second permeated liquid pipe to the first or second separation membrane part.

The first or second liquid scale may be a liquid level meter that detects a liquid level of a stored liquid in the first or second storage tank, or a mass measurement device that detects a mass of the stored liquid in the first or second storage tank.

The liquid to be treated may contain organic matter.

The filtration device may further include: a third membrane filtration unit including a third storage tank configured to store therein the first non-permeated liquid from the first extraction pipe of the single first membrane filtration unit or any of the continuous first membrane filtration units, a third separation membrane part configured to separate a stored liquid in the third storage tank into a third permeated liquid and a third non-permeated liquid, a third liquid delivery pipe configured to deliver a stored liquid in the third storage tank from the third storage tank to the third separation membrane part, a third non-permeated liquid pipe configured to return the third non-permeated liquid to the third storage tank or the third liquid delivery pipe, a third permeated liquid pipe configured to deliver the third permeated liquid from the third separation membrane part to the first or second storage tank of the first or second membrane filtration unit in a subsequent stage, a third extraction pipe through which a portion of the third non-permeated liquid is extracted, a third adjustment unit configured to adjust a flow rate of the third permeated liquid to be substantially constant, and a third liquid scale configured to detect an amount of the stored liquid in the third storage tank; and a third controller unit configured to control an amount of a stored liquid stored in the third storage tank based on measurement values from a third liquid scale of the third membrane filtration unit and the first or second liquid scale of the first or second membrane filtration unit in the subsequent stage.

The filtration device may further include: a third membrane filtration unit including a third storage tank configured to store therein the second non-permeated liquid from the second extraction pipe, a third separation membrane part configured to separate a stored liquid in the third storage tank into a third permeated liquid and a third non-permeated liquid, a third liquid delivery pipe configured to deliver a stored liquid in the third storage tank from the third storage tank to the third separation membrane part, a third non-permeated liquid pipe configured to return the third non-permeated liquid to the third storage tank or the third liquid delivery pipe, a third permeated liquid pipe configured to deliver the third permeated liquid from the third separation membrane part, a third extraction pipe through which a portion of the third non-permeated liquid is extracted, a third adjustment unit configured to adjust a flow rate of the third permeated liquid to be substantially constant, and a third liquid scale configured to detect an amount of a stored liquid in the third storage tank; and a third controller unit configured to control an amount of a stored liquid stored in the third storage tank based on a measurement value from the third liquid scale of the third membrane filtration unit.

The first membrane filtration unit may further include a first water-adding part configured to add water to the liquid to be treated.

The second membrane filtration unit may further include a second water-adding part configured to add water to the first permeated liquid.

The third membrane filtration unit may further include a third water-adding part configured to add water to the first or second non-permeated liquid.

In the filtration device according to any one of the items above, a process of filtrating a liquid to be treated can contain sugar and includes a process of recovering a sugar solution as a non-permeated liquid or a permeated liquid in the filtrating.

Figure 1:
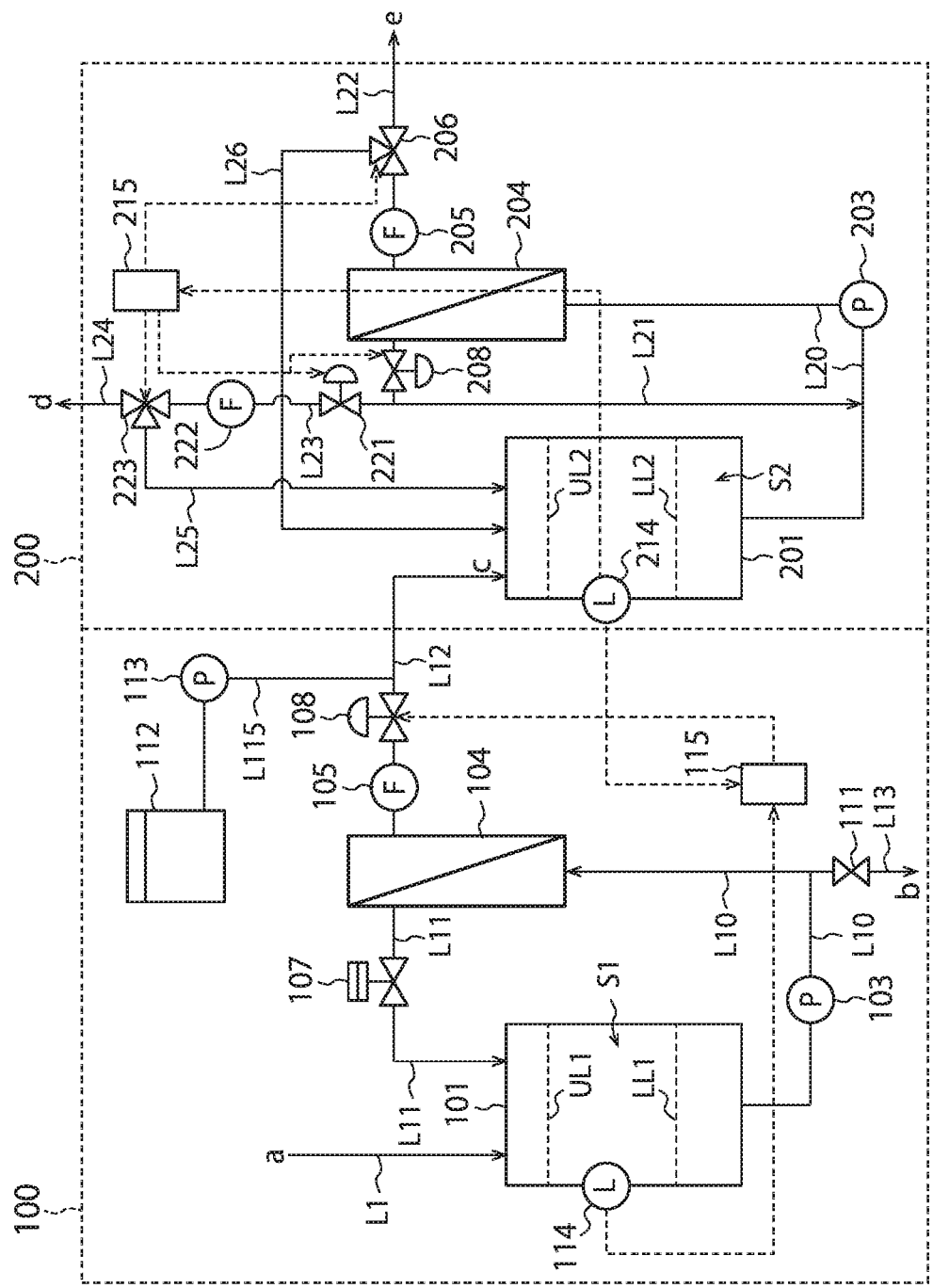
FIG. 1 is a diagram illustrating a configuration of a filtration device according to a first example.

REFERENCE SIGNS LIST 100, 200 membrane filtration unit
101, 201 storage tank
103, 203 liquid delivery pump
104, 204 separation membrane part
105, 205 flowmeter
107 non-permeated liquid valve
108, 208 adjustment valve
111, 221 extraction valve
112 cleaning solution tank
113 washing pump
114, 214 liquid scale
115, 215 controller unit
L1 treated liquid pipe
L10, L20 liquid delivery pipe
L11, L21 non-permeated liquid pipe
L12, L22 permeated liquid pipe
L13, L24 extraction pipe
L115 washing pipe
L25 non-permeated liquid returning pipe
L26 permeated liquid returning pipe

DETAILED DESCRIPTION

Examples will be described below in detail with reference to the accompanying drawings. These examples do not limit our filtration devices. The drawings are schematic or conceptual and the ratio of respective parts and the like are not necessarily the same as those of real products. In this specification and the drawings, constituent elements identical to those described with respect to the drawings that have been already described are denoted by like reference signs, and detailed explanations thereof are appropriately omitted.

First Example

FIG. 1 is a diagram illustrating a configuration of a filtration device according to a first example. The filtration device according to this example is a filtration device that filters a liquid to be treated at a constant flow rate. The filtration device according to this example includes a first membrane filtration unit 100 and a second membrane filtration unit 200. The first membrane filtration unit 100 and the second membrane filtration unit 200 are continuous in series, and the second membrane filtration unit 200 is provided immediately after the first membrane filtration unit 100. The first and second membrane filtration units 100 and 200 are configured in such a manner that a first permeated liquid from the first membrane filtration unit 100 is received in a second storage tank 201 of the second membrane filtration unit 200. The phrase that plural membrane filtration units are in series or continuous means that a permeated liquid filtrated by a certain membrane filtration unit is received and further filtrated by a subsequent membrane filtration unit.

Configuration of First Membrane Filtration Unit 100

The first membrane filtration unit 100 includes a first storage tank 101, a first liquid delivery pump 103, a first separation membrane part 104, a first flowmeter 105, a non-permeated liquid valve 107, a first adjustment valve 108, a first extraction valve 111, a cleaning solution tank 112, a washing pump 113, a first liquid scale 114, a first controller unit 115, a treated liquid pipe L1, a first liquid delivery pipe L10, a first non-permeated liquid pipe L11, a first permeated liquid pipe L12, a first extraction pipe L13, and a washing pipe L115. The first extraction valve 111 also functions as a discharge valve for a cleaning solution, and the first extraction pipe L13 also functions as a discharge pipe for the cleaning solution.

The first storage tank 101 is a tank for storing therein a stored liquid S1. The stored liquid S1 includes a liquid to be treated that is supplied from outside of the filtration device to the first storage tank 101 through the treated liquid pipe L1, and a first non-permeated liquid from the first non-permeated liquid pipe L11. Preferable examples of the stored liquid S1 are liquids that contain organic matter, for example, protein, fatty acids, sugar (monosaccharide, oligosaccharide, or polysaccharide), organic acids, cellulose, lignin and its degradation product, aromatic compounds such as catechin, polyphenol, and flavonoid, and amino acids. The preferable examples include an extract or a juice of fruit or vegetables, tea, milk, soy milk, a liquid seasoning, an alcohol such as beer and wine, soy sauce, a fermented liquid, a saccharified solution of starch, a saccharified solution of biomass, starch syrup, an oligosaccharide aqueous solution, a sugarcane extract, honey, and a wastewater of seafood processing. The organic matter may be derived from an edible resource or may be derived from a non-edible resource.

The first liquid delivery pump 103 is provided between the first storage tank 101 and the first separation membrane part 104 and causes the stored liquid S1 to flow from the first storage tank 101 to the first separation membrane part 104 through the first liquid delivery pipe L10. The first liquid delivery pump 103 may be a high-pressure pump that applies pressure to the stored liquid S1 in the first liquid delivery pipe L10, for example. The first liquid delivery pipe L10 is connected between the first storage tank 101 and the first separation membrane part 104 and delivers the stored liquid S1 from the first storage tank 101 to the first separation membrane part 104.

The first separation membrane part 104 separates the stored liquid S1 from the first liquid delivery pipe L10 into the first permeated liquid and the first non-permeated liquid. For example, the first separation membrane part 104 may be any of a microfiltration membrane (MF membrane), an ultrafiltration membrane (UF membrane), a nanofiltration membrane (NF membrane), and a reverse osmosis membrane (RO membrane). The NF membrane may be a membrane having a pore diameter between a pore diameter of the UF membrane and a pore diameter of the NF membrane, which is referred to as "loose NF membrane".

When using an MF membrane as the first separation membrane part 104, the first separation membrane part 104 separates, for example, turbidity (or suspended matter) and microorganisms from the stored liquid S1, as the first non-permeated liquid. The turbidity and the microorganisms in the stored liquid S1 are delivered to the first non-permeated liquid pipe L11 as the non-permeated liquid, and the other components are delivered to the first permeated liquid pipe L12 as the first permeated liquid. When using a UF membrane as the first separation membrane part 104, the first separation membrane part 104 separates, for example, protein from the stored liquid S1, as the first non-permeated liquid. Protein in the stored liquid S1 is delivered to the first non-permeated liquid pipe L11 mainly as the non-permeated liquid, and the other components are delivered to the first permeated liquid pipe L12 as the first permeated liquid. When using an NF membrane as the first separation membrane part 104, the first separation membrane part 104 separates, for example, monosaccharide, oligosaccharide, and/or amino acids from the stored liquid S1, as the first non-permeated liquid. Monosaccharide, oligosaccharide, and amino acids in the stored liquid S1 are delivered to the first non-permeated liquid pipe L11 mainly as the non-permeated liquid, and the other components are delivered to the first permeated liquid pipe L12 as the first permeated liquid. When using an RO membrane as the first separation membrane part 104, the first separation membrane part 104 separates, for example, monosaccharide and aromatic compounds from the stored liquid S1 as the first non-permeated liquid. Monosaccharide and aromatic compounds in the stored liquid S1 are delivered to the first non-permeated liquid pipe L11 as a non-permeated liquid, and the other components are delivered to the first permeated liquid pipe L12 as the first permeated liquid. In this manner, the material separated by the first separation membrane part 104 is different depending on the type (the pore diameter) of a filtration membrane.

The first separation membrane part 104 may be formed by a single filtration membrane or may be a filtration membrane module that is a combination of a plurality of filtration membranes. In addition, when using the filtration membrane module as the first separation membrane part 104, the filtration membranes may be formed by filtration membranes of a single type or may be a combination of filtration membranes of a plurality of types. A specific example of the filtration membrane module will be described later referring to FIGS. 12 and 13.

The first non-permeated liquid pipe L11 is arranged to return the non-permeated liquid from the first separation membrane part 104 to the first storage tank 101. The non-permeated liquid is returned to the first storage tank 101 through the first non-permeated liquid pipe L11. The non-permeated liquid returned to the first storage tank 101 is delivered again to the first separation membrane part 104. The first non-permeated liquid pipe L11 is provided with the non-permeated liquid valve 107 so that it is possible to stop a flow of the non-permeated liquid and a flow of a cleaning solution. However, even if the non-permeated liquid valve 107 is omitted, operational effects of this example are not lost.

The first non-permeated liquid is returned to the first storage tank 101 so that it is caused to circulate between the first storage tank 101 and the first separation membrane part 104, and its concentration of organic matter is concentrated in the first storage tank 101, the first liquid delivery pipe L10, and the first non-permeated liquid pipe L11. The first extraction pipe L13 is connected to the first liquid delivery pipe L10 via the first extraction valve 111 to enable a portion of the non-permeated liquid in the first liquid delivery pipe L10 to be extracted. The portion of the non-permeated liquid is extracted to outside of the filtration device through the first extraction pipe L13. The non-permeated liquid extracted to outside may be used as a product or may be used in other processes.

When a flow rate (a) of the liquid to be treated from the treated liquid pipe L1, a flow rate of the first non-permeated liquid extracted from the first extraction pipe L13 (an extraction amount b of the first non-permeated liquid), and a flow rate of the first permeated liquid delivered from the first permeated liquid pipe L12 to the second storage tank 201 (an amount c of the first permeated liquid) are constant, an organic concentration in the stored liquid S1 in the first storage tank 101 is concentrated and thereafter becomes substantially constant. Therefore, although the non-permeated liquid extracted from the first extraction pipe L13 is concentrated more than the liquid to be treated from the treated liquid pipe L1, it has a substantially constant organic concentration. That is, the first non-permeated liquid is a concentrated liquid having a substantially constant organic concentration and is extracted from the first membrane filtration unit 100 at a substantially constant flow rate.

The first permeated liquid pipe L12 is arranged to deliver the permeated liquid from the first separation membrane part 104 to the second storage tank 201 of the second membrane filtration unit 200. The first permeated liquid pipe L12 is provided with the first flowmeter 105 and the first adjustment valve 108 as a first adjustment unit. The first flowmeter 105 measures a flow rate of the permeated liquid flowing through the first permeated liquid pipe L12. A measurement value of the flow rate of the permeated liquid is used for executing feedback control for the first adjustment valve 108 via the first controller unit 115. By the feedback control, the first adjustment valve 108 is adjusted to make the flow rate of the permeated liquid flowing through the first permeated liquid pipe L12 substantially constant.

The washing pipe L115 is connected to the first permeated liquid pipe L12 to enable a cleaning solution from the cleaning solution tank 112 to be supplied to the first permeated liquid pipe L12. The cleaning solution tank 112 and the washing pump 113 are provided to enable the cleaning solution to flow from a permeation side of the first separation membrane part 104 to a non-permeation side via the washing pipe L115 and the first permeated liquid pipe L12. At this time, when the non-permeated liquid valve 107 is closed, the cleaning solution does not enter the first storage tank 101.

In addition, during cleaning, the first extraction pipe L13 provided in the first liquid delivery pipe L10 also functions as a discharge pipe, and the first extraction valve 111 also functions as a discharge valve for the cleaning solution. The cleaning solution that has passed through the first separation membrane part 104 is discharged to outside of the filtration device through the first extraction pipe L13 and the first extraction valve 111. In this manner, the cleaning solution tank 112, the washing pump 113, the washing pipe L115, the first extraction valve 111, and the first extraction pipe L13 function as a cleaning part that cleans the first separation membrane part 104 with a cleaning solution.

The first liquid scale 114 is provided in the first storage tank 101 and detects the amount of the stored liquid S1 stored in the first storage tank 101. For example, the first liquid scale 114 may be a liquid level meter that detects the liquid level height of the stored liquid S1 in the first storage tank 101. The amount of the stored liquid S1 in the storage tank 101 can be expressed as a function of the liquid level height of the stored liquid S1. Accordingly, the first controller unit 115 can use the liquid level height of the stored liquid S1 as an indicator of the amount of the stored liquid S1 in the first storage tank 101. Further, the first liquid scale 114 may be, for example, a mass measurement device that detects the mass of the stored liquid S1 in the first storage tank 101. The amount of the stored liquid S1 in the first storage tank 101 can be expressed as a function of the mass of the stored liquid S1. Accordingly, the first controller unit 115 can use the mass of the stored liquid S1 as an indicator of the amount of the stored liquid S1 in the first storage tank 101.

The first controller unit 115 controls the amount of the stored liquid S1 stored in the first storage tank 101 based on measurement values from the first liquid scale 114 and a second liquid scale 214 of the continuous first and second membrane filtration units 100 and 200. The first controller unit 115 and a second controller unit 215 may be arithmetic units different from each other or may be the same arithmetic unit.

Configuration of Second Membrane Filtration Unit 200

The second membrane filtration unit 200 includes the second storage tank 201, a second liquid delivery pump 203, a second separation membrane part 204, a second flowmeter 205, a second adjustment valve 208, a second extraction valve 221, a flowmeter 222, return valves 206 and 223, the second liquid scale 214, the second controller unit 215, a second liquid delivery pipe L20, a second non-permeated liquid pipe L21, a second permeated liquid pipe L22, an extraction/returning pipe L23, a second extraction pipe L24, a non-permeated liquid returning pipe L25, and a permeated liquid returning pipe L26.

The second storage tank 201 is a tank for storing therein a stored liquid S2. The stored liquid S2 includes the first permeated liquid from the first permeated liquid pipe L12, a second non-permeated liquid from the non-permeated liquid returning pipe L25, and a second permeated liquid from the permeated liquid returning pipe L26. The first permeated liquid is a liquid obtained by removing the first non-permeated liquid (for example, turbidity) from the stored liquid S1.

The second liquid delivery pump 203 is provided between the second storage tank 201 and the second separation membrane part 204 and causes the stored liquid S2 to flow from the second storage tank 201 to the second separation membrane part 204 through the second liquid delivery pipe L20. The second liquid delivery pump 203 may be a high-pressure pump that applies pressure to the stored liquid S2 in the second liquid delivery pipe L20, for example. The second liquid delivery pipe L20 is connected between the second storage tank 201 and the second separation membrane part 204 and delivers the stored liquid S2 from the second storage tank 201 to the second separation membrane part 204.

The second separation membrane part 204 separates the stored liquid S2 from the second liquid delivery pipe L20 into a second permeated liquid and a second non-permeated liquid. The second separation membrane part 204 may be any of an MF membrane, a UF membrane, an NF membrane, and an RO membrane, similarly to the first separation membrane part 104. However, it is preferable that the pore diameter of the second separation membrane part 204 on a downstream side is smaller than the pore diameter of the first separation membrane part 104 on an upstream side. With this configuration, the second separation membrane part 204 can separate components that cannot be separated by the first separation membrane part 104 from the stored liquid S2.

When using an MF membrane as the first separation membrane part 104 and a UF membrane as the second separation membrane part 204, the first separation membrane part 104 can separate, for example, turbidity from the stored liquid S1 as the first non-permeated liquid, and the second separation membrane part 204 can separate, for example, protein from the stored liquid S2 as the second non-permeated liquid. Protein in the stored liquid S2 is delivered to the second non-permeated liquid pipe L21 or the extraction/returning pipe L23 mainly as the non-permeated liquid, and the other components are delivered to the second permeated liquid pipe L22 as the second permeated liquid. When using an NF membrane or an RO membrane as the second separation membrane part 204, the second separation membrane part 204 can separate, for example, oligosaccharide and amino acids or monosaccharide and aromatic compounds from the stored liquid S2 as the second non-permeated liquid. Oligosaccharide and amino acids or monosaccharide and aromatic compounds are delivered to the second non-permeated liquid pipe L21 or the extraction/returning pipe L23 mainly as the non-permeated liquid, and the other components are delivered to the second permeated liquid pipe L22 as the second permeated liquid.

Similarly to the first separation membrane part 104, the second separation membrane part 204 may be formed by a single filtration membrane or may be a filtration membrane module that is a combination of a plurality of filtration membranes. In addition, when using the filtration membrane module as the second separation membrane part 204, the filtration membranes may be formed by filtration membranes of a single type or may be a combination of filtration membranes of a plurality of types.

The second non-permeated liquid pipe L21 is arranged to return the second non-permeated liquid from the second separation membrane part 204 to the second liquid delivery pipe L20 between the second storage tank 201 and the second liquid delivery pump 203. Further, the extraction/returning pipe L23 is connected to the second non-permeated liquid pipe L21, and a portion of the second non-permeated liquid is delivered to the second extraction pipe L24 or the non-permeated liquid returning pipe L25. The second extraction valve 221 is provided in the extraction/returning pipe L23. The return valve 223 is connected to the extraction/returning pipe L23, the second extraction pipe L24, and the non-permeated liquid returning pipe L25. The return valve 223 is, for example, a three-way valve, and can cause the second non-permeated liquid from the extraction/returning pipe L23 to flow to the second extraction pipe L24 or the non-permeated liquid returning pipe L25. The flowmeter 222 measures a flow rate of the second non-permeated liquid flowing through the extraction/returning pipe L23. A portion of the second non-permeated liquid is extracted to outside of the filtration device via the extraction/returning pipe L23 and the second extraction pipe L24.

The second non-permeated liquid extracted to outside may be used as a product or may be used in other processes. Meanwhile, the remaining portion of the second non-permeated liquid is returned to the second liquid delivery pipe L20 via the second non-permeated liquid pipe L21 or to the second storage tank 201 via the non-permeated liquid returning pipe L25. The second non-permeated liquid returned to the second liquid delivery pipe L20 or the second storage tank 201 is delivered again to the second separation membrane part 204.

The second non-permeated liquid is returned to the second liquid delivery pipe L20 so that it is caused to circulate between the second liquid delivery pipe L20 (the second non-permeated liquid pipe L21) and the second separation membrane part 204, and its concentration of organic matter is concentrated in the second liquid delivery pipe L20 and the second non-permeated liquid pipe L21. Since the second liquid delivery pipe L20 is smaller in volume than the second storage tank 201, the second non-permeated liquid is concentrated more quickly than when being returned to the second storage tank 201. However, when the flow rate (c) of the first permeated liquid from the first permeated liquid pipe L12, a flow rate of the second non-permeated liquid extracted from the second extraction pipe L24 (an extraction amount d of the second non-permeated liquid), and a flow rate of the second permeated liquid flowing from the second permeated liquid pipe L22 to outside of the second membrane filtration unit 200 (an amount e of the second permeated liquid) are constant, its concentration of organic matter in the stored liquid S2 in the second liquid delivery pipe L20 and the second non-permeated liquid pipe L21 is concentrated and thereafter becomes substantially constant. Therefore, although the second non-permeated liquid extracted from the second extraction pipe L24 is concentrated more than the first permeated liquid from the first permeated liquid pipe L12, it has a substantially constant concentration of organic matter. That is, the second non-permeated liquid is a concentrated liquid having a substantially constant organic concentration and is extracted from the second membrane filtration unit 200 at a substantially constant flow rate.

The second permeated liquid pipe L22 is arranged to deliver the second permeated liquid from the second separation membrane part 204 to outside of the second membrane filtration unit 200. The second permeated liquid extracted to outside may be used as a product or may be used in other processes. The second permeated liquid pipe L22 is provided with the second flowmeter 205. The second adjustment valve 208 is provided between the second non-permeated liquid pipe L21 and the second separation membrane part 204. The second flowmeter 205 and the second adjustment valve 208 control the flow rate of the second permeated liquid flowing through the second permeated liquid pipe L22, as a second adjustment unit. The second flowmeter 205 measures the flow rate of the second permeated liquid flowing through the second permeated liquid pipe L22. A measurement value of the flow rate of the second permeated liquid is used for executing feedback control for the second adjustment valve 208 via the second controller unit 215. By the feedback control, the second adjustment valve 208 is adjusted to make the flow rate of the second permeated liquid flowing through the second permeated liquid pipe L22 substantially constant by applying pressure to a non-permeation side.

The return valve 206 and the permeated liquid returning pipe L26 are connected to the second permeated liquid pipe L22 so that it is possible to return the second permeated liquid that flows through the second permeated liquid pipe L22 to the second storage tank 201. The return valve 206 is, for example, a three-way valve, is connected between the second permeated liquid pipe L22 and the permeated liquid returning pipe L26, and can cause the second permeated liquid to flow to the second permeated liquid pipe L22 or to the permeated liquid returning pipe L26. It suffices that the return valve 206 can change a flow between the second permeated liquid pipe L22 and the permeated liquid returning pipe L26, and the return valve 206 may include two two-way valves in place of a three-way valve.

The second liquid scale 214 is provided in the second storage tank 201 and detects the amount of the stored liquid S2 stored in the second storage tank 201. For example, the second liquid scale 214 may be a liquid level meter that detects the liquid level height of the stored liquid S2 in the second storage tank 201. The amount of the stored liquid S2 in the second storage tank 201 can be expressed as a function of the liquid level height of the stored liquid S2. Accordingly, the second controller unit 215 can use the liquid level height of the stored liquid S2 as an indicator of the amount of the stored liquid S2 in the second storage tank 201. Further, the second liquid scale 214 may be a mass measurement device that detects the mass of the stored liquid S2 in the second storage tank 201, for example. The amount of the stored liquid S2 in the second storage tank 201 can be expressed as a function of the mass of the stored liquid S2. Accordingly, the second controller unit 215 can use the mass of the stored liquid S2 as an indicator of the amount of the stored liquid S2 in the second storage tank 201.

The second controller unit 215 controls the amount of the stored liquid S2 stored in the second storage tank 201 based on a measurement value from the second liquid scale 214.

In this manner, the first and second membrane filtration units 100 and 200 are continuous in series, and the first permeated liquid filtrated by constant flow-rate filtration in the first membrane filtration unit 100 is further subjected to constant flow-rate filtration in the second membrane filtration unit 200 immediately after the first membrane filtration unit 100. Thus, it is possible to extract (recover), for example, turbidity, protein, or a sugar solution, from the first extraction pipe L13 of the first membrane filtration unit 100, and to extract (recover), for example, protein or a sugar solution, from the second extraction pipe L24 of the second membrane filtration unit 20. By changing the type (the pore diameter) of respective filtration membranes of the first and second separation membrane parts 104 and 204, it is possible to change non-permeated liquids and permeated liquids that are extracted from the first and second membrane filtration units 100 and 200. Therefore, protein or a sugar solution may be recovered as the second permeated liquid via the second permeated liquid pipe L22, for example.

Operation Example of Filtration Device

A liquid to be treated is supplied from the treated liquid pipe L1 to the first storage tank 101 and is stored in the first storage tank 101 as the stored liquid S1. The stored liquid S1 is delivered by the first liquid delivery pump 103 to the first separation membrane part 104, where it is separated into the first permeated liquid and the first non-permeated liquid. The first permeated liquid is delivered to the second storage tank 201 through the first permeated liquid pipe L12 at a substantially constant flow rate. The first non-permeated liquid is returned to the first storage tank 101 as the stored liquid S1. That is, the stored liquid S1 is caused to circulate between the first storage tank 101 and the first separation membrane part 104, and its organic concentration is concentrated in the first storage tank 101, the first liquid delivery pipe L10, and the first non-permeated liquid pipe L11. A portion of the stored liquid S1 in the first liquid delivery pipe L10 is extracted from the first extraction pipe L13 and the first extraction valve 111. The remaining portion of the stored liquid S1 is delivered to the first separation membrane part 104.

The first permeated liquid from the first membrane filtration unit 100 is stored in the second storage tank 201 as the stored liquid S2. The stored liquid S2 stored in the second storage tank 201 is delivered by the second liquid delivery pump 203 to the second separation membrane part 204, where it is separated into the second permeated liquid and the second non-permeated liquid. The second permeated liquid is delivered to outside through the second permeated liquid pipe L22 at a substantially constant flow rate. A portion of the second non-permeated liquid is extracted via the extraction/returning pipe L23 and the second extraction pipe L24 at a substantially constant flow rate, and the remaining portion circulates in the second liquid delivery pipe L20 and the second non-permeated liquid pipe L21.

The first adjustment valve 108 is controlled to make a measurement value of the first flowmeter 105 substantially constant, and a substantially constant amount of the first non-permeated liquid is extracted from the first extraction pipe L13. The second adjustment valve 208 is controlled to make a value of the second flowmeter 205 substantially constant, and the third adjustment valve 221 is controlled to make a value of the third flowmeter 222 substantially constant. Therefore, by setting flow rates to satisfy "the supply amount a of the liquid to be treated=the amount c of the first permeated liquid+the extraction amount b of the first non-permeated liquid", and "the amount c of the first permeated liquid=the amount e of the second permeated liquid+ the extraction amount d of the second non-permeated liquid", that is, "the amount to be supplied=the amount to be extracted (a=b+c and c=d+e)", the filtration device according to this example can treat the liquid to be treated at a substantially constant amount, values of the first liquid scale and the second liquid scale become substantially constant, and constant flow-rate filtration can be stably continued.

However, in an actual filtration device, a slight flow-rate deviation occurs because of a difference in clogging tendency due to a difference in separated components between the first membrane filtration unit and the second membrane filtration unit, a difference in the membrane type and the like. In this example, the amount of the stored liquid S1 or S2 in the first or second storage tank 101 or 201 is not stable, and the liquid is depleted or overflows so that constant flow-rate filtration cannot be continued stably. Further, when the amount of liquid in the storage tank 101 or 201 increases or decreases, the concentration of organic matter or the like in the storage tank 101 or 201 also fluctuates and is not stable.

Therefore, in the filtration device according to this example, the first controller unit 115 controls a flow of the first permeated liquid in the first membrane filtration unit 100 based on a preceding-stage measurement value from the first liquid scale 114 in the first membrane filtration unit 100 in a preceding stage and a subsequent-stage measurement value from the second liquid scale 214 in the second membrane filtration unit 200 in its subsequent stage.

For example, it is assumed that the first and second liquid scales 114 and 214 are liquid level meters. When the liquid level of the stored liquid S1 in the first storage tank 101 becomes lower than a lower limit level LL1, that is, when the preceding-stage measurement value becomes smaller than a lower limit threshold (a first threshold), the first controller unit 115 closes the first adjustment valve 108 to stop a flow of the first permeated liquid from the first permeated liquid pipe L12 to the second membrane filtration unit 200. At this time, the non-permeated liquid valve 107 is open, and the first extraction valve 111 is closed. Thus, the stored liquid S1 from the first liquid delivery pipe L10 is entirely returned to the first storage tank 101 through the first non-permeated liquid pipe L11, as a non-permeated liquid. That is, the first membrane filtration unit 100 stops filtration and causes the stored liquid S1 to circulate between the first storage tank 101 and the first separation membrane part 104. By stopping filtration, clogging of the first separation membrane part 104 can be suppressed, and the first separation membrane part 104 can be used stably for a longer time. In particular, this example can be preferably applied to a liquid to be treated containing much turbidity, for example, a juice extract of sugarcane or the like and a liquid to be treated of which material is a non-edible resource such as sugarcane bagasse and which has been subjected to chemical treatment, enzymolysis or the like, and to a membrane that requires backwashing. Further, the liquid level in the first storage tank 101 can be raised by causing the stored liquid S1 to circulate. That is, the preceding-stage measurement value can be made larger than the lower limit threshold.

Also, when the liquid level of the stored liquid S2 in the second storage tank 201 becomes higher than an upper limit level UL2, that is, when the subsequent-stage measurement value becomes larger than an upper limit threshold (a second threshold), it suffices that the first controller unit 115 closes the first adjustment valve 108 to stop the flow of the first permeated liquid from the first permeated liquid pipe L12 to the second membrane filtration unit 200. At this time, the second membrane filtration unit 200 continues filtration processing. Thus, while the first permeated liquid from the first permeated liquid pipe L12 is not supplied to the second storage tank 201, the second permeated liquid flows to outside and the second non-permeated liquid is extracted. As a result, the liquid level in the second storage tank 201 can be lowered. That is, the subsequent-stage measurement value can be made smaller than the upper limit threshold.

Meanwhile, when the liquid level of the stored liquid S1 in the first storage tank 101 becomes higher than an upper limit level UL1, it suffices that a supply amount of the liquid to be treated from outside to the first storage tank 101 is reduced or the supply is stopped.

Further, when the liquid level of the stored liquid S2 in the second storage tank 201 becomes lower than a lower limit level (a third threshold) LL2, the second controller unit 215 controls the second return valve 206 to cause the second permeated liquid to flow to the permeated liquid returning pipe L26 and to return it to the second storage tank 201. Also, the second controller unit 215 controls the second extraction valve 221 and the return valve 223 to return the second non-permeated liquid to the second storage tank 201 via the extraction/returning pipe L23 and the non-permeated liquid returning pipe L25. The second membrane filtration unit 200 stops liquid delivery for filtration and causes the stored liquid S2 to circulate between the second storage tank 201 or the second liquid delivery pipe L20 and the second separation membrane part 204, the second non-permeated liquid pipe L21, the extraction/returning pipe L23, the non-permeated liquid returning pipe L25, and the permeated liquid returning pipe L26. By this circulation, it is possible to adjust the liquid amount in the second storage tank while control of a flow rate in a membrane is continued. In particular, when high pressure is required during filtration, this configuration is preferable because it is possible to make a flow rate stable immediately after liquid delivery for filtration is resumed and to perform stable constant flow-rate filtration, by maintaining control of the flow rate in the membrane. Further, the liquid level in the second storage tank 201 can be raised by causing the stored liquid S2 to circulate. That is, the subsequent-stage measurement value can be made larger than the lower limit threshold.

As described above, the filtration device adjusts the amount of the stored liquid S1 or S2 in the first or second storage tank 101 or 201, caused by a flow-rate deviation in constant flow-rate filtration, with a flow of a permeated liquid or a non-permeated liquid based on measurement values from the first and second liquid scales 114 and 214. Thus, it is possible to correct the deviation of the amount of the stored liquid S1 or S2 in the first or second storage tank 101 or 201, caused by a slight flow-rate deviation in a constant flow-rate filtration device. By correcting the deviation of the liquid amount, the amounts of the stored liquids S1 and S2 in the first and second storage tanks 101 and 201 become stable so that it is possible to suppress the stored liquids S1 and S2 from overflowing from the first and second storage tanks 101 and 201 or being depleted. Therefore, the filtration device can continue to stably filtrate a liquid to be treated at a constant flow rate. Further, since the amounts of the stored liquids S1 and S2 in the first and second storage tanks 101 and 201 become stable, the organic concentration in the first storage tank 101 can be made stable.

In the first membrane filtration unit 100, the cleaning solution tank 112, the washing pump 113, and the washing pipe L115 are provided as a cleaning part. The cleaning part causes to a cleaning solution to flow from a permeation side of the first separation membrane part 104 to a non-permeation side, thereby backwashing the first separation membrane part 104. During this cleaning processing, the first permeated liquid valve 108 and the first extraction valve 111 are opened, and the first non-permeated liquid valve 107 is closed. Also, the first liquid delivery pump 103 is stopped, and the washing pump 113 is driven. By this operation, the cleaning solution in the cleaning solution tank 112 is discharged through the non-permeated liquid returning pipe L25, the first separation membrane part 104, the first liquid delivery pipe L10, and the first extraction pipe L13. Cleaning processing is performed regularly or intermittently to prevent clogging of the first separation membrane part 104. At the same time as this backwashing, extraction of a non-permeated liquid may be performed regularly by extracting a constant amount of the non-permeated liquid included in the first separation membrane part.

First Modification

Figure 2:
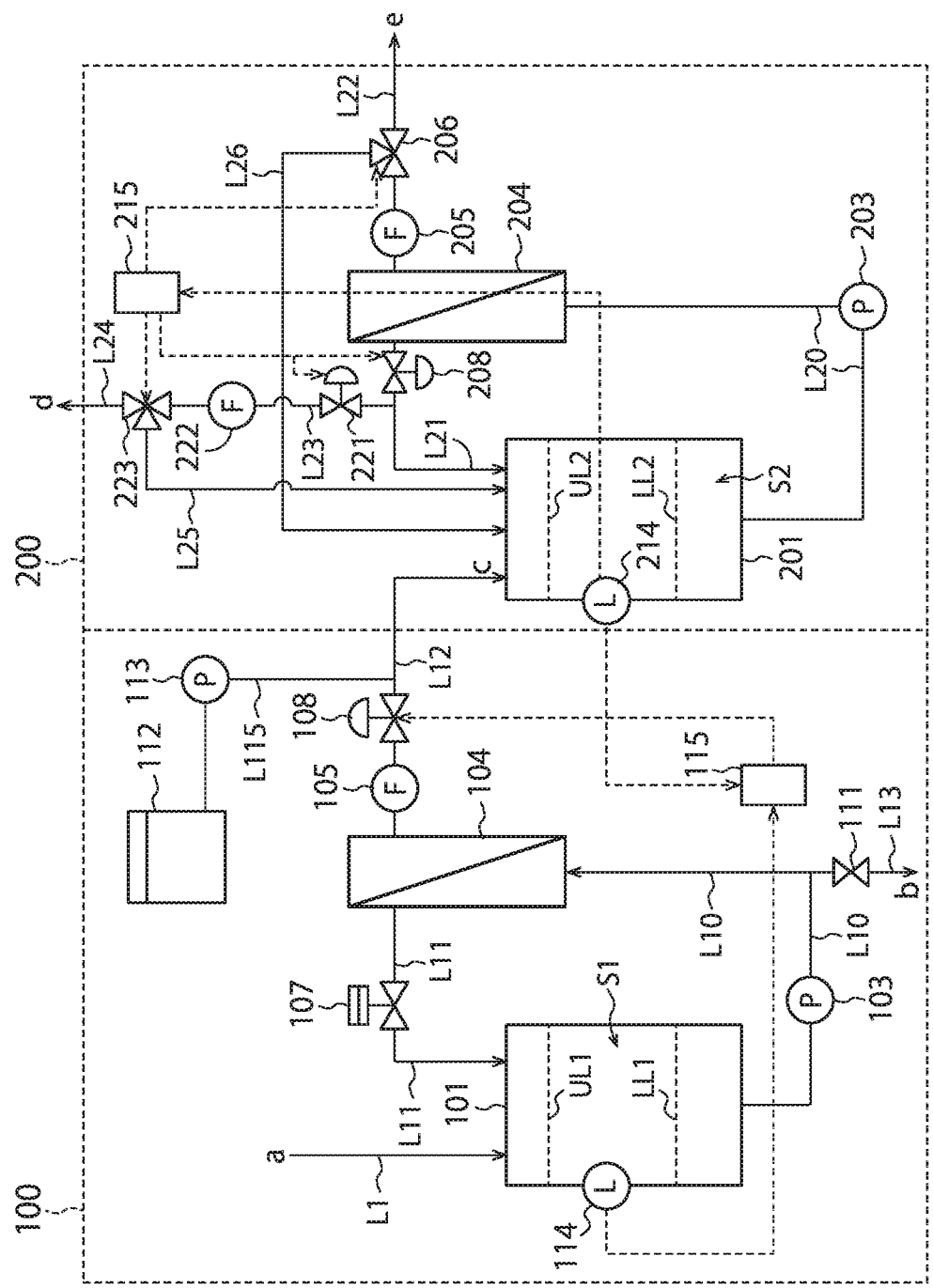
FIG. 2 is a diagram illustrating a configuration of a filtration device according to a first modification of the first example.

FIG. 2 is a diagram illustrating a configuration of a filtration device according to a first modification of the first example. According to the first modification, the second non-permeated liquid pipe L21 is connected to the second storage tank 201, and the second non-permeated liquid from the second separation membrane part 204 is returned to the second storage tank 201. The stored liquid S2 in the second storage tank 201 circulates between the second storage tank 201 and the second separation membrane part 204. In this configuration, the stored liquid S2 can be concentrated in the second storage tank 201 and be extracted as a concentrated liquid from the second extraction pipe L24 at a substantially constant flow rate. Other configurations and operations of the first modification may be identical to corresponding configurations and operations of the first example described above. Therefore, the first modification can obtain effects identical to those of the first example described above.

Second Modification

Figure 3:
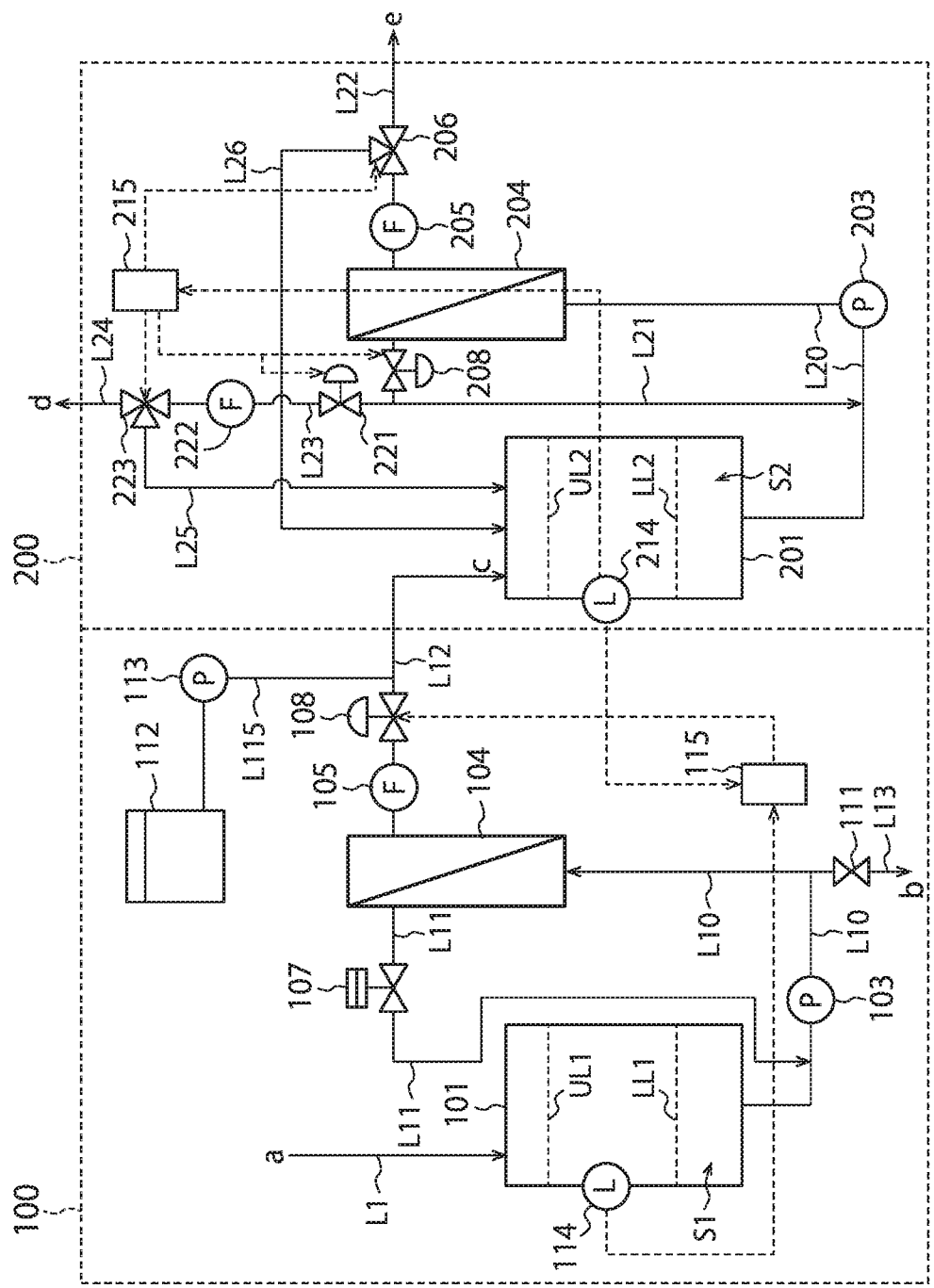
FIG. 3 is a diagram illustrating a configuration of a filtration device according to a second modification of the first example.

FIG. 3 is a diagram illustrating a configuration of a filtration device according to a second modification of the first example. According to the second modification, the first non-permeated liquid pipe L11 of the first membrane filtration unit 100 is connected to the first liquid delivery pipe L10 between the first storage tank 101 and the first liquid delivery pump 103 and is arranged to return the first non-permeated liquid from the first separation membrane part 104 to the first liquid delivery pipe L10. In this example, the stored liquid S1 in the first storage tank 101 circulates between the first liquid delivery pipe L10 and the first separation membrane part 104. The stored liquid S1 can be concentrated in the first liquid delivery pipe L10 and be extracted as a concentrated liquid from the first extraction pipe L13 at a substantially constant flow rate. Other configurations and operations of the second modification may be identical to the corresponding configurations and operations of the first example described above. Therefore, the second modification can obtain effects identical to those of the first example described above.

Third Modification

Figure 4:
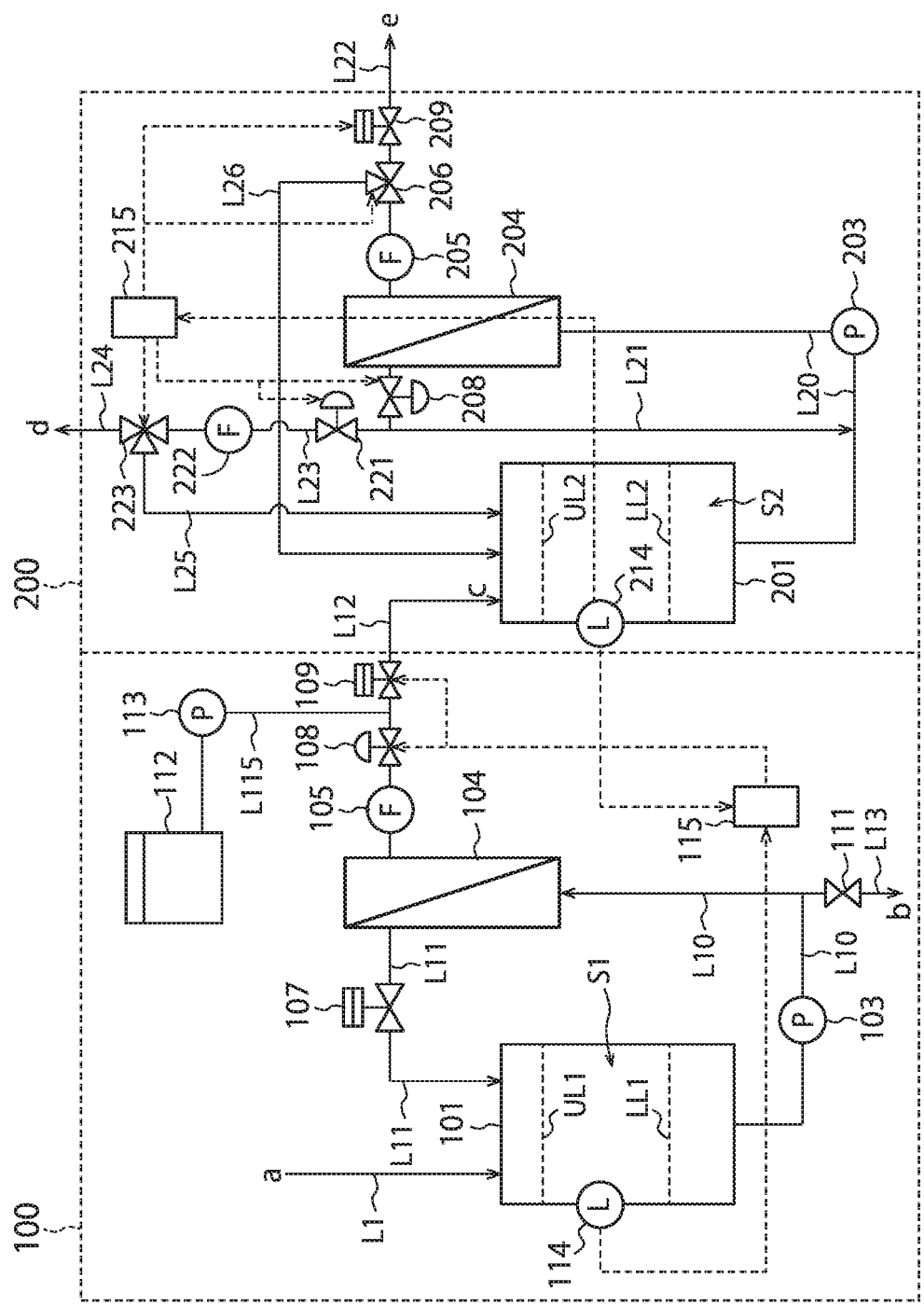
FIG. 4 is a diagram illustrating a configuration of a filtration device according to a third modification of the first example.

FIG. 4 is a diagram illustrating a configuration of a filtration device according to a third modification of the first example. The first membrane filtration unit 100 according to the third modification further includes a first open/close valve 109. The first open/close valve 109 is provided in the first permeated liquid pipe L12 between the first adjustment valve 108 and the second storage tank 201. The first open/close valve 109 is controlled by the first controller unit 115 to be opened and be closed. That is, when the liquid level of the stored liquid S1 in the first storage tank 101 becomes lower than the lower limit level LL1 or when the liquid level of the stored liquid S2 in the second storage tank 201 becomes higher than the upper limit level UL2, the first open/close valve 109 is closed to stop a flow of the first permeated liquid from the first permeated liquid pipe L12 to the second membrane filtration unit. Thus, the stored liquid S1 from the first liquid delivery pipe L10 is entirely returned to the first storage tank 101 as a non-permeated liquid and is caused to circulate between the first storage tank 101 and the first separation membrane part 104. As a result, clogging of the first separation membrane part 104 can be suppressed, and the first separation membrane part 104 can be used stably for a longer time. In particular, this modification can be preferably applied to a liquid to be treated containing much turbidity and a separation membrane that requires backwashing. Further, by causing the stored liquid S1 to circulate, the liquid level of the stored liquid S1 in the first storage tank 101 can be raised or the liquid level of the stored liquid S2 in the second storage tank 201 can be lowered.

In addition, the second membrane filtration unit 200 further includes a second open/close valve 209. The second open/close valve 209 is provided in the second permeated liquid pipe L22. The second open/close valve 209 is controlled by the second controller unit 215 to be opened and closed. That is, when the liquid level of the stored liquid S2 in the second storage tank 201 becomes lower than the lower limit level LL2, the second open/close valve 209 is closed, a flow of the second permeated liquid from the second permeated liquid pipe L22 is stopped, and the total amount of a flow rate of a permeated liquid and a flow rate of a non-permeated liquid is extracted from the extraction/returning pipe L23 and is returned to the second storage tank 201 as a non-permeated liquid through the non-permeated liquid returning pipe L25. Thus, the stored liquid S2 from the second liquid delivery pipe L20 is entirely returned to the second storage tank 201 as a non-permeated liquid, and is caused to circulate among the second storage tank 201, the second liquid delivery pipe L20, the second separation membrane part 204, the extraction/returning pipe L23, and the non-permeated liquid returning pipe L25. As a result, clogging of the second separation membrane part 204 can be suppressed, and the second separation membrane part 204 can be used stably for a longer time. In particular, this modification can be preferably applied to a liquid to be treated containing much turbidity and a separation membrane that requires backwashing. Further, the liquid level of the stored liquid S2 in the second storage tank 201 can be raised by causing the stored liquid S2 to circulate.

In this manner, in addition to the first and second adjustment valves 108 and 208, the first and second open/close valves 109 and 209 may be provided, and the first and second open/close valves 109 and 209 may respectively stop flows of the first and second permeated liquids.

The first open/close valve 109 may be arranged at any position in the first permeated liquid pipe L12 and may be arranged between the first adjustment valve 108 and the first flowmeter 105 or between the first flowmeter 105 and the first separation membrane part 104. The second open/close valve 209 may be arranged at any position in the second permeated liquid pipe L22 and may be arranged between the return valve 206 and the second flowmeter 205 or between the second flowmeter 205 and the second separation membrane part 204.

Furthermore, it is possible to configure that either one of the first and second open/close valves 109 and 209 is provided while the other is omitted. In this configuration, it suffices that the first or second adjustment valve 108, 109 stops the flow of the first permeated liquid in place of the omitted open/close valve and the second membrane filtration unit 200 controls the return valves 206 and 223 to return the second permeated liquid and the second non-permeated liquid to the second storage tank 201 as in the first example.

Other configurations and operations of the third modification may be identical to the corresponding configurations and operations of the first example described above. Therefore, the third modification can obtain effects identical to those of the first example described above.

Fourth Modification

In the first to third modifications described above, the first controller unit 115 closes the first adjustment valve 108 or the first open/close valve 109 to stop a flow of the first permeated liquid. Also, the second controller unit 215 closes the second adjustment valve 208 or the second open/close valve 209 to stop a flow of the second permeated liquid.

In contrast, according to a fourth modification, the first or second controller unit 115 or 215 stops an operation of the first or second liquid delivery pump 103 or 203 to stop a flow of the first or second permeated liquid.

For example, when the liquid level of the stored liquid S1 in the first storage tank 101 in FIG. 1 becomes lower than the lower limit level LL1 or when the liquid level of the stored liquid S2 in the second storage tank 201 becomes higher than the upper limit level UL2, the first controller unit 115 stops an operation of the first liquid delivery pump 103. At this time, the second controller unit 215 continues an operation of the second liquid delivery pump 203. Accordingly, a flow of the first permeated liquid from the first membrane filtration unit 100 to the second membrane filtration unit 200 is stopped, and the liquid level of the stored liquid S1 in the first storage tank 101 is raised or the liquid level of the stored liquid S2 in the storage tank 201 is lowered.

For example, when the liquid level of the stored liquid S2 in the second storage tank 201 becomes lower than the lower limit level LL2, the second controller unit 215 stops the operation of the second liquid delivery pump 203. At this time, the first controller unit 115 continues the operation of the first liquid delivery pump 103. Accordingly, a flow of the second permeated liquid from the second membrane filtration unit 200 is stopped, and the liquid level of the stored liquid S2 in the second storage tank 201 is raised.

Other configurations and operations of the fourth modification may be identical to the corresponding configurations and operations of the first example described above. Therefore, the fourth modification can also obtain an effect of adjusting the liquid amounts in the first storage tank 101 and the second storage tank 201 similarly to the first example described above.

Fifth Modification

In a fifth modification, the liquid amount in the first or second storage tank 101 or 201 is adjusted by controlling the amount of a non-permeated liquid extracted from the first or second extraction pipe L13 or L24.

For example, when the liquid level of the stored liquid S1 in the first storage tank 101 in FIG. 1 becomes higher than the upper limit level UL1, the amount of the non-permeated liquid extracted from the first extraction pipe L13 is increased. When the liquid level of the stored liquid S2 in the second storage tank 201 becomes higher than the upper limit level UL2, the amount of the first non-permeated liquid extracted from the second extraction pipe L24 is increased. On the contrary, when the liquid level of the stored liquid S1 in the first storage tank 101 becomes lower than the lower limit level LL1, the amount of the first non-permeated liquid extracted from the first extraction pipe L13 is reduced. When the liquid level of the stored liquid S2 in the second storage tank 201 becomes lower than the lower limit level LL2, the amount of the second non-permeated liquid extracted from the second extraction pipe L24 is reduced. In this manner, the liquid amount in the first or second storage tank 101 or 201 may be adjusted by controlling the amount of the non-permeated liquid extracted from the first or second extraction pipe L13 or L24.

Other configurations and operations of the fifth modification may be identical to the corresponding configurations and operations of the first example described above. Therefore, the fifth modification can also obtain an effect of adjusting the liquid amounts in the first storage tank 101 and the second storage tank 201 similarly to the first example described above.

Sixth Modification

Figure 5:
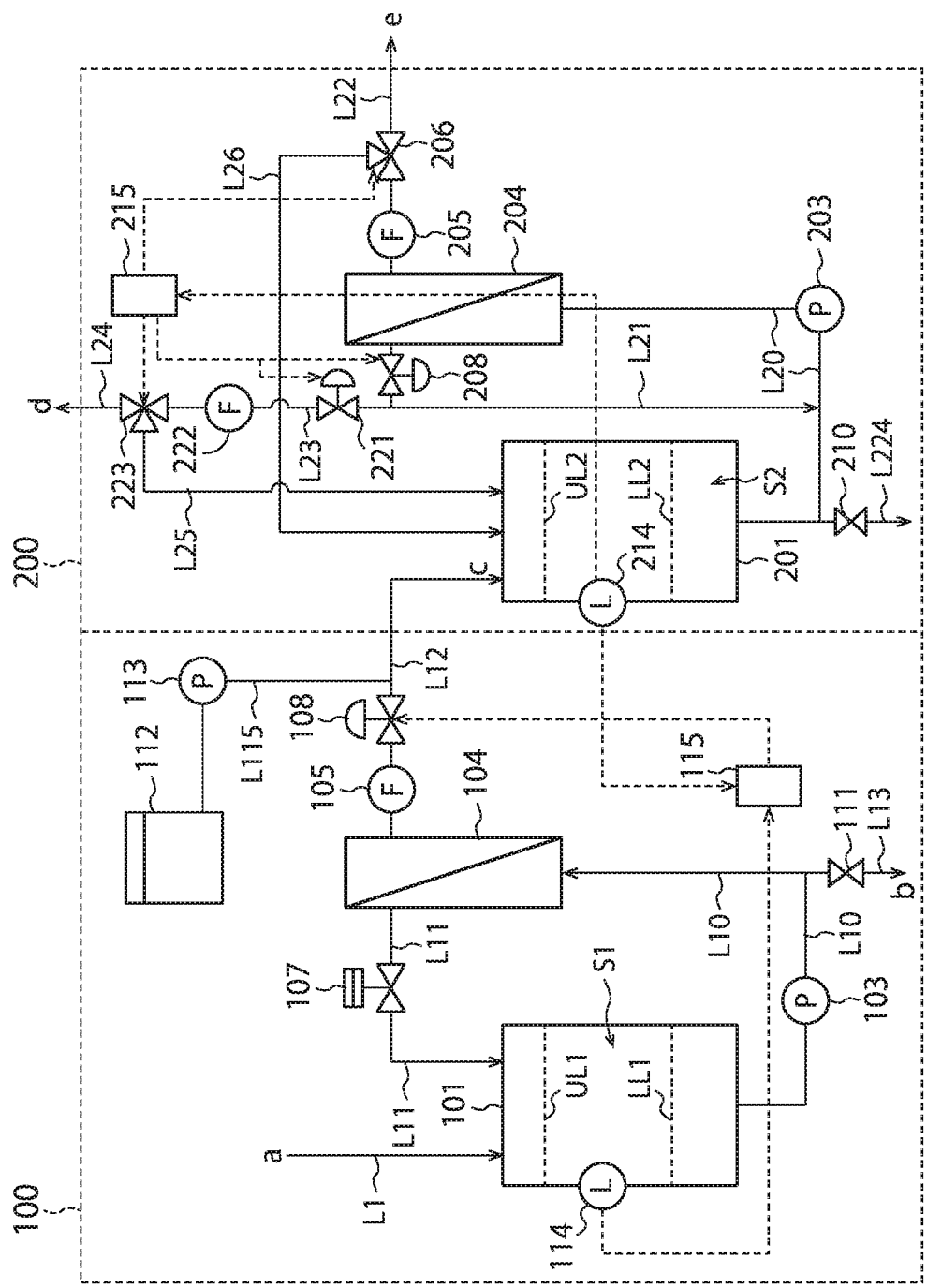
FIG. 5 is a diagram illustrating a configuration of a filtration device according to a sixth modification.

In a sixth modification, the liquid amount in the first or second storage tank 101 or 201 is adjusted by controlling the amount of the stored liquid S1 or S2 discharged from the first or second storage tank 101 or 201. For example, FIG. 5 is a diagram illustrating a configuration of a filtration device according to the sixth modification. The second membrane filtration unit 200 according to the sixth modification further includes a discharge valve 210 and a discharge pipe L224. In the first membrane filtration unit 100, the first extraction valve 111 and the first extraction pipe L13 function as a discharge valve and a discharge pipe, respectively.

The discharge pipe L224 is connected to the second liquid delivery pipe L20 via the discharge valve 210. The discharge pipe L224 is connected to the second liquid delivery pipe L20 between the second storage tank 201 and the liquid delivery pump 203 and is arranged to discharge the stored liquid S2 flowing through the second liquid delivery pipe L20, to outside of the filtration device. The discharge valve 210 is provided in the discharge pipe L224 and is opened when discharging the stored liquid S2.

For example, when the liquid level of the stored liquid S2 in the second storage tank 201 becomes higher than the upper limit level UL2, the second controller unit 215 opens the discharge valve 210 to discharge the stored liquid S2 through the discharge pipe L224 to outside of the filtration device. Further, when the liquid level of the stored liquid S1 in the first storage tank 101 becomes higher than the upper limit level UL1, the first controller unit 115 opens the first extraction valve 111 to discharge the stored liquid S1 through the first extraction pipe L13 to outside of the filtration device.

In this manner, the liquid amount in the first or second storage}le tank 101 or 201 may be adjusted by controlling the amount of the stored liquid S1 or S2 discharged from the first or second storage tank 101 or 201.

Other configurations and operations of the sixth modification may be identical to the corresponding configurations and operations of the first example described above. Therefore, the sixth modification can also obtain an effect of adjusting the liquid amounts in the first storage tank 101 and the second storage tank 201 similarly to the first example described above.

In the example and its modifications described above, the first and second liquid scales 114 and 214 have been described as liquid level meters. However, it is needless to mention that the first and second liquid scales 114 and 214 may be mass measurement devices that detect the liquid amounts in the first and second storage tanks 101 and 201, respectively.

Second Example

Figure 6:
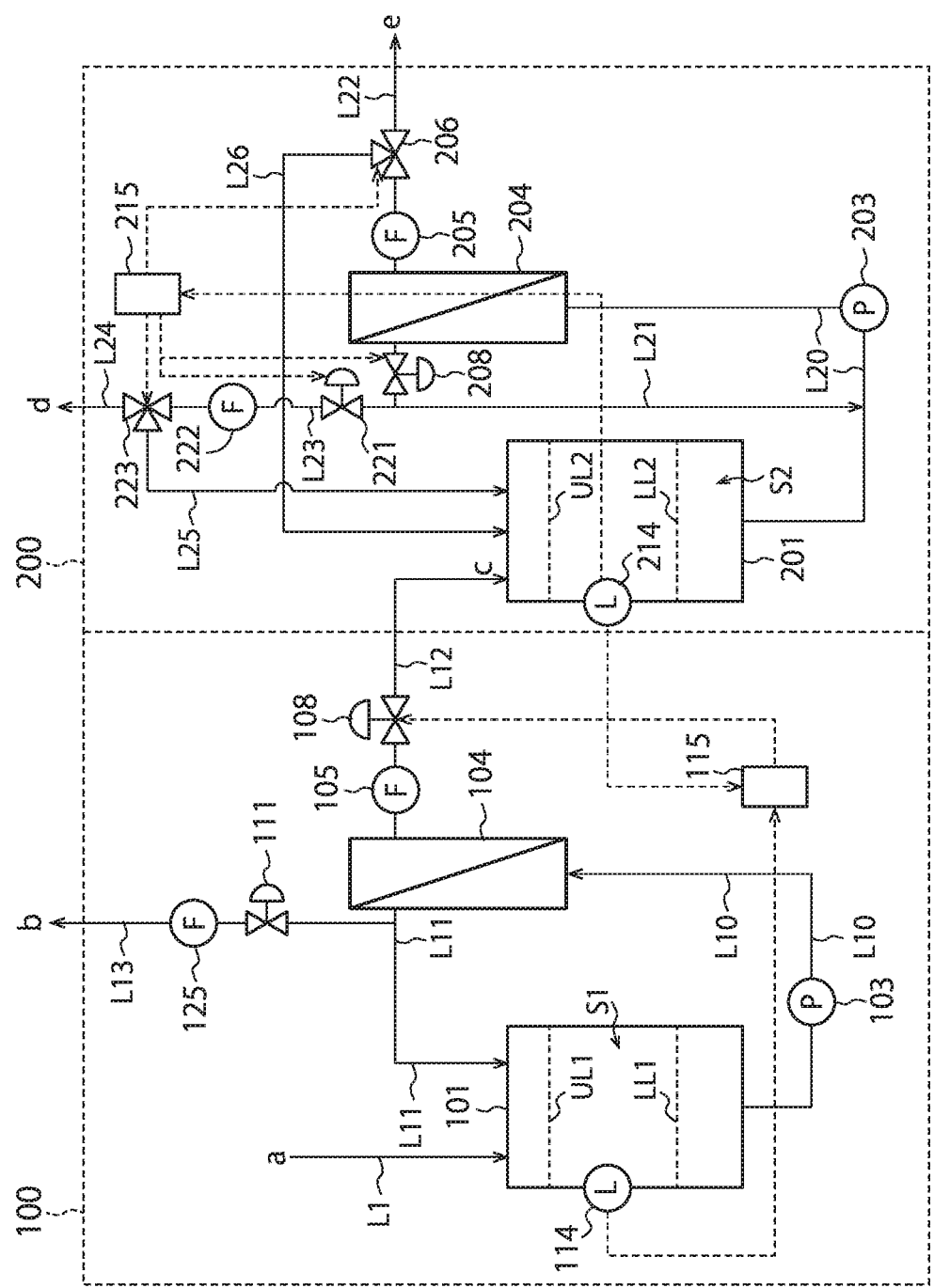
FIG. 6 is a diagram illustrating a configuration of a filtration device according to a second example.

FIG. 6 is a diagram illustrating a configuration of a filtration device according to a second example. A cleaning part is omitted in the first membrane filtration unit 100 according to the second example. Therefore, the first membrane filtration unit 100 according to the second example does not include the cleaning solution tank 112, the washing pump 113, and the washing pipe L115. Accordingly, the first extraction pipe L13 and the first extraction valve 111 according to the first example are provided in the first non-permeated liquid pipe L11. This is because it is unnecessary to use the first extraction pipe L13 and the first extraction valve 111 as a discharge pipe and a discharge valve for a cleaning solution. Therefore, in the second example, a portion of a non-permeated liquid is extracted to outside of the filtration device from the first non-permeated liquid pipe L11 via the first extraction pipe L13, and the remaining portion is returned to the first storage tank 101 via the first non-permeated liquid pipe L11.

Further, the first membrane filtration unit 100 according to the second example includes a flowmeter 125 provided in the first extraction pipe L13. The flowmeter 125 measures a flow rate of the non-permeated liquid flowing through the first extraction pipe L13. A measurement value of the flow rate of the non-permeated liquid is used for executing feedback control for the first extraction valve 111 via the first controller unit 115. By the feedback control, the first extraction valve 111 is adjusted to make the flow rate of the non-permeated liquid flowing through the first extraction pipe L13 substantially constant.

Other configurations of the second example may be identical to the corresponding configurations of the first example. Operations of the second example may also be identical to those of the first example except that a cleaning function is not provided. Therefore, the second example can obtain effects identical to those of the first example.

All the first to sixth modifications described above can be applied to the second example. Further, in the second example, a plurality of the first membrane filtration units 100 that are continuous in series may be provided, and the second membrane filtration unit 200 may be provided to follow the first membrane filtration units 100 continuously.

That is, the second example can also be combined with a third example or a fourth example described later.

An extraction pump (not illustrated) may be provided in place of the first extraction valve 111. In this configuration, the first controller unit 115 executes feedback control for the extraction pump by using a measured flow-rate value of the flowmeter 125. By the feedback control, the extraction pump is adjusted to make the flow rate of the non-permeated liquid flowing through the first extraction pipe L13 substantially constant. Even with this configuration, effects of this example are not lost.

Third Example

Figure 7:
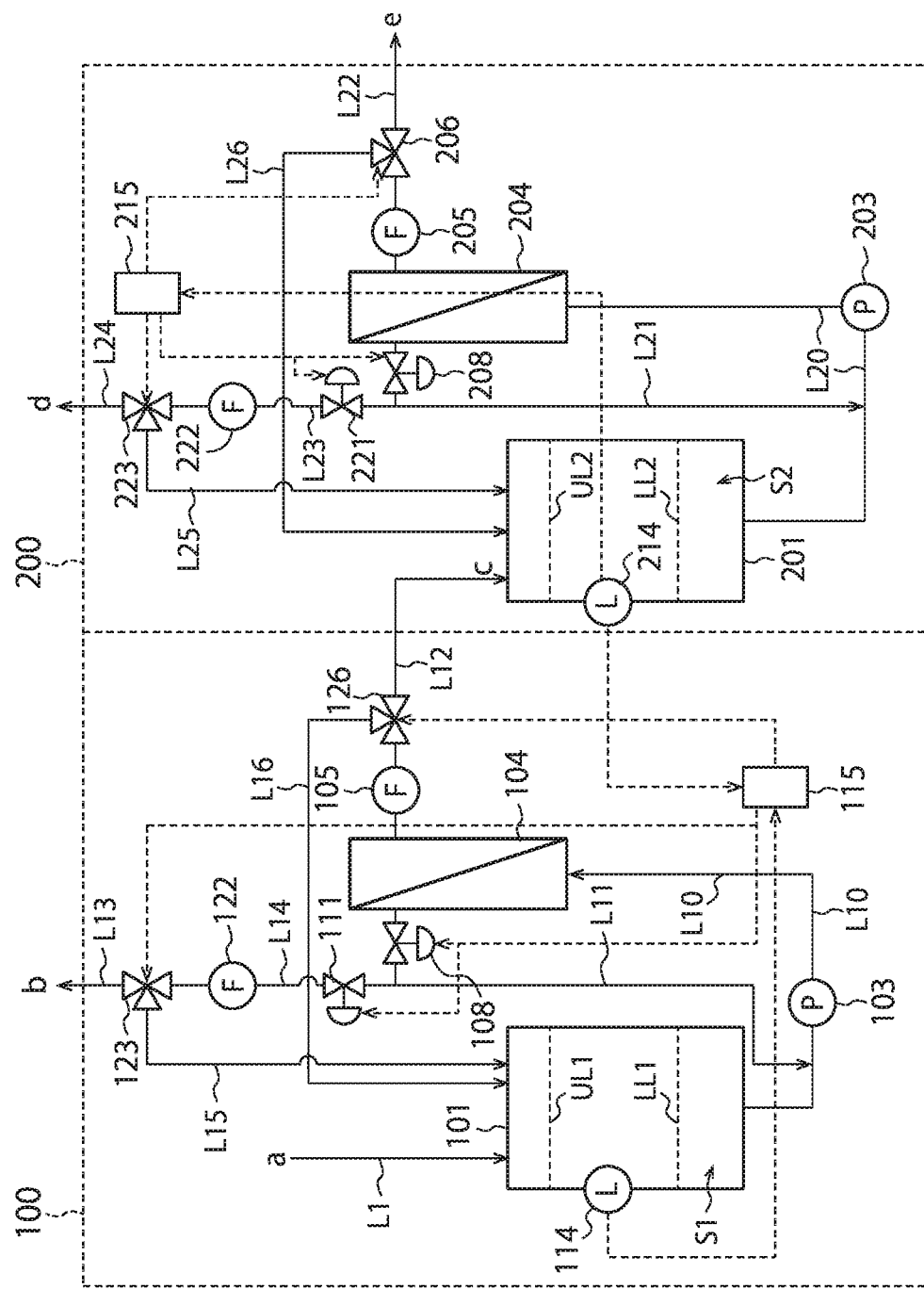
FIG. 7 is a diagram illustrating a configuration of a filtration device according to a third example.

FIG. 7 is a diagram illustrating a configuration of a filtration device according to the third example. The first membrane filtration unit 100 according to the third example has a substantially identical configuration to the second membrane filtration unit 200, and further includes an extraction/returning pipe L14, a first non-permeated liquid returning pipe L15, a first permeated liquid returning pipe L16, a flowmeter 122, and return valves 123 and 126.

The first non-permeated liquid pipe L11 is arranged to return the first non-permeated liquid from the first separation membrane part 104 to the first liquid delivery pipe L10 between the first storage tank 101 and the first liquid delivery pump 103. Further, the extraction/returning pipe L14 is connected to the first non-permeated liquid pipe L11, and a portion of the first non-permeated liquid is delivered to the first extraction pipe L13 or the non-permeated liquid returning pipe L15. The first extraction valve 111 is provided in the extraction/returning pipe L14. The return valve 123 is connected to the extraction/returning pipe L14, the first extraction pipe L13, and the non-permeated liquid returning pipe L15. The return valve 123 is, for example, a three-way valve, and can cause the first non-permeated liquid from the extraction/returning pipe L14 to flow to the first extraction pipe L13 or the non-permeated liquid returning pipe L15. The first non-permeated liquid pipe L15 is arranged to return the first non-permeated liquid from the extraction/return L14 to the first storage tank 101. The first non-permeated liquid returning pipe L15 is connected to the extraction/returning pipe L14 with the return valve 123. The flowmeter 122 measures a flow rate of the first non-permeated liquid flowing through the extraction/returning pipe L14. A portion of the first non-permeated liquid is extracted to outside of the filtration device through the extraction/returning pipe L14 and the first extraction pipe L13. Meanwhile, the remaining portion of the first non-permeated liquid is returned to the first liquid delivery pipe L10 via the first non-permeated liquid pipe L11 or to the first storage tank 101 via the non-permeated liquid returning pipe L15. The first non-permeated liquid returned to the first liquid delivery pipe L10 or the first storage tank 101 is delivered again to the first separation membrane part 104.

The first non-permeated liquid is returned to the first liquid delivery pipe L10 so that it is caused to circulate between the first liquid delivery pipe L10 (the first non-permeated liquid pipe L11) and the first separation membrane part 104, and its organic concentration is concentrated in the first liquid delivery pipe L10 and the first non-permeated liquid pipe L11. Since the first liquid delivery pipe L10 is smaller in volume than the first storage tank 101, the first non-permeated liquid is concentrated more quickly than in being returned to the first storage tank 101.

The permeated liquid returning pipe L16 is connected to the first permeated liquid pipe L12 and returns the first permeated liquid that flows through the first permeated liquid pipe L12, to the first storage tank 101. The return valve 126 is connected between the first permeated liquid pipe L12 and the permeated liquid returning pipe L16. The return valve 126 is, for example, a three-way valve, and can cause the first permeated liquid from the first separation membrane part 104 to flow to the first permeated liquid pipe L12 or to the permeated liquid returning pipe L16.

The second membrane filtration unit 200 according to the third example is identical to that of the first example.

When the liquid level of the stored liquid S1 in the first storage tank 101 becomes lower than the lower limit level (the first threshold) LL1 or when the liquid level of the stored liquid S2 in the second storage tank 201 becomes higher than the upper limit level (the second threshold) UL2, the first controller unit 115 may control the return valve 126 to cause the first permeated liquid to flow to the permeated liquid returning pipe L16 and to return it to the first storage tank 101, and may also control the first extraction valve 111 and the return valve 123 to return the first non-permeated liquid to the first storage tank 101 via the extraction/returning pipe L14 and the non-permeated liquid returning pipe L15. Thus, the first permeated liquid and the first non-permeated liquid from the first liquid delivery pipe L10 are returned to the first storage tank 101 or the first liquid delivery pipe L10. That is, the first membrane filtration unit 100 stops liquid delivery for filtration and causes the first permeated liquid or the first non-permeated liquid to circulate between the first storage tank 101 or the first liquid delivery pipe L10 and the first separation membrane part 104. By this circulation, it is possible to adjust the liquid amount in the second storage tank while control of a flow rate in a membrane is continued. In particular, when high pressure is required during filtration, this configuration is preferable because it is possible to make a flow rate stable immediately after liquid delivery for filtration is resumed and to perform stable constant flow-rate filtration, by maintaining control of the flow rate in the membrane. Further, the liquid level in the first storage tank 101 can be raised by causing the first permeated liquid or the first non-permeated liquid to circulate.

In this manner, it is possible to obtain identical effects to those obtained in the first example even when the first membrane filtration unit 100 is configured in an identical manner to the second membrane filtration unit 200. Further, the first membrane filtration unit 100 according to the third example may be configured in an identical manner to any of the second membrane filtration units 200 according to the first and third to sixth modifications described above. Further, the first and third to sixth modifications described above can be applied to the third example.

Fourth Example

Figure 8:
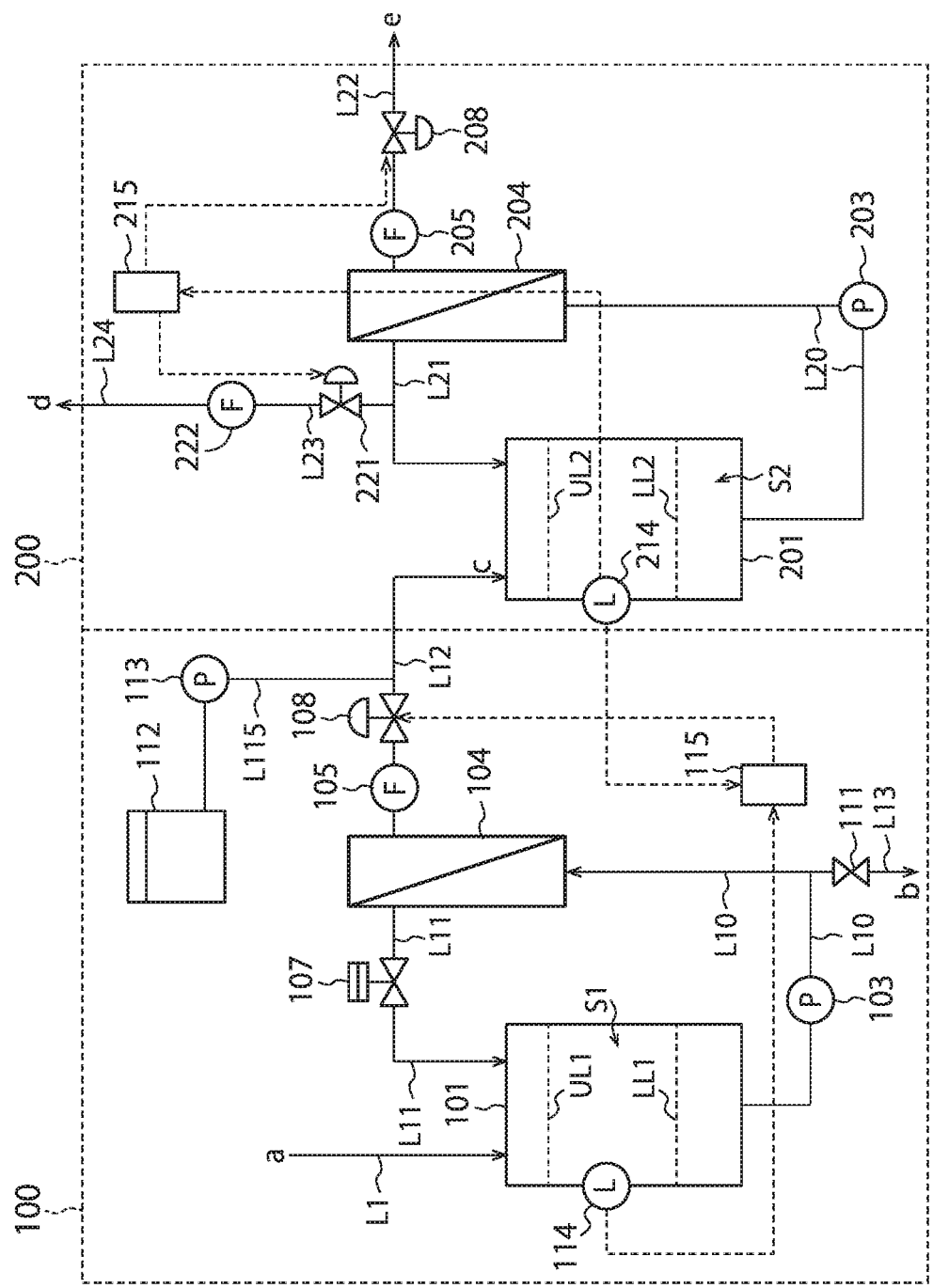
FIG. 8 is a diagram illustrating a configuration of a filtration device according to a fourth example.

FIG. 8 is a diagram illustrating a configuration of a filtration device according to the fourth example. The first membrane filtration unit 100 according to the fourth example has an identical configuration to the first membrane filtration unit 100 in FIG. 1. The second membrane filtration unit 200 according to the fourth example has a substantially identical configuration to the first membrane filtration unit 100 in FIG. 6.

In the second membrane filtration unit 200 according to the fourth example, the second non-permeated liquid pipe L21 is connected to the second storage tank 201, and the second non-permeated liquid from the second separation membrane part 204 is returned to the second storage tank 201. The stored liquid S2 in the second storage tank 201 circulates between the second storage tank 201 and the second separation membrane part 204. A portion of the second non-permeated liquid is extracted from the second non-permeated liquid pipe L21 to outside of the filtration device via the second extraction pipe L24, and the remaining portion is returned to the second storage tank 201 via the second non-permeated liquid pipe L21.

The second membrane filtration unit 200 according to the fourth example includes the flowmeter 222 provided in the second extraction pipe L24. The flowmeter 222 measures a flow rate of a non-permeated liquid flowing through the second extraction pipe L24. A measurement value of the flow rate of the non-permeated liquid is used for executing feedback control for the second extraction valve 221 via the second controller unit 215. By the feedback control, the second extraction valve 221 is adjusted to make the flow rate of the non-permeated liquid flowing through the second extraction pipe L24 substantially constant.

The second permeated liquid pipe L22 is arranged to deliver the second permeated liquid from the second separation membrane part 204 to outside of the second membrane filtration unit 200. The second permeated liquid extracted to outside may be used as a product or may be used in other processes. The second permeated liquid pipe L22 is provided with the second flowmeter 205 and the second adjustment valve 208. The second flowmeter 205 measures the flow rate of the second permeated liquid flowing through the second permeated liquid pipe L22. A measurement value of the flow rate of the second permeated liquid is used for executing feedback control for the second adjustment valve 208 via the second controller unit 215. By the feedback control, the second adjustment valve 208 is adjusted to make the flow rate of the second permeated liquid flowing through the second permeated liquid pipe L22 substantially constant.

When the liquid level of the stored liquid S2 in the second storage tank 201 becomes lower than the lower limit level (the third threshold) LL2, the second controller unit 215 closes the second adjustment valve 208 to stop a flow of the second permeated liquid from the second permeated liquid pipe L22. At this time, the second extraction valve 221 is closed. Thus, the stored liquid S2 from the second liquid delivery pipe L20 is entirely returned to the second storage tank 201 as a non-permeated liquid. That is, the second membrane filtration unit 200 stops filtration and causes the stored liquid S2 to circulate between the second storage tank 201 and the second separation membrane part 204. By stopping filtration, clogging of the second separation membrane part 204 can be suppressed, and a membrane can be operated stably for a longer time. In particular, this example can be preferably applied to a liquid to be treated containing much turbidity and a membrane that requires backwashing. Further, the liquid level in the second storage tank 201 can be raised by causing the stored liquid S2 to circulate.

The first membrane filtration unit 100 according to the fourth example may have any of the configurations in FIGS. 1 to 7. The second membrane filtration unit 200 according to the fourth example may include a cleaning part having configurations and functions that are identical to those of the cleaning part in the first membrane filtration unit 100 according to the first example.

Seventh Modification

Figure 9:
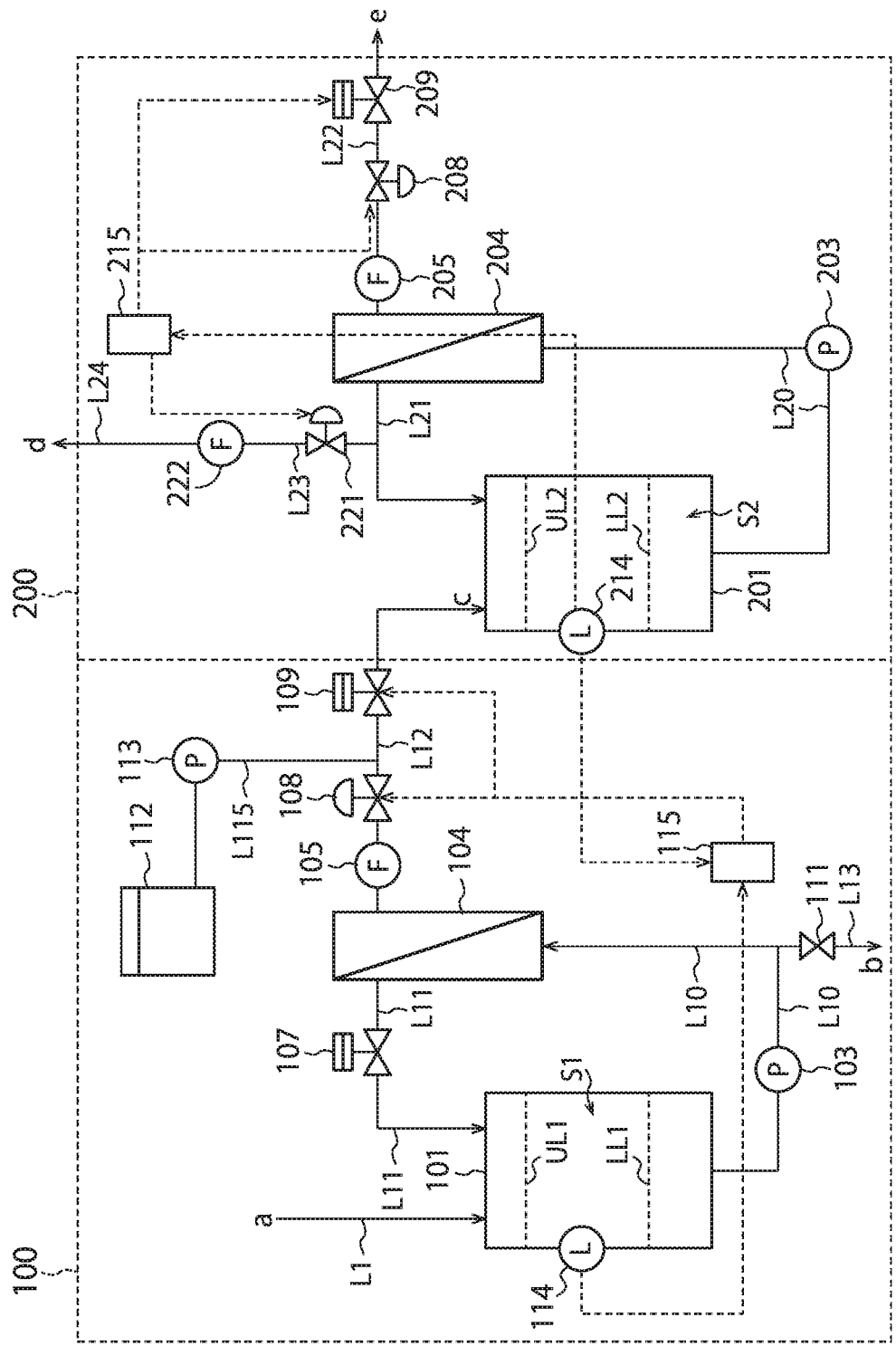
FIG. 9 is a diagram illustrating a configuration of a filtration device according to a seventh modification.

FIG. 9 is a diagram illustrating a configuration of a filtration device according to a seventh modification. The seventh modification is a combination of the fourth example and the third modification of the first example. Therefore, the first membrane filtration unit 100 according to the seventh modification further includes the first open/close valve 109. The first open/close valve 109 is provided in the first permeated liquid pipe L12 between the first adjustment valve 108 and the second storage tank 201. The first open/close valve 109 is controlled by the first controller unit 115 and operates in an identical manner to the first adjustment valve 108 in the fourth example. That is, when the liquid level of the stored liquid S1 in the first storage tank 101 becomes lower than the lower limit level LL1 or when the liquid level of the stored liquid S2 in the second storage tank 201 becomes higher than the upper limit level UL2, the first open/close valve 109 is closed to stop a flow of the first permeated liquid from the first permeated liquid pipe L12 to the second membrane filtration unit.

In addition, the second membrane filtration unit 200 further includes the second open/close valve 209. The second open/close valve 209 is provided in the second permeated liquid pipe L22. The second open/close valve 209 is controlled by the second controller unit 215 and operates in an identical manner to the second adjustment valve 208 in the fourth example. That is, when the liquid level of the stored liquid S2 in the second storage tank 201 becomes lower than the lower limit level LL2, the second open/close valve 209 is closed to stop a flow of the second permeated liquid from the second permeated liquid pipe L22.

In this manner, in addition to the first and second adjustment valves 108 and 208, the first and second open/close valves 109 and 209 may be provided, and the first and second open/close valves 109 and 209 may stop flows of the first and second permeated liquids, respectively.

The first open/close valve 109 may be arranged at any position in the first permeated liquid pipe L12 and may be arranged between the first adjustment valve 108 and the first flowmeter 105 or between the first flowmeter 105 and the first separation membrane part 104. The second open/close valve 209 may be arranged at any position in the second permeated liquid pipe L22 and may be arranged between the return valve 206 and the second flowmeter 205 or between the second flowmeter 205 and the second separation membrane part 204.

Furthermore, it is possible to configure that either one of the first and second open/close valves 109 and 209 is provided while the other is omitted. In this configuration, it suffices that the first or second adjustment valve 108 or 208 stops the flow of the first or second permeated liquid in place of the omitted open/close valve.

Other configurations and operations of the seventh modification may be identical to corresponding configurations and operations of the fourth example described above. Therefore, the seventh modification can obtain effects identical to those of the fourth example described above.

Fifth Example

In the first and second examples, the single first membrane filtration unit 100 is provided, and the second membrane filtration unit 200 is provided to follow the single first membrane filtration unit 100.

In a fifth example, a plurality of the first membrane filtration units 100 that are continuous in series are provided, and the second membrane filtration unit 200 is provided to follow the first membrane filtration units 100. Each of the first membrane filtration units 100 controls the liquid amount in the first storage tank 101 based on its own preceding-stage measurement value and a subsequent-stage measurement value of the first or second membrane filtration unit 100 or 200 following that first membrane filtration unit 100. Each of the first membrane filtration units 100 may have any one of configurations of the first membrane filtration units 100 illustrated in FIGS. 1 to 9. Further, the second membrane filtration unit 200 in the last stage controls the liquid amount in the second storage tank 201 based on only its own measurement value and may have any one of configurations of the second membrane filtration units 200 illustrated in FIGS. 1 to 9.

Figure 10:
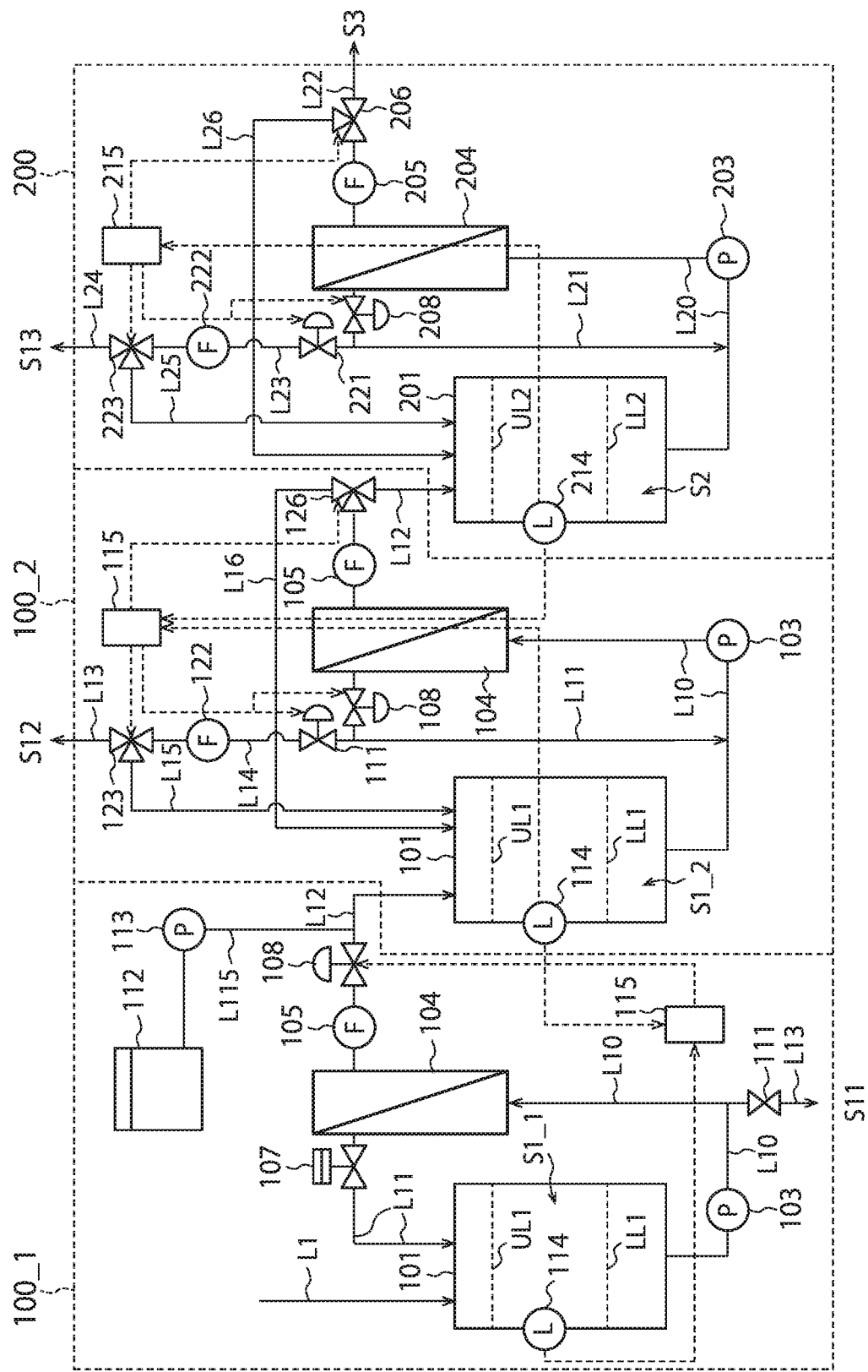
FIG. 10 is a diagram illustrating a configuration of a filtration device according to a fifth example.

For example, FIG. 10 is a diagram illustrating a configuration of a filtration device according to the fifth example. In the fifth example, continuous two first membrane filtration units 100_1 and 100_2 and the second membrane filtration unit 200 subsequent thereto are provided. That is, the filtration device according to the fifth example includes three-stage membrane filtration units 100_1, 100_2, and 200 that are continuous in series.

In the example of FIG. 10, the first membrane filtration unit 100_1 has identical configurations to those of the first membrane filtration unit 100 in FIG. 1. The first membrane filtration unit 100_2 has identical configurations to those of the first membrane filtration unit 100 in FIG. 7. The second membrane filtration unit 200 has identical configurations to those of the second membrane filtration unit 200 in FIG. 1.

However, it is preferable that a pore diameter of the first separation membrane part 104 of the first membrane filtration unit 100_2 arranged on a downstream side in a flow of a liquid to be treated is smaller than that of the first membrane filtration unit 100_1 on an upstream side. Also, it is preferable that a pore diameter of the second separation membrane part 204 of the second membrane filtration unit 200 arranged on the downstream side in the flow of the liquid to be treated is smaller than those of the first membrane filtration units 100_1 and 100_2 on the upstream side. That is, it is preferable that the pore diameters of the separation membrane parts 104 and 204 are set to become smaller gradually from the upstream side to the downstream side. By this setting, it is possible to make components of non-permeated liquids (concentrated liquids) extracted from the extraction pipes L13 and L24 different from each other.

For example, it is assumed that the first separation membrane part 104 of the first membrane filtration unit 100_1 is an MF membrane, the first separation membrane part 104 of the first membrane filtration unit 100_2 is a UF membrane, and the second separation membrane part 204 of the second membrane filtration unit 200 is an NF membrane and/or an RO membrane. In this configuration, the non-permeated liquid extracted from the first membrane filtration unit 100_1 is, for example, turbidity or microorganisms, the non-permeated liquid extracted from the first membrane filtration unit 100_2 is, for example, protein, and the non-permeated liquid extracted from the second membrane filtration unit 200 is, for example, a sugar solution of monosaccharide, oligosaccharide or the like, amino acids, or aromatic compounds. In this manner, by making pore diameters of separation membrane parts of a plurality of continuous membrane filtration units mutually different, it is possible to extract concentrated liquids that are different in components from a liquid to be treated.

The first membrane filtration units 100_1 and 100_2 and the second membrane filtration unit 200 are continuous in series. Therefore, the first membrane filtration unit 100_1 receives the liquid to be treated from outside and supplies a permeated liquid to the first membrane filtration unit 100_2 in its subsequent stage. At this time, a non-permeated liquid (for example, turbidity) S11 is extracted from the first membrane filtration unit 100_1. The first membrane filtration unit 100_2 receives the permeated liquid from the first membrane filtration unit 100_1 and supplies a permeated liquid obtained by filtrating a stored liquid S12 that contains the received permeated liquid, to the second membrane filtration unit 200 in the subsequent stage. At this time, a non-permeated liquid (for example, protein) S12 is extracted from the first membrane filtration unit 100_2. The second membrane filtration unit 200 receives the permeated liquid from the first membrane filtration unit 100_2 and causes a permeated liquid S3 obtained by filtrating the stored liquid S2 that contains the received permeated liquid to flow to outside. At this time, a non-permeated liquid (for example, a sugar solution of monosaccharide, oligosaccharide or the like, amino acids, or aromatic compounds) S13 is extracted from the second membrane filtration unit 200.

The first controller units 115 of the first membrane filtration units 100_1 and 100_2 each control the amount of the stored liquids S1_1 or S1_2 stored in its own first storage tank 101 based on a preceding-stage measurement value from its own first liquid scale 114 and a subsequent-stage measurement value from the first liquid scale 114 of the first or second membrane filtration unit 100_2 or 200 in its subsequent stage.

For example, assuming that the first membrane filtration unit 100_1 is arranged in a preceding stage, the first controller unit 115 of the first membrane filtration unit 100_1 in the preceding stage controls the liquid amount in the first storage tank 101 thereof (the first membrane filtration unit 100 in the preceding stage) based on a preceding-stage measurement value from the first liquid scale 114 thereof (the first membrane filtration unit 100_1 in the preceding stage) and a subsequent-stage measurement value from the first liquid scale 114 of the first membrane filtration unit 100_2 in its subsequent stage.

Further, assuming that the first membrane filtration unit 100_2 is arranged in a preceding stage, the first controller unit 115 of the first membrane filtration unit 100_2 in the preceding stage controls the liquid amount in the first storage tank 101 thereof (the first membrane filtration unit 100_2 in the preceding stage) based on a preceding-stage measurement value from the first liquid scale 114 thereof (the first membrane filtration unit 100_2 in the preceding stage) and a subsequent-stage measurement value from the second liquid scale 214 of the second membrane filtration unit 200 in its subsequent stage.

The second controller unit 215 of the second membrane filtration unit 200 in the last stage controls the liquid amount in the second storage tank 201 thereof (the second membrane filtration unit 200) based on a measurement value from the second liquid scale 214 thereof (the second membrane filtration unit 200).

A method of controlling the liquid amounts in the first and second storage tanks 101 and 201 may be the same as that in (Operation example of filtration device) in the first example. Therefore, the detailed descriptions of operations of the first membrane filtration units 100_1 and 100_2 and the second membrane filtration unit 200 are omitted here. As described above, the effects described in the first example can also be obtained even when three membrane filtration units are arranged to be continuous in series.

Sixth Example

In the fifth example, the two first membrane filtration units 100_1 and 100_2 that are continuous in series are provided.

Meanwhile, in a sixth example, three first membrane filtration units 100_1 to 100_3 that are continuous in series are provided, and the second membrane filtration unit 200 is provided to follow the first membrane filtration units 100_1 to 100_3 continuously.

Each of the first membrane filtration units 100_1 to 100_3 controls the liquid amount in the first storage tank 101 based on its own preceding-stage measurement value and a subsequent-stage measurement value of the first or second membrane filtration unit 100_2, 100_3, or 200 subsequent thereto. Each of the first membrane filtration units 100_1 to 100_3 may have any one of configurations of the first membrane filtration units 100 illustrated in FIGS. 1 to 9. Further, the second membrane filtration unit 200 in the last stage controls the liquid amount in the second storage tank 201 based on only its own measurement value and may have any one of configurations of the second membrane filtration units 200 illustrated in FIGS. 1 to 9.

Figure 11:
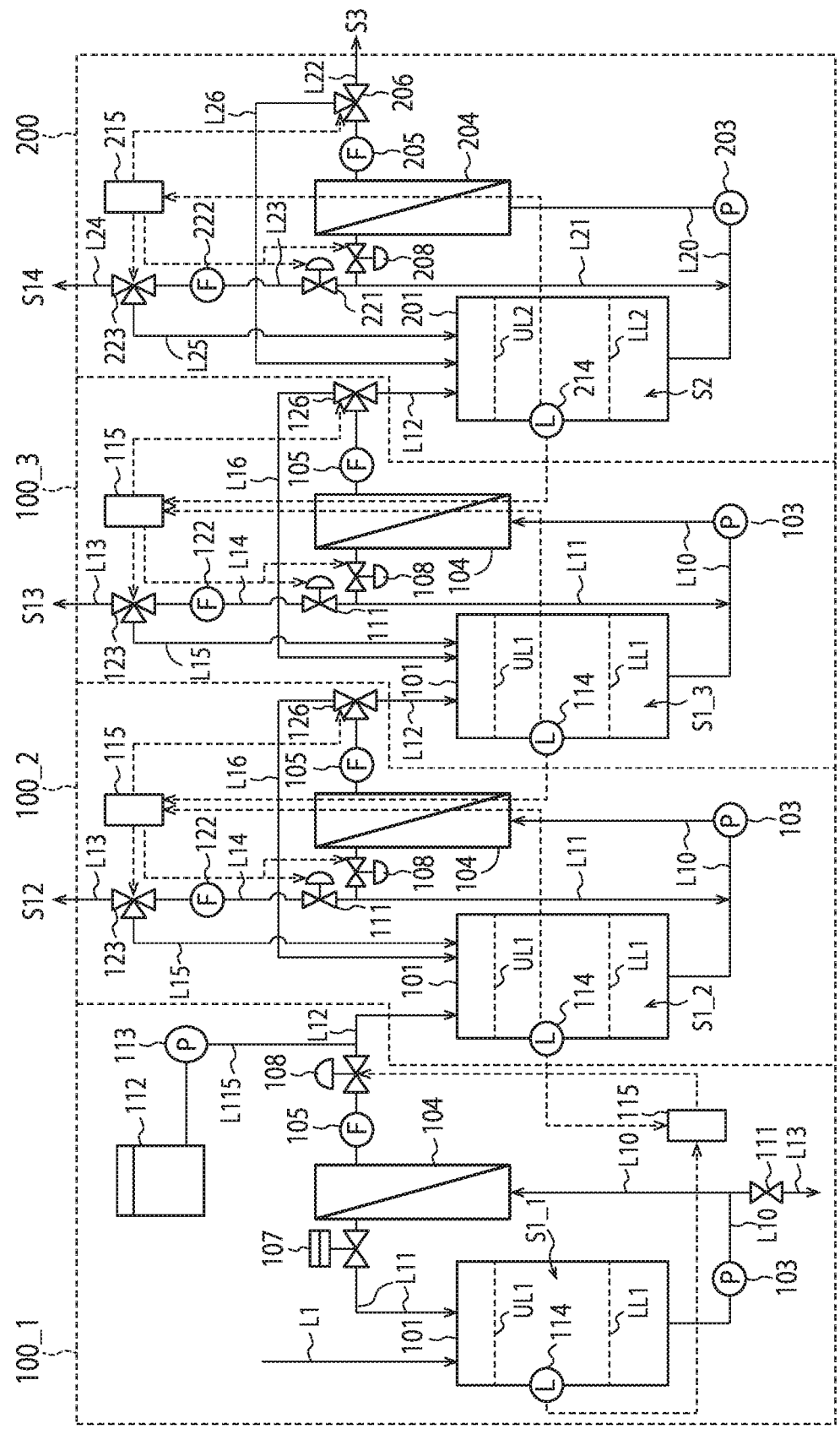
FIG. 11 is a diagram illustrating a configuration of a filtration device according to a sixth example.

For example, FIG. 11 is a diagram illustrating a configuration of a filtration device according to the sixth example. In the sixth example, the three first membrane filtration units 100_1 to 100_3 that are continuous and the second membrane filtration unit 200 subsequent thereto are provided. That is, the filtration device according to the sixth example includes four-stage membrane filtration units 100_1 to 100_3 and 200 that are continuous in series.

In the example of FIG. 11, the first membrane filtration unit 100_1 has an identical configuration to the first membrane filtration unit 100 in FIG. 1. The first membrane filtration units 100_2 and 100_3 each have an identical configuration to the first membrane filtration unit 100 in FIG. 7. The second membrane filtration unit 200 has an identical configuration to the second membrane filtration unit 200 in FIG. 1.

However, it is preferable that the pore diameter of the first separation membrane part 104 of the first membrane filtration unit 100_2 arranged on a downstream side in a flow of a liquid to be treated is smaller than that of the first membrane filtration unit 100_1 on an upstream side. Also, it is preferable that the pore diameter of the first separation membrane part 104 of the first membrane filtration unit 100_3 on the downstream side is smaller than those of the first membrane filtration units 100_1 and 100_2 on the upstream side. It is preferable that the pore diameter of the second separation membrane part 204 of the second membrane filtration unit 200 arranged on the further downstream side is smaller than those of the first membrane filtration units 100_1 to 100_3 on the upstream side. That is, it is preferable that the pore diameters of the separation membrane parts 104 and 204 are set to become smaller gradually from the upstream side to the downstream side. By this setting, it is possible to make components of non-permeated liquids (concentrated liquids) extracted from the extraction pipes L13 and L24 different from each other.

For example, it is assumed that the first separation membrane part 104 of the first membrane filtration unit 100_1 is an MF membrane, the first separation membrane part 104 of the first membrane filtration unit 100_2 is a UF membrane, the first separation membrane part 104 of the first membrane filtration unit 100_3 is an NF membrane, and the second separation membrane part 204 of the second membrane filtration unit 200 is an RO membrane. In this configuration, a non-permeated liquid extracted from the first membrane filtration unit 100_1 is, for example, turbidity or microorganisms, a non-permeated liquid extracted from the first membrane filtration unit 100_2 is, for example, protein, a non-permeated liquid extracted from the first membrane filtration unit 100_3 is, for example, oligosaccharide or amino acids, and a non-permeated liquid extracted from the second membrane filtration unit 200 is, for example, monosaccharide. In this manner, by making pore diameters of separation membrane parts of a plurality of continuous membrane filtration units mutually different, it is possible to extract concentrated liquids that are mutually different in components from a liquid to be treated.

The first membrane filtration units 100_1 to 100_3 and the second membrane filtration unit 200 are continuous in series. Therefore, the first membrane filtration unit 100_1 receives the liquid to be treated from outside and supplies a permeated liquid to the first membrane filtration unit 100_2 in its subsequent stage. At this time, the non-permeated liquid (for example, turbidity or microorganisms) S11 is extracted from the first membrane filtration unit 100_1. The first membrane filtration unit 100_2 receives the permeated liquid from the first membrane filtration unit 100_1 and supplies a permeated liquid obtained by filtrating the stored liquid S1_2 that contains the received permeated liquid, to the first membrane filtration unit 100_3 in its subsequent stage. At this time, the non-permeated liquid (for example, protein) S12 is extracted from the first membrane filtration unit 100_2. The first membrane filtration unit 100_3 receives the permeated liquid from the first membrane filtration unit 100_2 and supplies a permeated liquid obtained by filtrating a stored liquid S1_3 that contains the received permeated liquid, to the second membrane filtration unit 200 in its subsequent stage. At this time, a non-permeated liquid (for example, oligosaccharide or amino acids) S13 is extracted from the first membrane filtration unit 100_3. The second membrane filtration unit 200 receives the permeated liquid from the first membrane filtration unit 100_3 and causes the permeated liquid S3 obtained by further filtrating the stored liquid S2 that contains the received permeated liquid to flow to outside. At this time, a non-permeated liquid (for example, monosaccharide or aromatic compounds) S14 is extracted from the second membrane filtration unit 200.

The first controller units 115 of the first membrane filtration units 100_1 to 100_3 each control the amount of the stored liquid stored in its own first storage tank 101 based on a preceding-stage measurement value from its own first liquid scale 114 and a subsequent-stage measurement value from the first or second liquid scale 114 or 214 of the first or second membrane filtration unit 100_2, 100_3, or 200.

For example, assuming that the first membrane filtration unit 100_1 is arranged in a preceding stage, the first controller unit 115 of the first membrane filtration unit 100_1 in the preceding stage controls the liquid amount in the first storage tank 101 thereof (the first membrane filtration unit 100_1 in the preceding stage) based on a preceding-stage measurement value from the first liquid scale 114 thereof (the first membrane filtration unit 100_1 in the preceding stage) and a subsequent-stage measurement value from the first liquid scale 114 of the first membrane filtration unit 100_2 in its subsequent stage.

Further, assuming that the first membrane filtration unit 100_2 is arranged in a preceding stage, the first controller unit 115 of the first membrane filtration unit 100_2 in the preceding stage controls the liquid amount in the first storage tank 101 thereof (the first membrane filtration unit 100_2 in the preceding stage) based on a preceding-stage measurement value from the first liquid scale 114 thereof (the first membrane filtration unit 100_2 in the preceding stage) and a subsequent-stage measurement value from the first liquid scale 114 of the first membrane filtration unit 100_3 in its subsequent stage.

Further, assuming that the first membrane filtration unit 100_3 is arranged in a preceding stage, the first controller unit 115 of the first membrane filtration unit 100_3 in the preceding stage controls the liquid amount in the first storage tank 101 thereof (the first membrane filtration unit 100_3 in the preceding stage) based on a preceding-stage measurement value from the first liquid scale 114 thereof (the first membrane filtration unit 100_3 in the preceding stage) and a subsequent-stage measurement value from the second liquid scale 214 of the second membrane filtration unit 200 in its subsequent stage.

The second controller unit 215 of the second membrane filtration unit 200 in the last stage controls the liquid amount in the second storage tank 201 thereof (the second membrane filtration unit 200) based on the subsequent-stage measurement value from the second liquid scale 214 thereof (the second membrane filtration unit 200).

A method of controlling the liquid amounts in the first and second storage tanks 101 and 201 may be the same as that in (Operation example of filtration device) in the first example. Therefore, the detailed descriptions of operations of the first membrane filtration units 100_1 to 100_3 and the second membrane filtration unit 200 are omitted here.

As described above, the effects described in the first example can also be obtained even when four membrane filtration units are arranged to be continuous in series. The number of the membrane filtration units to be arranged to be continuous is not particularly limited and may be five or more.

Arrangement of Adjustment Valve, Flowmeter, and Liquid Delivery Pump

The adjustment valve 108 and the flowmeter 105 as the first adjustment unit are provided in the permeated liquid pipe L12 in the first membrane filtration units 100 in FIGS. 1 to 9. However, the arrangement of the adjustment valve 108 and the flowmeter 105 is not limited thereto.

Further, the single liquid delivery pump 103 is provided in the first membrane filtration unit 100 in FIG. 7. However, the number of liquid delivery pumps and the arrangement thereof are also not limited thereto.

Figure 12:
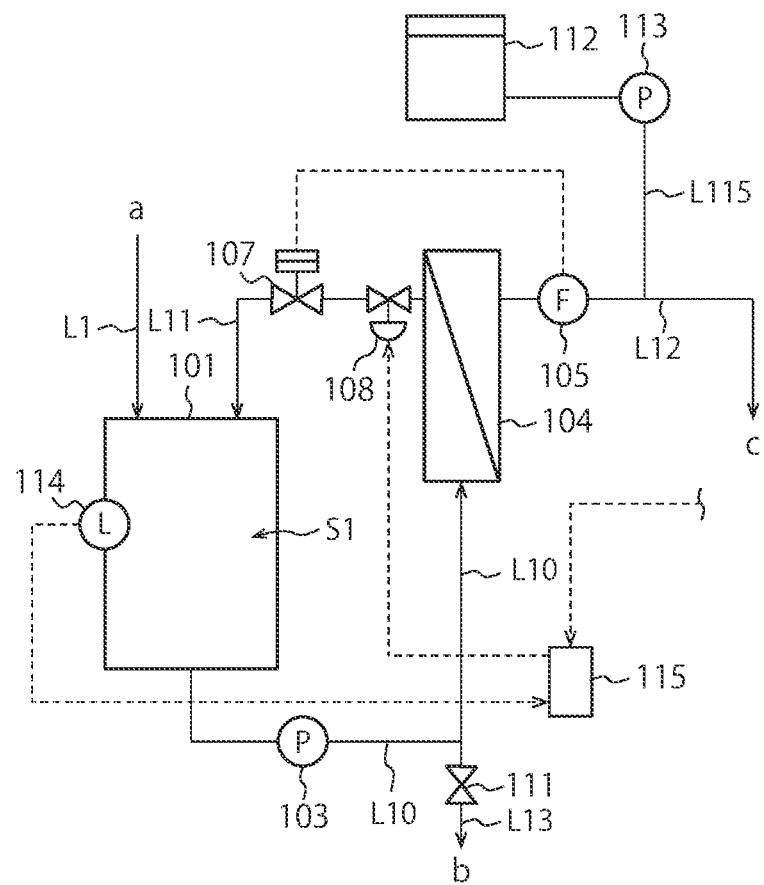
FIG. 12 is a diagram illustrating a modification of an arrangement of an adjustment valve, a flowmeter, and a liquid delivery pump.
Figure 13:
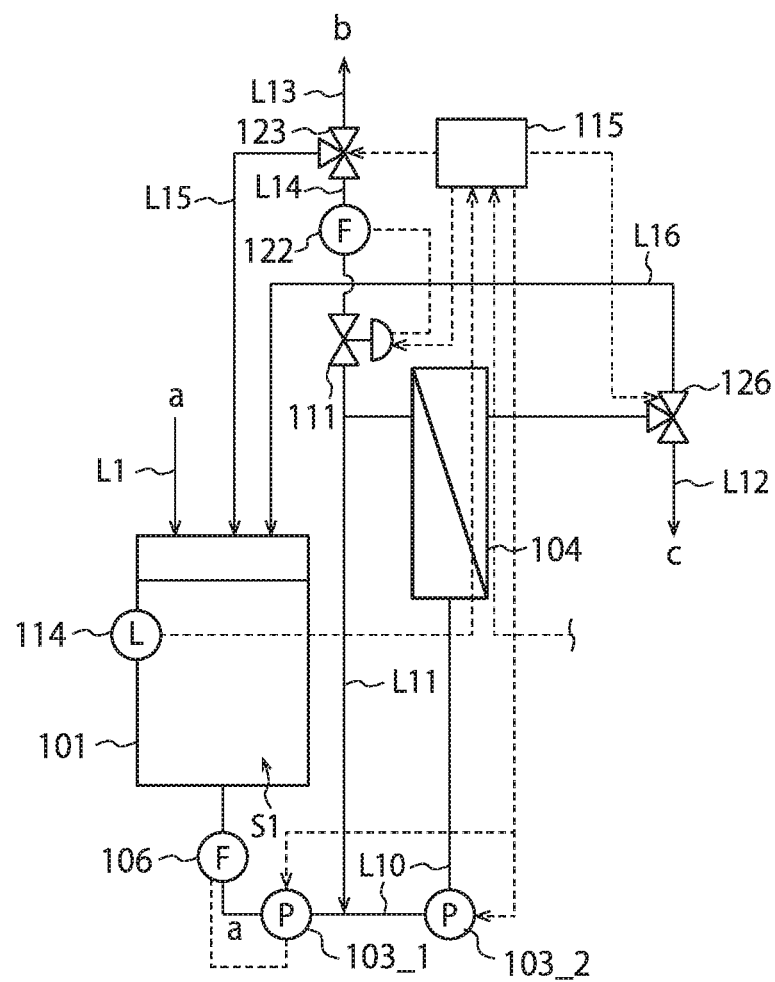
FIG. 13 is a diagram illustrating a modification of the arrangement of the adjustment valve, the flowmeter, and the liquid delivery pump.
Figure 14:
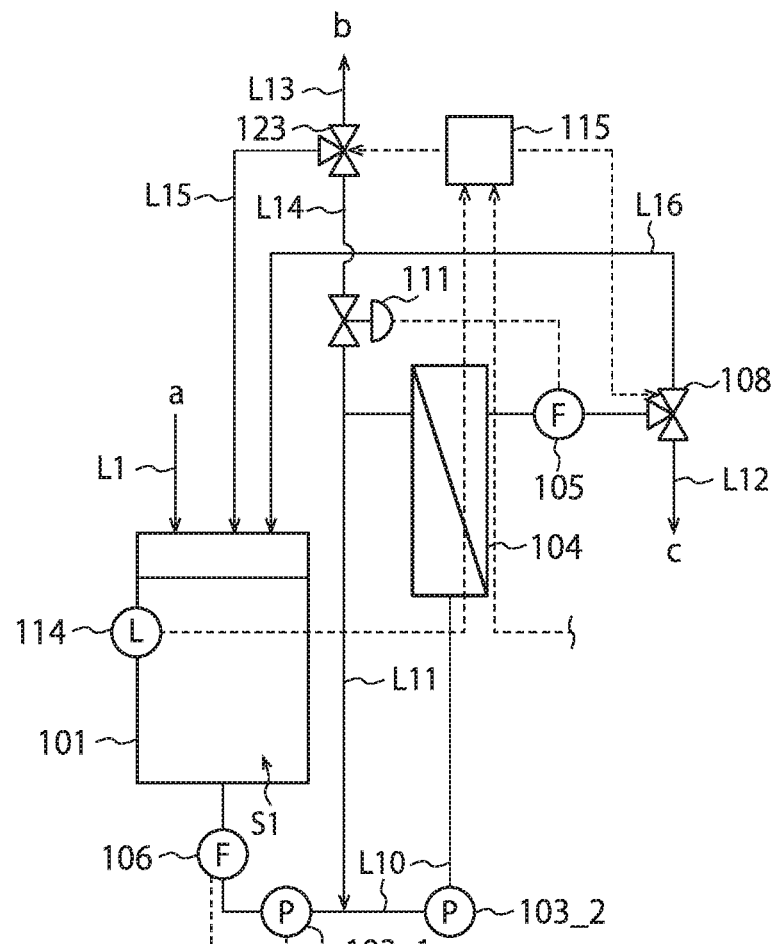
FIG. 14 is a diagram illustrating a modification of the arrangement of the adjustment valve, the flowmeter, and the liquid delivery pump.

FIGS. 12 to 14 are diagrams illustrating modifications of the arrangement of an adjustment valve, a flowmeter, and the liquid delivery pump. For example, as illustrated in FIG. 12, the first adjustment valve 108 may be provided in the first non-permeated liquid pipe L11 and pressurize a non-permeation side based on a flow rate of a permeated liquid of the first flowmeter 105 to adjust the flow rate of the permeated liquid.

For example, as illustrated in the example of FIG. 13, a device configuration called a feed-and-breed method, in general, may be employed. In FIG. 13, two liquid delivery pumps 103_1 and 103_2 and one flowmeter 106 are provided in the first liquid delivery pipe L10. The liquid delivery pump 103_1 and the flowmeter 106 are provided in the first liquid delivery pipe L10 between the first storage tank 101 and the first non-permeated liquid pipe L11. The liquid delivery pump 103_2 is provided in the first liquid delivery pipe L10 between the first non-permeated liquid pipe L11 and the first separation membrane part 104. The liquid delivery pump 103_1 delivers the stored liquid S1 from the first storage tank 101 to the liquid delivery pump 103_2, which in turn delivers the stored liquid S1 and a non-permeated liquid from the first non-permeated liquid pipe L11 together to the first separation membrane part 104, thereby being able to cause circulation.

The flowmeter 106 measures a flow rate of the stored liquid S1 that is caused to flow to the liquid delivery pump 103_1. The liquid delivery pump 103_1 is subjected to feedback control based on the flow rate of the stored liquid S1 measured by the flowmeter 106, thereby adjusting the flow rate of the stored liquid S1. In this manner, the flow rate of the stored liquid S1 may be adjusted by controlling the liquid delivery pump 103_1. The liquid delivery pump 103_1 is controlled to make the flow rate of the stored liquid S1 the same as a total of the extraction amount of the first non-permeated liquid and the amount of the first permeated liquid so that the first membrane filtration unit 100 is balanced. It is preferable that the liquid delivery pump 103_2 increases a circulating flow rate irrespective of the delivered liquid amount of the liquid delivery pump 103_1. Accordingly, a membrane-surface linear velocity is increased, and clogging of a membrane can be prevented.

Further, the flowmeter 122 measures a flow rate of a non-permeated liquid extracted from the first extraction pipe L13. The first extraction valve 111 is subjected to feedback control based on the flow rate of the non-permeated liquid measured by the flowmeter 122, thereby adjusting the extraction amount b of the non-permeated liquid.

In this manner, the amount c of the permeated liquid may be substantially adjusted by adjusting the flow rate a of the stored liquid S1 caused to flow through the first liquid delivery pipe L10 by using the liquid delivery pump 103_1 and adjusting the extraction amount b of the non-permeated liquid by using the first extraction valve 111.

For example, in the example illustrated in FIG. 14, the flowmeter 122 is omitted and the flowmeter 105 is provided in the first permeated liquid pipe L12. The flowmeter 105 measures a flow rate of the first permeated liquid flowing through the first permeated liquid pipe L12. The first extraction valve 111 is subjected to feedback control based on the amount c of the permeated liquid measured by the flowmeter 105, thereby adjusting the extraction amount b of the non-permeated liquid.

Other configurations and operations of the first membrane filtration unit 100 illustrated in FIG. 14 may be identical to those illustrated in FIG. 11. With this configuration, the amount c of the permeated liquid may be substantially adjusted by adjusting the flow rate a of the stored liquid S1 caused to flow to the first liquid delivery pipe L10 by using the liquid delivery pump 103_1 and adjusting the extraction amount b of the non-permeated liquid by using the first extraction valve 111.

The arrangement examples of the adjustment valve, the flowmeter, and the liquid delivery pump illustrated in FIGS. 12 to 14 can also be applied to the second membrane filtration unit 200.

Configuration of Separation Membrane Part

Figure 15:
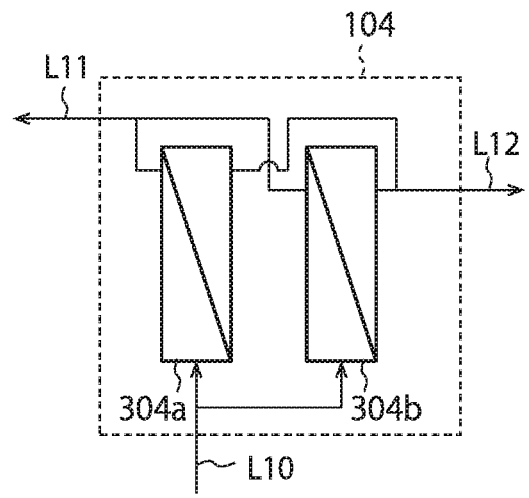
FIG. 15 is a diagram illustrating a configuration of a first separation membrane part and a second separation membrane part.
Figure 16:
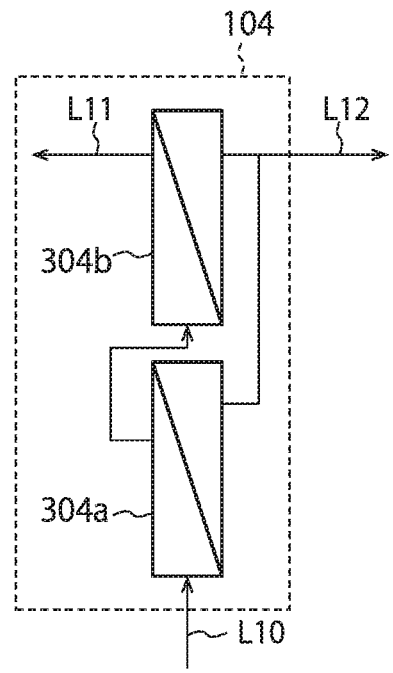
FIG. 16 is a diagram illustrating a configuration of the first separation membrane part and the second separation membrane part.

FIGS. 15 and 16 are diagrams illustrating a configuration of the first and second separation membrane parts 104 and 204. Each of the first and second separation membrane parts 104 and 204 may be formed by a single filtration membrane or may be a separation membrane module formed by a plurality of filtration membranes in accordance with the treatment amount, as illustrated in FIGS. 15 and 16.

For example, FIG. 15 illustrates the first separation membrane part 104 including two filtration membranes 304a and 304b connected in parallel. The filtration membranes 304a and 304b are connected to each of the first liquid delivery pipe L10, the first non-permeated liquid pipe L11, and the first permeated liquid pipe L12 in parallel. With this configuration, the first separation membrane part 104 can treat a large amount of the stored liquid S1 efficiently in a short time.

For example, FIG. 16 illustrates the first separation membrane part 104 including the two filtration membranes 304a and 304b that are connected in series. The filtration membrane 304a is connected to the first liquid delivery pipe L10 and receives the stored liquid S1. The filtration membrane 304b is connected to the filtration membrane 304a and receives a non-permeated liquid from the filtration membrane 304a. The filtration membrane 304b is connected to the first non-permeated liquid pipe L11 and causes the first non-permeated liquid that has not been permeated through both the filtration membranes 304a and 304b to flow to the first non-permeated liquid pipe L11.

Meanwhile, the filtration membranes 304a and 304b are connected to the first permeated liquid pipe L12 in parallel and cause the first permeated liquid that has been permeated through either the filtration membrane 304a or 304b to flow to the first permeated liquid pipe L12.

The number of filtration membranes connected in parallel or in series in the first separation membrane part 104 may be three or more. In addition, it is preferable that the types (the pore diameters) of the filtration membranes in the same first separation membrane part 104 are substantially equal to obtain a homogeneous permeated or non-permeated liquid. The examples of the separation membrane module illustrated in FIGS. 15 and 16 can also be applied to the second separation membrane part 204. However, to extract a desired material, the first separation membrane part 104 and/or the second separation membrane part 204 may be configured by combining different types of filtration membranes. The first separation membrane part 104 and/or the second separation membrane part 204 may be configured by combining the configurations in FIGS. 15 and 16 in parallel and in series.

Figure 17:
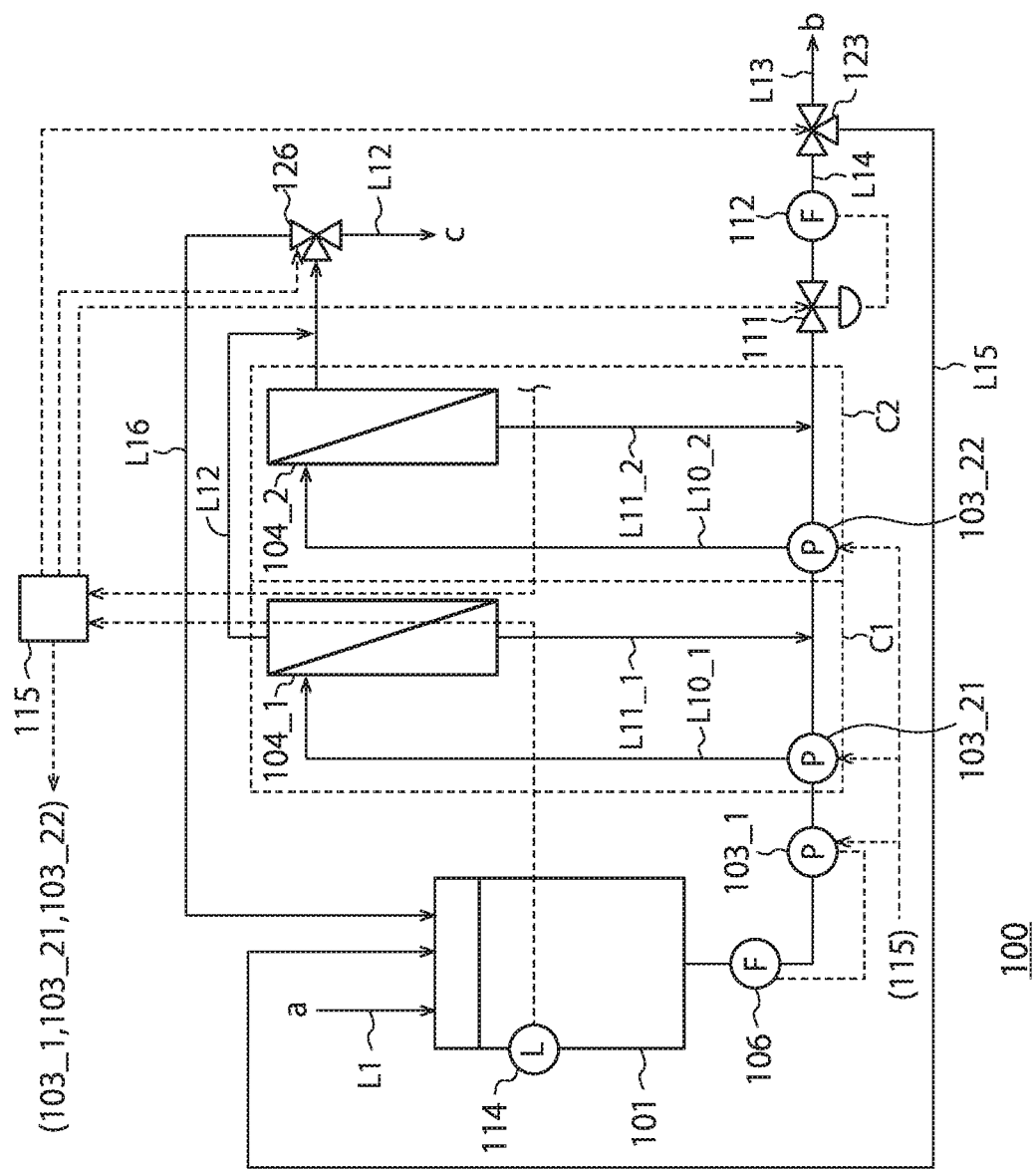
FIG. 17 is a diagram illustrating a configuration of a first membrane filtration unit including a plurality of circulation systems each configured by the first separation membrane part and the liquid delivery pump.

FIG. 17 is a diagram illustrating a configuration of the first membrane filtration unit 100 including a plurality of circulation systems C1 and C2 each configured by the first separation membrane part 104 and the liquid delivery pump 103_2. In general, this configuration is called a stage in series type.

The circulation system C1 is configured by a liquid delivery pump 103_21, a first separation membrane part 104_1, a first liquid delivery pipe L10_1, and a first non-permeated liquid pipe L11_1. The first non-permeated liquid pipe L11_1 returns a non-permeated liquid to between the liquid delivery pump 103_21 of the circulation system C1 and a liquid delivery pump 103_22 of the circulation system C2. Thus, the circulation system C1 can separate a permeated liquid from the stored liquid S1 and can also concentrate a non-permeated liquid and supply the concentrated non-permeated liquid to the circulation system C2.

The circulation system C2 is configured by the liquid delivery pump 103_22, a first separation membrane part 104_2, a first liquid delivery pipe L10_2, and a first non-permeated liquid pipe L11_2. The circulation system C2 basically has the same configuration as the circulation system C1. The circulation system C2 can further separate a permeated liquid from the concentrated non-permeated liquid received from the circulation system C1 and can also concentrate that concentrated non-permeated liquid. The non-permeated liquid concentrated in the circulation system C2 is extracted through the extraction/returning pipe L14 and the first extraction pipe L13 or is returned to the first storage tank 101 through the non-permeated liquid returning pipe L15.

Other configurations of the first membrane filtration unit 100 in FIG. 17 may be identical to corresponding configurations of the first membrane filtration unit 100 in FIG. 14. Although the positions of the extraction/returning pipe L14, the first extraction pipe L13, and the return valve 123 in FIG. 17 are different from those in FIG. 14, operations thereof are identical to operations of the extraction/returning pipe L14, the first extraction pipe L13, and the return valve 123 in FIG. 14.

An example of the membrane filtration unit in FIG. 17 can also be applied to the second membrane filtration unit 200.

Seventh Example

Figure 18:
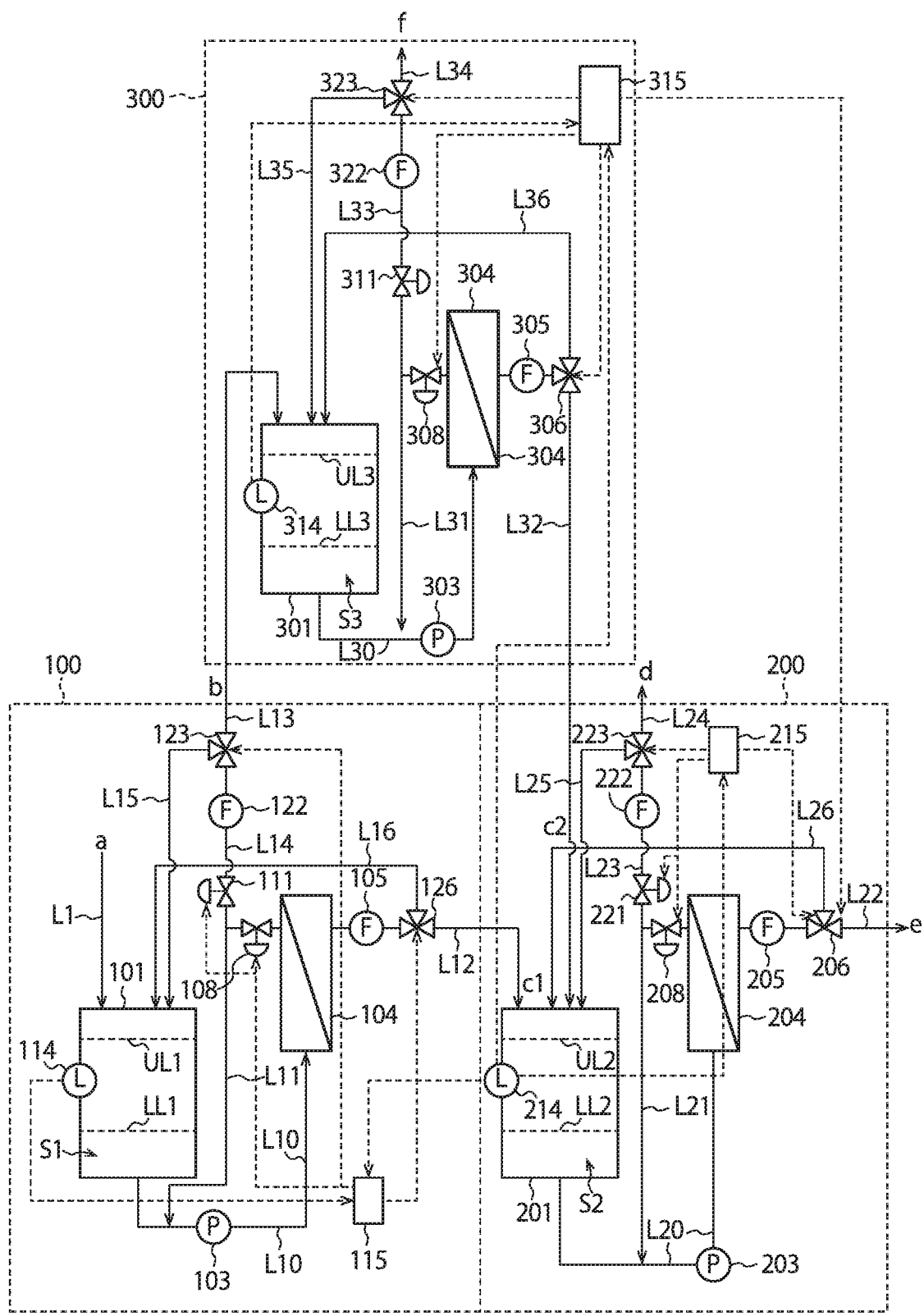
FIG. 18 is a diagram illustrating a configuration of a filtration device according to a seventh example.

FIG. 18 is a diagram illustrating a configuration of a filtration device according to a seventh example. A third membrane filtration unit 300 is further provided in the seventh example. The third membrane filtration unit 300 is connected to the first membrane filtration unit 100 and the second membrane filtration unit 200, and filtrates the first non-permeated liquid from the first membrane filtration unit 100 with a third separation membrane part 304 and supplies its permeated liquid (a third permeated liquid) to the second membrane filtration unit 200. That is, the third membrane filtration unit 300 is connected in parallel to the membrane filtration unit 100. The second membrane filtration unit 200 receives permeated liquids (the first and third permeated liquids) from both the first and third membrane filtration units 100 and 300. Other configurations of the seventh example are identical to corresponding configurations of the third example. Parallel connection of membrane filtration units refers to a state where a plurality of membrane filtration units connected in parallel filtrate a non-permeated liquid from a preceding membrane filtration unit in parallel and are then caused to flow to a subsequent one of the membrane filtration units.

Configuration of Third Membrane Filtration Unit 300

The third membrane filtration unit 300 includes a third storage tank 301, a third liquid delivery pump 303, the third separation membrane part 304, a flowmeter 305, an adjustment valve 308, a third extraction valve 311, a flowmeter 322, return values 306 and 323, a third liquid scale 314, a third controller unit 315, a third liquid delivery pipe L30, a third non-permeated liquid pipe L31, a third permeated liquid pipe L32, an extraction/returning pipe L33, a third extraction pipe L34, a non-permeated liquid returning pipe L35, and a permeated liquid returning pipe L36.

The third storage tank 301 is a tank for storing therein the first non-permeated liquid from the first extraction pipe L13, as a stored liquid S3.

The third liquid delivery pump 303 is provided between the third storage tank 301 and the third separation membrane part 304 and causes the stored liquid S3 to flow from the third storage tank 301 to the third membrane separation part 304 through the third liquid delivery pipe L30. The third liquid delivery pump 303 may be a high-pressure pump that applies pressure to the stored liquid S3 in the third liquid delivery pipe L30, for example. The third liquid delivery pipe L30 is connected between the third storage tank 301 and the third separation membrane part 304 and delivers the stored liquid S3 in the third storage tank 301 from the third storage tank 301 to the third separation membrane part 304.

The third separation membrane part 304 separates the stored liquid S3 from the third liquid delivery pipe L30 into the third permeated liquid and the third non-permeated liquid. The third separation membrane part 304 may be any of an MF membrane, a UF membrane, an NF membrane, and an RO membrane, similarly to the first separation membrane part 104. However, it is preferable that the third separation membrane part 304 has the same pore diameter as that of the first separation membrane part 104 because the third separation membrane part 304 filtrates the stored liquid S3. With this configuration, the third separation membrane part 304 can separate components to be separated by the first separation membrane part 104, from the stored liquid S3 (the first non-permeated liquid) again.

For example, when using UF membranes as the first and third separation membrane parts 104 and 304, the first separation membrane part 104 separates protein and sugar as the first non-permeated liquid and the first permeated liquid, respectively, from the stored liquid S1. Further, the third separation membrane part 304 also separates from the first non-permeated liquid, protein as the third non-permeated liquid and sugar (for example, monosaccharide, oligosaccharide, and polysaccharide), aromatic compounds and the like as the third permeated liquid.

In the first membrane filtration unit 100, protein in the stored liquid S1 is delivered to the first non-permeated liquid pipe L11 or the extraction/returning pipe L13 as the first non-permeated liquid, and sugar is delivered to the second membrane filtration unit 200 through the first permeated liquid pipe L12 as the first permeated liquid. In the third membrane filtration unit 300, protein in the first non-permeated liquid is delivered to the third non-permeated liquid pipe L31 or the extraction/returning pipe L33 as the third non-permeated liquid, and sugar is delivered to the second membrane filtration unit 200 through the third permeated liquid pipe L32 as the third permeated liquid. In this manner, both the first and third permeated liquids containing sugar obtained by the first and third membrane filtration units 100 and 300 are stored in the second storage tank 201 of the second membrane filtration unit 200 as the stored liquid S2. Accordingly, a recovery rate of sugar from a liquid to be treated is increased.

Where using an NF membrane or an RO membrane as the second separation membrane part 204, the second separation membrane part 204 can separate sugar from the stored liquid S2 as the second non-permeated liquid. Sugar is delivered to the second non-permeated liquid pipe L21 or the extraction/returning pipe L23 mainly as the non-permeated liquid, and the other components are delivered to the second permeated liquid pipe L22 as the second permeated liquid.

The second storage tank 201 stores therein not only the first permeated liquid from the first membrane filtration unit 100 but also the third permeated liquid from the third membrane filtration unit 300. As described above, the first membrane filtration unit 100 permeates sugar from the stored liquid S1 to obtain the first permeated liquid and allows protein to remain in the first non-permeated liquid. However, sugar that has not been permeated through the first separation membrane part 104 also remains in the first non-permeated liquid to some extent. Therefore, the third membrane filtration unit 300 filtrates a portion of the first non-permeated liquid in the third separation membrane part 304, thereby separating sugar from the first non-permeated liquid again. Accordingly, sugar contained in the first non-permeated liquid is recovered as the third permeated liquid and is supplied to the second membrane filtration unit 200. Thus, the second membrane filtration unit 200 can receive not only sugar contained in the first permeated liquid but also sugar contained in the third permeated liquid. Accordingly, a recovery rate of sugar from a liquid to be treated is increased.

More specifically, when the second storage tank 201 receives only the first permeated liquid from the first membrane filtration unit 100 as in the third example, the second membrane filtration unit 200 can only recover sugar contained only in the first permeated liquid. Therefore, if the first separation membrane part 104 (for example, a UF membrane) permeates, for example, about 80% of sugar contained in a liquid to be treated, the remaining sugar of about 20% cannot be recovered, although a recovery rate depends on a separation performance of the first separation membrane part 104.

Meanwhile, according to the seventh example, the third membrane filtration unit 300 filtrates the first non-permeated liquid again to permeate sugar and supplies it as the third permeated liquid to the second storage tank 201. For example, if the third separation membrane part 304 (for example, a UF membrane) permeates, for example, about 50% of sugar contained in the first permeated liquid (about 20% of sugar contained in the liquid to be treated), about 10% of sugar contained in the non-permeated liquid can be further recovered. That is, in this example, about 90% (80%+10%) of sugar contained in the liquid to be treated is contained in the stored liquid S2 in the second storage tank 201. Accordingly, a recovery rate of sugar is increased in the second membrane filtration unit 200.

The third separation membrane part 304 may also be formed by a single filtration membrane or a filtration membrane module obtained by combining a plurality of filtration membranes to each other, similarly to the first separation membrane part 104. In addition, when using the filtration membrane module as the third separation membrane part 304, the filtration membranes may be formed by filtration membranes of a single type or may be a combination of filtration membranes of a plurality of types.

The third non-permeated liquid pipe L31 is arranged to return the third non-permeated liquid from the third separation membrane part 304 to the third liquid delivery pipe L30 between the third storage tank 301 and the third liquid delivery pump 303. Further, the extraction/returning pipe L33 is connected to the third non-permeated liquid pipe L31, and a portion of the third non-permeated liquid is delivered to the third extraction pipe L34 or the non-permeated liquid returning pipe L35. The third extraction valve 311 is provided in the extraction/returning pipe L33. The return valve 323 is connected to the extraction/returning pipe L33, the third extraction pipe L34, and the non-permeated liquid returning pipe L35. The return valve 323 is, for example, a three-way valve, and can cause the third non-permeated liquid from the extraction/returning pipe L33 to flow to the third extraction pipe L34 or the non-permeated liquid returning pipe L35. The flowmeter 322 measures a flow rate of the third non-permeated liquid flowing through the extraction/returning pipe L33. A portion of the third non-permeated liquid is extracted to outside of the filtration device through the extraction/returning pipe L33 and the third extraction pipe L34.

The third non-permeated liquid extracted to outside may be used as a product or may be used in other processes. Meanwhile, the remaining portion of the third non-permeated liquid is returned to the third liquid delivery pipe L30 via the third non-permeated liquid pipe L31 or to the third storage tank 301 via the non-permeated liquid returning pipe L35. The third non-permeated liquid returned to the third liquid delivery pipe L30 or the third storage tank 301 is delivered again to the third separation membrane part 304 as the stored liquid S3.

The stored liquid S3 is caused to circulate between the third liquid delivery pipe L30 (the third non-permeated liquid pipe L31) and the third separation membrane part 304, and its concentration of organic matter (protein) is concentrated in the third liquid delivery pipe L30 and the third non-permeated liquid pipe L31. Since the third liquid delivery pipe L30 is smaller in volume than the third storage tank 301, the stored liquid S3 is concentrated more quickly when being returned to the third liquid delivery pipe L30 than when being returned to the third storage tank 301. However, when the flow rate (b) of the first non-permeated liquid from the first extraction pipe L13, a flow rate of the third non-permeated liquid extracted from the third extraction pipe L34 (an extraction amount f of the third non-permeated liquid), and a flow rate of the third permeated liquid flowing from the third permeated liquid pipe L32 to outside of the third membrane filtration unit 300 (the amount e of the third permeated liquid) are constant, a concentration of organic matter (protein) in the first non-permeated liquid in the third liquid delivery pipe L30 and the third non-permeated liquid pipe L31 is concentrated and thereafter becomes substantially constant. Therefore, although the third non-permeated liquid extracted from the third extraction pipe L34 is concentrated more than the first non-permeated liquid from the first extraction pipe L13, it has a substantially constant organic concentration. That is, the third non-permeated liquid is a concentrated liquid having a substantially constant organic concentration and is extracted from the third membrane filtration unit 300 at a substantially constant flow rate. Accordingly, it is possible to operate the filtration device continuously for a longer time.

The third permeated liquid pipe L32 is arranged to deliver the third permeated liquid from the third separation membrane part 304 to the second storage tank 201 of the second membrane filtration unit 200 in the subsequent stage. The third permeated liquid pipe L32 is provided with the flowmeter 305 and the adjustment valve 308 as a third adjustment unit. The flowmeter 305 measures a flow rate of a permeated liquid flowing through the permeated liquid pipe L32 and the permeated liquid returning pipe L36. A measurement value of the flow rate of the permeated liquid is used for executing feedback control for the adjustment valve 308 via the third controller unit 315. By the feedback control, the adjustment valve 308 is adjusted to make the flow rate of the permeated liquid flowing through the third permeated liquid pipe L32 substantially constant.

The return valve 306 and the permeated liquid returning pipe L36 are connected to the third permeated liquid pipe L32 so that it is possible to return the third permeated liquid that flows in the third permeated liquid pipe L32 to the third storage tank 301. The return valve 306 is, for example, a three-way valve, is connected between the third permeated liquid pipe L32 and the permeated liquid returning pipe L36, and can cause the third permeated liquid to flow to the third permeated liquid pipe L32 or to the permeated liquid returning pipe L36. It suffices that the return valve 306 can change a flow between the third permeated liquid pipe L32 and the permeated liquid returning pipe L36, and the return valve 306 may include two two-way valves in place of a three-way valve.

The third liquid scale 314 is provided in the third storage tank 301 and detects the amount of the first non-permeated liquid S3 stored in the third storage tank 301. For example, the third liquid scale 314 may be a liquid level meter that detects the liquid level height of the first non-permeated liquid S3 in the third storage tank 301. The amount of the first non-permeated liquid S3 in the third storage tank 301 can be expressed as a function of the liquid level height of the first non-permeated liquid S3. Therefore, the third controller unit 315 can use the liquid level height of the first non-permeated liquid S3 as an indicator of the amount of the first non-permeated liquid S3 in the third storage tank 301. Further, the third liquid scale 314 may be a mass measurement device that detects the mass of the first non-permeated liquid S3 in the third storage tank 301, for example. The amount of the first non-permeated liquid S3 in the third storage tank 301 can be expressed as a function of the mass of the first non-permeated liquid S3. Therefore, the third controller unit 315 can use the mass of the first non-permeated liquid S3 as an indicator of the amount of the first non-permeated liquid S3 in the third storage tank 301.

The third controller unit 315 controls the amount of the stored liquid S3 stored in the third storage tank 301 based on a measurement value from the third liquid scale 314 and a measurement value from the second liquid scale 214 of the second membrane filtration unit 200 in its subsequent stage.

For example, it is assumed that the second and third liquid scales 214 and 314 are liquid level meters. When the liquid level of the first non-permeated liquid S3 in the third storage tank 301 becomes lower than a lower limit level LL3, the third controller unit 315 controls the return valve 306 to cause the third permeated liquid to flow to permeated liquid returning pipe L36 and return it to the third storage tank 301. The third controller unit 315 controls the third extraction valve 311 and the return valve 323 to return the third non-permeated liquid to the third storage tank 301 through the extraction/returning pipe L33 and the non-permeated liquid returning pipe L35. At this time, the non-permeated liquid valve 308 is open, and the return valve 323 connects the extraction/returning pipe L33 and the non-permeated liquid returning pipe L35 to each other. Thus, all the third permeated liquid and the third non-permeated liquid from the third liquid delivery pipe L30 are returned to the third storage tank 301. That is, the third membrane filtration unit 300 stops liquid delivery for filtration and causes the stored liquid S3 to circulate between the third storage tank 301 and the third separation membrane part 304. By this circulation, it is possible to adjust the liquid amount in the third storage tank 301 while control of a flow rate in a membrane is continued. In particular, when high pressure is required during filtration, this configuration is preferable because it is possible to make a flow rate stable immediately after liquid delivery for filtration is resumed and to perform stable constant flow-rate filtration, by maintaining control of the flow rate in the membrane. Further, the liquid level in the third storage tank 301 can be raised by causing the third permeated liquid or the third non-permeated liquid to circulate. Furthermore, by stopping liquid delivery for filtration, clogging of the third separation membrane part 304 can be suppressed, and the third separation membrane part 304 can be used stably for a longer time.

Meanwhile, when the liquid level in the third storage tank 301 becomes higher than an upper limit level UL3, it suffices that a supply amount of the first non-permeated liquid from the first membrane filtration unit 100 to the third storage tank 301 is reduced or the supply is stopped.

Operations of the controller units 115 and 315 may be identical to those in the third example. Therefore, when the liquid level of the stored liquid S2 in the second storage tank 201 becomes higher than the upper limit level UL2, the first controller unit 115 may close the first adjustment valve 108 to stop a flow of the first permeated liquid from the first permeated liquid pipe L12 to the second membrane filtration unit 200, or/and the third controller unit 315 may control the return valve 306 to cause the third permeated liquid to flow to the permeated liquid returning pipe L36 and return it to the third storage tank 301 and stop a flow of the third permeated liquid from the third permeated liquid pipe L32 to the second membrane filtration unit 200. At this time, the second membrane filtration unit 200 continues filtration, the second permeated liquid flows to outside and the second non-permeated liquid is extracted. As a result, the liquid level in the second storage tank 201 can be lowered.

As described above, the filtration device according to the seventh example adjusts the amounts of the stored liquids S1 to S3 in the storage tanks 101 to 301, caused by a flow-rate deviation in constant flow-rate filtration, with a flow of a permeated liquid or a non-permeated liquid based on measurement values from the liquid scales 114 to 314. Thus, it is possible to correct a deviation of the amounts of the stored liquids S1 to S3 in the storage tanks 101 to 301, caused by a slight flow-rate deviation in a constant flow-rate filtration device. By correcting the deviation of liquid amount, the amounts of the stored liquids S1 to S3 in the storage tanks 101 to 301 become stable so that it is possible to suppress the stored liquids S1 to S3 from overflowing from the storage tanks 101 to 301 or being depleted. Therefore, the filtration device can continue to stably filtrate a liquid to be treated at a constant flow rate.

In addition, the first and second membrane filtration units 100 and 200 have identical configurations to those in the third example. Further, the third membrane filtration unit 300 receives a portion of the first non-permeated liquid from the first membrane filtration unit 100 and supplies the third permeated liquid after being separated to the second membrane filtration unit 200. Accordingly, the second membrane filtration unit 200 can receive not only sugar contained in the first permeated liquid but also sugar contained in the third permeated liquid. Consequently, a recovery rate of sugar from a liquid to be treated is increased in the second membrane filtration unit 200.

Further, the first separation membrane part 104 (for example, a UF membrane) separates sugar from protein and returns protein to the first storage tank 101 as the first non-permeated liquid. When protein is concentrated in the first storage tank 101, the fluidity of the stored liquid S1 is lowered and the first separation membrane part 104 causes clogging in a short time. In this configuration, it is difficult to operate the filtration device continuously for a long time.

Meanwhile, according to the seventh example, the third membrane filtration unit 300 receives a portion of the first non-permeated liquid and separates protein again. Thus, not only the first membrane filtration unit 100 but also the third membrane filtration unit 300 separates protein. Accordingly, it is possible to reduce clogging of the first membrane filtration unit 100 and operate the filtration device continuously for a longer time.

Further, the adjustment valve 308 is controlled to make a value of the flowmeter 305 substantially constant, and the adjustment valve 311 is controlled to make a value of the flowmeter 322 substantially constant. Therefore, by setting flow rates to satisfy "the extraction amount b of the first non-permeated liquid from the first membrane filtration unit 100=the amount c2 of the third permeated liquid+the extraction amount f of the third non-permeated liquid", that is, "the amount to be supplied=the amount to be extracted (b=c2+f)", the third membrane filtration unit 300 can treat the liquid to be treated at a substantially constant amount, a value of the third liquid scale 314 can become substantially constant, and constant flow-rate filtration can be stably continued.

Furthermore, by setting flow rates to satisfy "the amount to be supplied=the amount to be extracted (a=b+c1, c1+c2=d+e)" also in the first and second membrane filtration units 100 and 200, the entire filtration device can stably continue constant flow-rate filtration. c1 is the amount of the first permeated liquid from the first membrane filtration unit 100 to the second membrane filtration unit 200. c2 is the amount of the third permeated liquid from the third membrane filtration unit 300 to the second membrane filtration unit 200. f is the extraction amount of the non-permeated liquid from the third membrane filtration unit 300.

The third membrane filtration unit 300 according to the seventh example can be added to any of the first to sixth examples. Accordingly, effects of the seventh example can be added to the first to sixth examples.

Eighth Example

Figure 19:
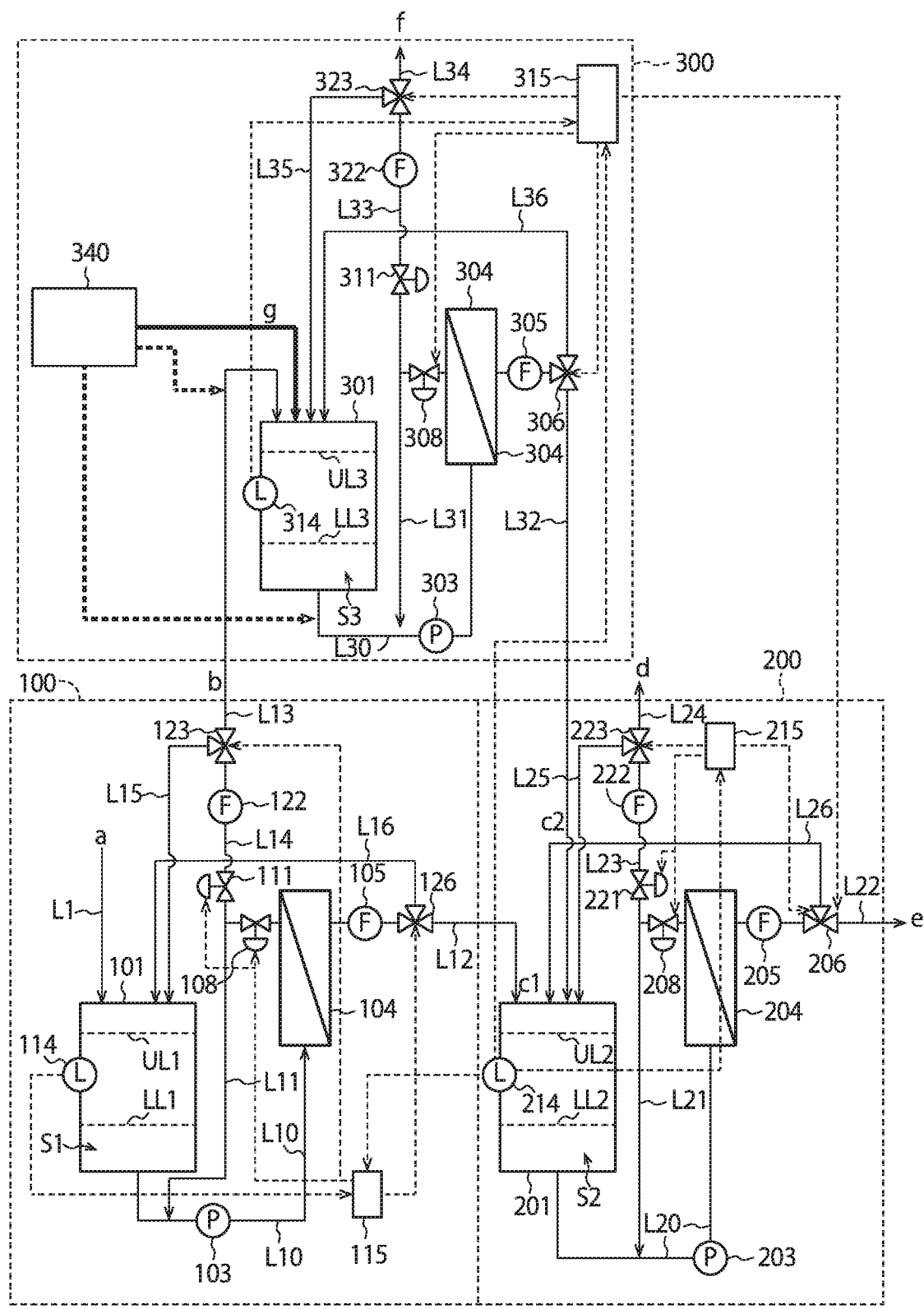
FIG. 19 is a diagram illustrating a configuration of a filtration device according to an eighth example.

FIG. 19 is a diagram illustrating a configuration of a filtration device according to an eighth example. The third membrane filtration unit 300 in the eighth example is different from that in the seventh example in further including a water-adding part 340. The water-adding part 340 as a third water-adding part supplies water to the stored liquid (the first non-permeated liquid) S3 in the third storage tank 301.

The first and third separation membrane parts 104 and 304 (for example, UF membranes) each separate sugar from protein and cause the first non-permeated liquid containing protein to flow to the first or third storage tank 101 or 301. When protein is concentrated in the first and third storage tanks 101 and 301, the fluidity of the stored liquid S1 is lowered, and the first or third separation membrane part 104 or 304 can easily cause clogging in a short time. In particular, the third storage tank 301 stores therein the first non-permeated liquid from the first membrane filtration unit 100 as the stored liquid S3, and therefore the protein concentration can be easily raised. In this configuration, it is difficult to operate the filtration device continuously for a long time.

Meanwhile, the water-adding part 340 adds water to the stored liquid S3 in the eighth example. Accordingly, the fluidity of the stored liquid S3 is increased, and the stored liquid S3 can easily pass through the third separation membrane part 304. Clogging of the third separation membrane part 304 can be reduced so that it is possible to separate sugar in the stored liquid S3 from protein continuously for a long time. That is, it is possible to operate the filtration device continuously for a longer time. In particular, providing a water-adding part is effective when sugar is extracted from a liquid to be treated containing much turbidity, for example, a juice extract of sugarcane or the like, a liquid to be treated of which material is a non-edible resource such as sugarcane bagasse and which has been subjected to chemical treatment, enzymolysis or the like.

Further, assuming that the amount of water supplied by the water-adding part 340 is g, flow rates are set to satisfy b+g=c2+f. Accordingly, the filtration device can continue constant flow-rate filtration stably. Further, it suffices that water is supplied to the stored liquid (the first non-permeated liquid) S3, and the water-adding part 340 may be connected to any of the third storage tank 301, the first extraction pipe L13, the third liquid delivery pipe L30, the non-permeated liquid returning pipe L35, and/or the permeated liquid returning pipe L36. Broken lines in FIG. 19 represent that water is supplied to the first extraction pipe L13 or the third liquid delivery pipe L30.

In this manner, in the filtration device according to the eighth example, not only the amounts of the stored liquids S1 to S3 in the storage tanks 101, 201, and 301 are adjusted based on measurement values of the liquid scales 114, 214, and 314, but also the water-adding part 340 adds water to the stored liquid S3. Accordingly, the filtration device according to the eighth example can continue constant flow-rate filtration more stably for a long time.

Other configurations of the eighth example may be identical to corresponding configurations of the seventh example. Therefore, the eighth example can also obtain the effects of the seventh example.

In the seventh and eighth examples, the third membrane filtration unit 300 is provided between the first membrane filtration unit 100 and the second membrane filtration unit 200. In this configuration, the third membrane filtration unit 300 receives the first non-permeated liquid from the first membrane filtration unit 100 in its preceding stage and supplies the third permeated liquid to the second membrane filtration unit 200 in its subsequent stage. When the plural first membrane filtration units 100 are continuously connected to each other as illustrated in FIGS. 10 and 11, the third membrane filtration unit 300 may be provided between the continuous two first membrane filtration units 100. In this configuration, the third membrane filtration unit 300 receives the first non-permeated liquid from the first membrane filtration unit 100 in the preceding stage and supplies the third permeated liquid to the first membrane filtration unit 100 in the subsequent stage. Even in this configuration, effects of the seventh and eighth examples are not lost.

Ninth Example

Figure 20:
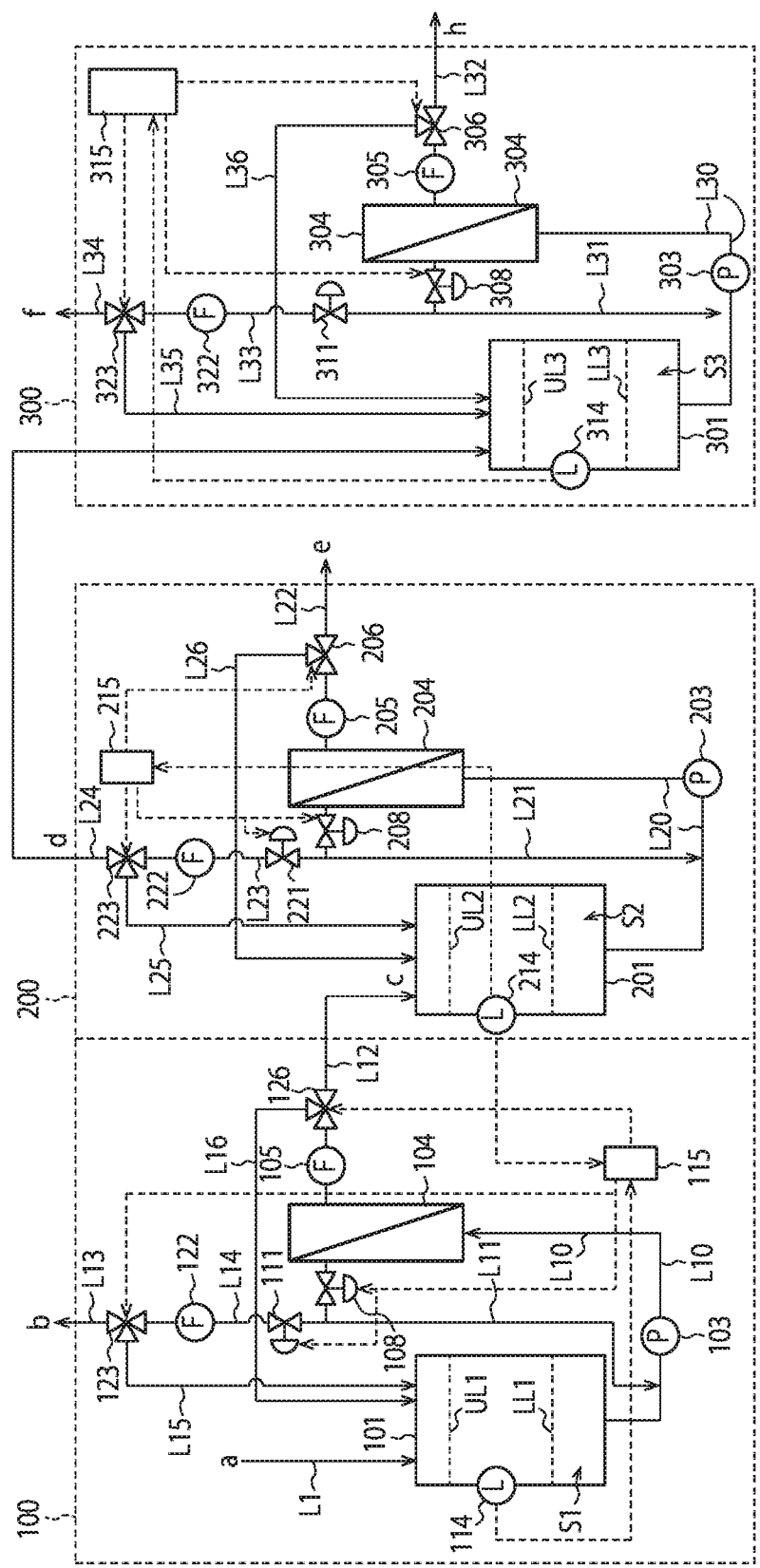
FIG. 20 is a diagram illustrating a configuration of a filtration device according to a ninth example.

FIG. 20 is a diagram illustrating a configuration of a filtration device according to a ninth example. In the ninth example, the third membrane filtration unit 300 is provided in parallel to the second membrane filtration unit 200. Internal configurations of the third membrane filtration unit 300 are basically the same as those of the seventh example.

The third membrane filtration unit 300 receives the second non-permeated liquid from the second membrane filtration unit 200 and stores it in the third storage tank 301.

The third separation membrane part 304 separates the second non-permeated liquid into the third permeated liquid and the third non-permeated liquid. The third separation membrane part 304 may be any of an MF membrane, a UF membrane, an NF membrane, and an RO membrane, similarly to the second separation membrane part 204. However, it is preferable that the third separation membrane part 304 has the same pore diameter as the second separation membrane part 204 because the third separation membrane part 304 filtrates the second non-permeated liquid. With this configuration, the third separation membrane part 304 can separate components to be separated by the second separation membrane part 204, from the second non-permeated liquid again.

For example, when using NF membranes as the second and third separation membrane parts 204 and 304, the second separation membrane part 204 can separate sugar components (for example, monosaccharide and oligosaccharide) and aromatic compounds from the first permeated liquid as the second non-permeated liquid, and other components (for example, water, salts, low molecular organic acids) as the second permeated liquid. The third separation membrane part 304 can also separate sugar from the second non-permeated liquid as the third non-permeated liquid and other components as the third permeated liquid.

In the second membrane filtration unit 200, the second non-permeated liquid delivered to the extraction/returning pipe L23 is delivered to the third membrane filtration unit 300 through the second extraction pipe L24. In the third membrane filtration unit 300, sugar in the second non-permeated liquid is delivered to the third non-permeated liquid pipe L31 or the extraction/returning pipe L33 as the third non-permeated liquid, and other components are extracted to outside of the third membrane filtration unit 300 through the third permeated liquid pipe L32 as the third permeated liquid. The third permeated liquid is used as a product together with the second permeated liquid or is discarded.

Not only the second storage tank 201 but also the third storage tank 301 stores therein the second non-permeated liquid from the second membrane filtration unit 200. Accordingly, not only the second membrane filtration unit 200 but also the third membrane filtration unit 300 separates sugar from the first permeated liquid and the second non-permeated liquid and concentrate it. Thus, the purity of sugar contained in the first permeated liquid is increased. Further, not only the second storage tank 201 but also the third storage tank 301 permeates water, salts, low molecular organic acids and the like from a liquid to be treated. Therefore, the purity of sugar is further increased.

Furthermore, the adjustment valve 308 is controlled to make a value of the flowmeter 305 substantially constant, and the adjustment valve 311 is controlled to make a value of the flowmeter 322 substantially constant. Therefore, by setting flow rates to satisfy "the extraction amount d of the second non-permeated liquid from the second membrane filtration unit 200=the third permeated liquid amount h+the extraction amount f of the third non-permeated liquid", that is, "the amount to be supplied=the amount to be extracted (d=h+f)", the third membrane filtration unit 300 can treat the second non-permeated liquid at a substantially constant amount, a value of the third liquid scale 314 can become substantially constant, and constant flow-rate filtration can be stably continued.

For example, it is assumed that the third liquid scale 314 is a liquid level meter. When the liquid level of the first non-permeated liquid S3 in the third storage tank 301 becomes lower than the lower limit level LL3, the third controller unit 315 controls the return valve 306 to cause the third permeated liquid to flow to the permeated liquid returning pipe L36 and return it to the third storage tank 301. The third controller unit 315 controls the third extraction valve 311 and the return valve 323 to return the third non-permeated liquid to the third storage tank 301 through the extraction/returning pipe L33 and the non-permeated liquid returning pipe L35. At this time, the non-permeated liquid valve 308 is open, and the return valve 323 connects the extraction/returning pipe L33 and the non-permeated liquid returning pipe L35 to each other. Thus, all the third permeated liquid and the third non-permeated liquid from the third liquid delivery pipe L30 are returned to the third storage tank 301. That is, the third membrane filtration unit 300 stops liquid delivery for filtration and causes the stored liquid S3 to circulate between the third storage tank 301 and the third separation membrane part 304. By this circulation, it is possible to adjust the liquid amount in the third storage tank 301 while control of a flow rate in a membrane is continued. In particular, when high pressure is required during filtration, this configuration is preferable because it is possible to make a flow rate stable immediately after liquid delivery for filtration is resumed and to perform stable constant flow-rate filtration, by maintaining control of the flow rate in the membrane. Further, the liquid level in the third storage tank 301 can be raised by causing the third permeated liquid or the third non-permeated liquid to circulate. Furthermore, by stopping liquid delivery for filtration, clogging of the third separation membrane part 304 can be suppressed, and the third separation membrane part 304 can be used stably for a longer time. Meanwhile, when the liquid level in the third storage tank 301 becomes higher than the upper limit level UL3, it suffices that a supply amount of the second non-permeated liquid from the second membrane filtration unit 200 to the third storage tank 301 is reduced or the supply is stopped.

Further, the second separation membrane part 204 (for example, an NF membrane or an RO membrane) separates sugar and causes it to flow as the second non-permeated liquid to the second liquid delivery pipe L20 and the third storage tank 301. When sugar is concentrated in the second liquid delivery pipe L20, clogging occurs in the second separation membrane part 204 in a short time. In this configuration, it is difficult to operate the filtration device continuously for a long time.

Meanwhile, according to the ninth example, the third membrane filtration unit 300 receives a portion of the second non-permeated liquid and separates sugar again. Thus, not only the second membrane filtration unit 200 but also the third membrane filtration unit 300 separates sugar. Accordingly, it is possible to reduce clogging of the second membrane filtration unit 200 and operate the filtration device continuously for a longer time.

Internal configurations and operations of the third membrane filtration unit 300 may be identical to those of the third membrane filtration unit 300 of the seventh example.

However, when the flow rate (d) of the second non-permeated liquid from the second extraction pipe L24, the flow rate of the third non-permeated liquid extracted from the third extraction pipe L34 (the extraction amount f of the third non-permeated liquid), and the flow rate of the third permeated liquid flowing from the third permeated liquid pipe L32 to outside of the third membrane filtration unit 300 (the amount h of the third permeated liquid) are constant, sugar concentration in the second non-permeated liquid in the third liquid delivery pipe L30 and the third non-permeated liquid pipe L31 is concentrated and then becomes substantially constant. Therefore, although the third non-permeated liquid extracted from the third extraction pipe L34 is concentrated more than the second non-permeated liquid from the second extraction pipe L24, it has a substantially constant sugar concentration. That is, the third non-permeated liquid is a concentrated liquid having a substantially constant sugar concentration and is extracted at a substantially constant flow rate from the third membrane filtration unit 300.

In this manner, the first and second membrane filtration units 100 and 200 have identical configurations to those in the third example. Further, the third membrane filtration unit 300 receives a portion of the second non-permeated liquid from the second membrane filtration unit 200 and supplies the third non-permeated liquid and the third permeated liquid after being separated to outside. Accordingly, both the second and third membrane filtration units 200 and 300 can separate sugar from other components. As a result, the filtration device can increase the purity of sugar from a liquid to be treated.

Further, by setting flow rates to satisfy "the amount to be supplied=the amount to be extracted (d=h+f)", the third membrane filtration unit 300 can stably continue constant flow-rate filtration. Furthermore, by setting flow rates to satisfy "the amount to be supplied=the amount to be extracted (a=b+c, c=d+e)" also in the first and second membrane filtration units 100 and 200, the entire filtration device can stably continue constant flow-rate filtration.

The third membrane filtration unit 300 according to the ninth example may be added to any of the first to eighth examples. Accordingly, effects of the ninth example can be added to the first to eighth examples.

Tenth Example

Figure 21:
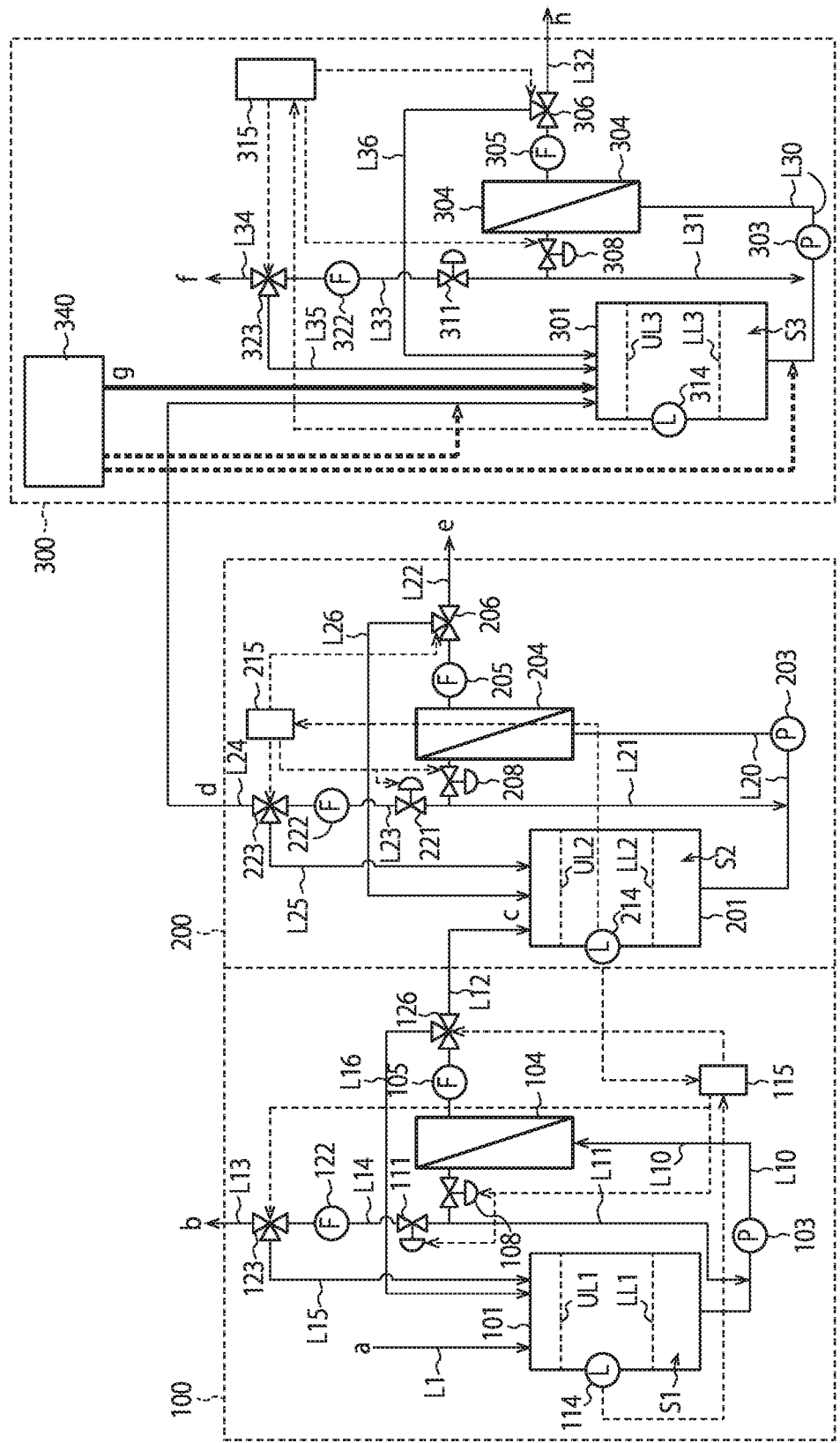
FIG. 21 is a diagram illustrating a configuration of a filtration device according to a tenth example.

FIG. 21 is a diagram illustrating a configuration of a filtration device according to a tenth example. The third membrane filtration unit 300 in the tenth example is different from that in the ninth example in further including the water-adding part 340. The water-adding part 340 as the third water-adding part supplies water to the second non-permeated liquid in the third storage tank 301.

The second and third separation membrane parts 204 and 304 (for example, NF membranes) separate sugar from other components and cause sugar to flow as the first non-permeated liquid to the second and third liquid delivery pipes L20 and L30, respectively. When sugar is concentrated in the second and third liquid delivery pipes L20 and L30, clogging occurs in the second or third separation membrane part 204 or 304 in a short time. In particular, the third storage tank 301 stores therein the second non-permeated liquid from the second membrane filtration unit 200, and therefore the sugar concentration is easily raised. In this configuration, it is difficult to operate the filtration device continuously for a long time.

Meanwhile, the water-adding part 340 adds water to the third storage tank 301 in the tenth example. Accordingly, the fluidity of the stored liquid S3 is increased, and the stored liquid S3 becomes easy to pass through the third separation membrane part 304. The third separation membrane part 304 can separate sugar in the stored liquid S3 from other components continuously for a long time. Accordingly, it is possible to reduce clogging of the third membrane filtration unit 300 and operate the filtration device continuously for a longer time. Further, by performing concentration again after water is added, an effect of separating sugar and other components from each other is enhanced so that the purity of sugar is increased. In particular, providing a water-adding part is effective when sugar is extracted from a liquid to be treated containing much turbidity or components other than sugar (salt, low molecular organic acids or the like), for example, a juice extract of sugarcane or the like, a liquid to be treated of which material is a non-edible resource such as sugarcane bagasse and which has been subjected to chemical treatment, enzymolysis or the like.

Assuming that the amount of water supplied by the water-adding part 340 is g, flow rates are set to satisfy d+g=f+h. Accordingly, the filtration device can continue constant flow-rate filtration stably. Further, it suffices that water is supplied to the stored liquid (the second non-permeated liquid) S3, and the water-adding part 340 may be connected to any of the third storage tank 301, the second extraction pipe L24, the third liquid delivery pipe L30, the non-permeated liquid returning pipe L35, and/or the permeated liquid returning pipe L36. Broken lines in FIG. 21 represent that water is supplied to the second extraction pipe L24 or the third liquid delivery pipe L30.

In this manner, in the filtration device according to the tenth example, not only the amounts of the stored liquids S1 to S3 in the storage tanks 101, 201, and 301 are adjusted based on measurement values of the liquid scales 114, 214, and 314, but also the water-adding part 340 adds water to the stored liquid S3. Accordingly, the filtration device according to the tenth example can continue constant flow-rate filtration more stably for a long time.

Other configurations of the tenth example may be identical to corresponding configurations of the ninth example. Therefore, the tenth example can also obtain effects of the ninth example.

Eleventh Example

Figure 22:
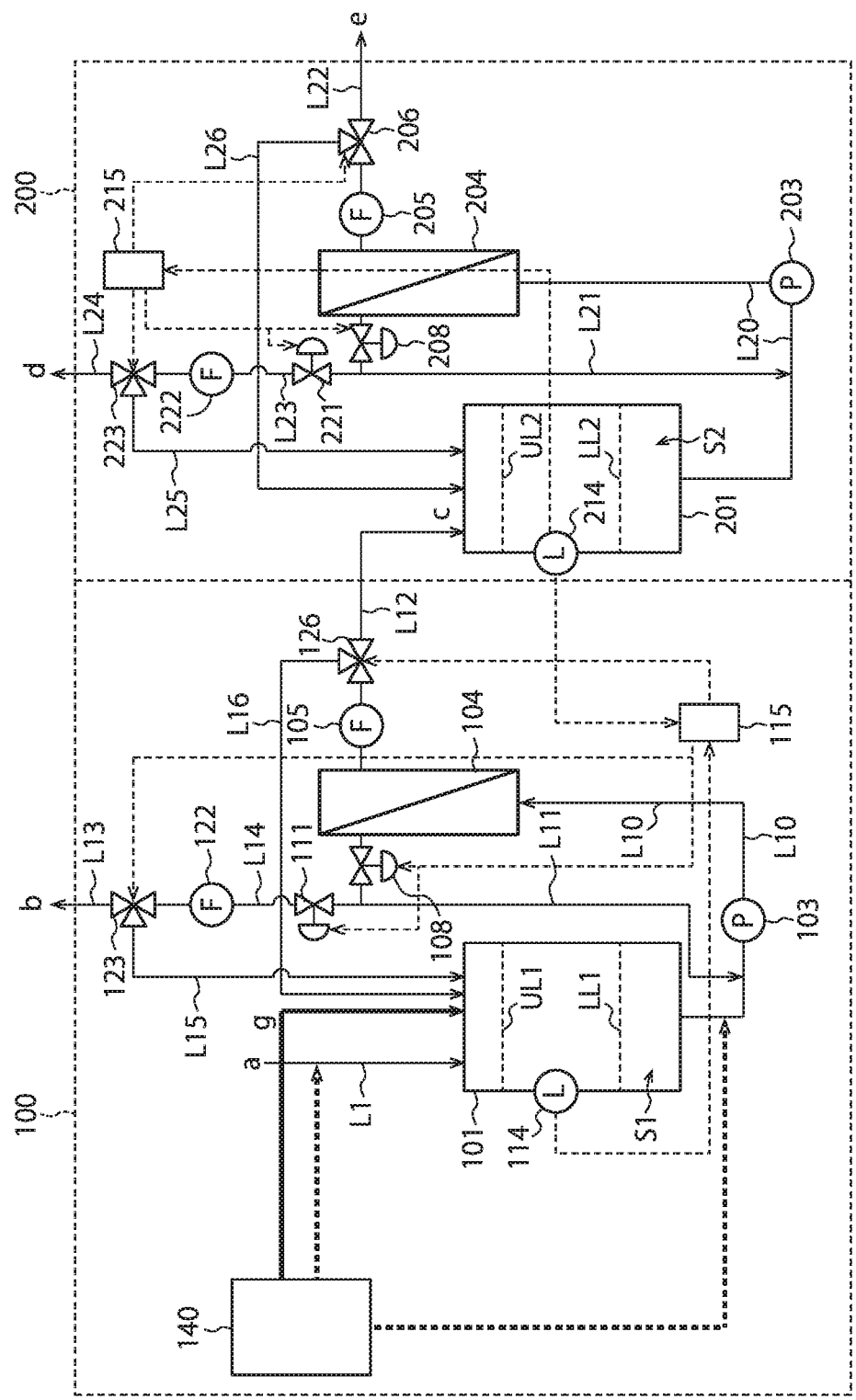
FIG. 22 is a diagram illustrating a configuration of a filtration device according to an eleventh example.

FIG. 22 is a diagram illustrating a configuration of a filtration device according to an eleventh example. The first membrane filtration unit 100 in the eleventh example is different from that in the third example in further including a water-adding part 140. The water-adding part 140 as a first water-adding part supplies water to the stored liquid S1 in the first storage tank 101.

The first separation membrane part 104 (for example, a UF membrane) separates protein from sugar and returns protein to the first liquid delivery pipe L10 as the first non-permeated liquid. When protein is concentrated in the first liquid delivery pipe L10, clogging may occur in the first separation membrane part 104 in a short time. In this configuration, it is difficult to operate the filtration device continuously for a long time.

Meanwhile, the water-adding part 140 adds water to the first storage tank 101 in the eleventh example. Accordingly, the fluidity of the stored liquid S1 is increased, and the stored liquid S1 becomes easy to pass through the first separation membrane part 104. Clogging of the first separation membrane part 104 is reduced so that it is possible to separate protein in the stored liquid S1 continuously for a long time. That is, it is possible to operate the filtration device continuously for a longer time.

Further, assuming that the amount of water supplied by the water-adding part 140 is g, flow rates are set to satisfy a+g=b+c. Accordingly, the filtration device can continue constant flow-rate filtration stably. Further, it suffices that water is supplied to the stored liquid S1, and the water-adding part 140 may be connected to any of the first storage tank 101, the treated liquid pipe L1, the first liquid delivery pipe L10, the non-permeated liquid returning pipe L15, and/or the permeated liquid returning pipe L16. Broken lines in FIG. 22 represent that water is supplied to the treated liquid pipe L1 or the first liquid delivery pipe L10.

In this manner, in the filtration device according to the eleventh example, not only the amounts of the stored liquids S1 and S2 in the storage tanks 101 and 201 are adjusted based on measurement values of the liquid scales 114 and 214, but also the water-adding part 140 adds water to the stored liquid S1. Accordingly, the filtration device according to the eleventh example can continue constant flow-rate filtration more stably for a long time.

Other configurations of the eleventh example may be identical to the corresponding configurations of the third example. Therefore, the eleventh example can also obtain effects of the third example. Further, the water-adding part 140 may be added to any of the first to tenth examples. Accordingly, effects of the eleventh example can be added to the first to tenth examples.

Twelfth Example

Figure 23:
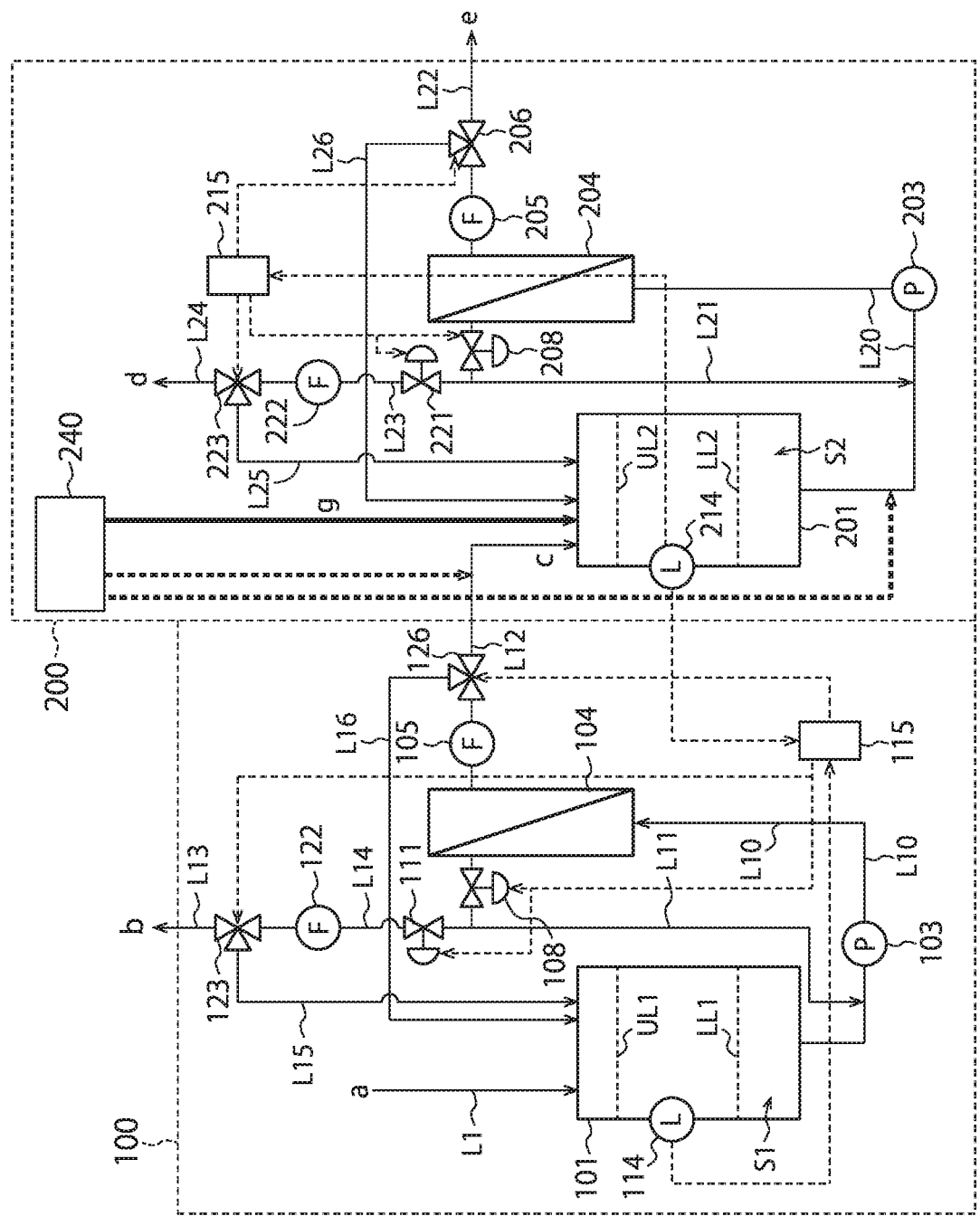
FIG. 23 is a diagram illustrating a configuration of a filtration device according to a twelfth example.

FIG. 23 is a diagram illustrating a configuration of a filtration device according to a twelfth example. The second membrane filtration unit 200 in the twelfth example is different from that in the third example in further including a water-adding part 240. The water-adding part 240 as a second water-adding part supplies water to the stored liquid (the first non-permeated liquid) S2 in the second storage tank 201.

The second separation membrane part 204 (for example, an NF membrane or an RO membrane) separates sugar from other components and returns sugar as the second non-permeated liquid to the second liquid delivery pipe L20. When sugar is concentrated in the second liquid delivery pipe L20, clogging occurs in the second separation membrane part 204 in a short time. In this configuration, it is difficult to operate the filtration device continuously for a long time.

Meanwhile, the water-adding part 240 adds water to the second storage tank 201 in the twelfth example. Accordingly, the fluidity of the stored liquid S2 is increased, and the stored liquid S2 becomes easy to pass through the second separation membrane part 204. As a result, clogging of the second separation membrane part 204 can be reduced so that it is possible to separate sugar in the stored liquid S2 continuously for a long time. That is, it is possible to operate the filtration device continuously for a longer time.

Further, assuming that the amount of water supplied by the water-adding part 240 is g, flow rates are set to satisfy c+g=d+e. Accordingly, the filtration device can continue constant flow-rate filtration stably. Further, it suffices that water is supplied to the stored liquid S2 or the first non-permeated liquid, and the water-adding part 240 may be connected to any of the second storage tank 201, the first permeated liquid pipe L12, the second liquid delivery pipe L20, the non-permeated liquid returning pipe L25, and/or the permeated liquid returning pipe L26. Broken lines in FIG. 23 represent that water is supplied to the first permeated liquid pipe L12 or the second liquid delivery pipe L20.

Other configurations of the twelfth example may be identical to the corresponding configurations of the third example. Therefore, the twelfth example can also obtain the effects of the third example. Further, the water-adding part 240 may be added to any of the first to eleventh examples. Accordingly, effects of the twelfth example can be added to the first to eleventh examples.

Although several examples have been described above, these examples are presented for purposes of illustration only and are not intended to limit the scope of this disclosure. These examples can also be carried out in other various modes, and various types of omissions, replacements, and modifications can be made without departing from the spirit of this disclosure. These examples and modifications thereof are included in the spirit and scope of the disclosure, and are also included as described in the appended claims and equivalents thereof.

The invention claimed is:

1. A filtration device comprising:
a first membrane filtration unit including a first storage tank configured to store therein a liquid to be treated, a first separation membrane part configured to separate the liquid to be treated into a first permeated liquid and a first non-permeated liquid, a first liquid delivery pipe configured to deliver the liquid to be treated from the first storage tank to the first separation membrane part, a first non-permeated liquid pipe configured to return the first non-permeated liquid to either one of the first storage tank or the first liquid delivery pipe, a first permeated liquid pipe configured to cause the first permeated liquid to flow from the first separation membrane part, a first extraction pipe through which a portion of the first non-permeated liquid is extracted from either one of the first liquid delivery pipe or the first non-permeated liquid pipe, a first adjustment unit configured to adjust a flow rate of the first permeated liquid to be substantially constant, and a first liquid scale configured to detect an amount of a stored liquid in the first storage tank;

a second membrane filtration unit including a second storage tank configured to store therein the first permeated liquid from the first permeated liquid pipe of the first membrane filtration unit, a second separation membrane part configured to separate a stored liquid in the second storage tank into a second permeated liquid and a second non-permeated liquid, a second liquid delivery pipe configured to deliver the stored liquid in the second storage tank from the second storage tank to the second separation membrane part, a second non-permeated liquid pipe configured to return the second non-permeated liquid to either one of the second storage tank or the second liquid delivery pipe, a second permeated liquid pipe configured to cause the second permeated liquid to flow from the second separation membrane part, a second extraction pipe through which a portion of the second non-permeated liquid is extracted from the second non-permeated liquid pipe, a second adjustment unit configured to adjust a flow rate of the second permeated liquid to be substantially constant, and a second liquid scale configured to detect an amount of the stored liquid in the second storage tank;

a first controller unit configured to control an amount of a stored liquid stored in the first storage tank based on measurement values from the first and second liquid scales of the first and second membrane filtration units; and a second controller unit configured to control an amount of a stored liquid stored in the second storage tank based on a measurement value from the second liquid scale, wherein based on a subsequent-stage measurement value from the second liquid scale in the second membrane filtration unit, the second controller unit stops a flow of the second permeated liquid of the second membrane filtration unit.

2. The filtration device according to claim 1, wherein, based on a preceding-stage measurement value from the first liquid scale of the first membrane filtration unit and a subsequent-stage measurement value from the second liquid scale in the second membrane filtration unit, the first controller unit stops a flow of the first permeated liquid of the preceding first membrane filtration unit.

3. The filtration device according to claim 2, wherein when the preceding-stage measurement value is smaller than a first threshold or when the subsequent-stage measurement value is larger than a second threshold, the first controller unit is configured to adjust the first adjustment unit of the first membrane filtration unit to stop a flow of the first permeated liquid from the first permeated liquid pipe to the second membrane filtration unit.

4. The filtration device according to claim 2, wherein the first membrane filtration unit further includes a first open/close valve provided in the first permeated liquid pipe, and
when the preceding-stage measurement value is smaller than a first threshold or when the subsequent-stage measurement value is larger than a second threshold, the first controller unit is configured to close the first open/close valve of the first membrane filtration unit to stop a flow of the first permeated liquid from the first permeated liquid pipe to the second membrane filtration unit.

5. The filtration device according to claim 2, wherein the first membrane filtration unit further includes a first permeated liquid returning pipe configured to return the first permeated liquid from the first permeated liquid pipe to the first storage tank, and a first non-permeated liquid returning pipe configured to return the first non-permeated liquid from the first extraction pipe to the first storage tank, and
when the preceding-stage measurement value is smaller than a first threshold or when the subsequent-stage measurement value is larger than a second threshold, the first controller unit is configured to return the first permeated liquid in the first permeated liquid pipe to the first storage tank through the first permeated liquid returning pipe and returns the first non-permeated liquid in the first extraction pipe to the first storage tank through the first non-permeated liquid returning pipe in the first membrane filtration unit.

6. The filtration device according to claim 1, wherein when the subsequent-stage measurement value of the second membrane filtration unit is smaller than a third threshold, the second controller unit is configured to adjust the second adjustment unit of the second membrane filtration unit to stop a flow of the second permeated liquid from the second permeated liquid pipe.

7. The filtration device according to claim 1, further comprising a second open/close valve provided in the second permeated liquid pipe, wherein
when the subsequent-stage measurement value of the second membrane filtration unit is smaller than a third threshold, the second controller unit is configured to close the second open/close valve of the second membrane filtration unit to stop a flow of the second permeated liquid from the second permeated liquid pipe.

8. The filtration device according to claim 1, wherein the second membrane filtration unit further includes a second permeated liquid returning pipe configured to return the second permeated liquid from the second permeated liquid pipe to the second storage tank and a second non-permeated liquid returning pipe configured to return the second non-permeated liquid from the second extraction pipe to the second storage tank, and
when the subsequent-stage measurement value of the second membrane filtration unit is smaller than a third threshold, the second controller unit is configured to return the second permeated liquid in the second permeated liquid pipe to the second storage tank through the second permeated liquid returning pipe, and returns the second non-permeated liquid in the second extraction pipe to the second storage tank through the second non-permeated liquid returning pipe.

9. The filtration device according to claim 1, wherein a pore diameter of a second separation membrane part of the second membrane filtration unit, which is on a downstream side in a flow of the liquid to be treated, is smaller than a pore diameter of a first separation membrane part of the first membrane filtration unit on an upstream side.

10. The filtration device according to claim 1, wherein each of the first and second separation membrane parts is any of a microfiltration membrane, an ultrafiltration membrane, a nanofiltration membrane, and a reverse osmosis membrane.

11. The filtration device according to claim 1, further comprising a cleaning part connected to the first or second permeated liquid pipe and configured to cause a cleaning solution to flow from the first or second permeated liquid pipe to the first or second separation membrane part.

12. The filtration device according to claim 1, wherein the first liquid scale is either one of a liquid level meter that detects a liquid level of a stored liquid in the first storage tank, or a mass measurement device that detects a mass of a stored liquid in the first storage tank, and the second liquid scale is an either one of a liquid level meter that detects a liquid level of a stored liquid in the second storage tank, or a mass measurement device that detects a mass of a stored liquid in the second storage tank.

13. The filtration device according to claim 1, wherein the liquid to be treated contains organic matter.

14. The filtration device according to claim 1, further comprising:

a third membrane filtration unit including a third storage tank configured to store therein the first non-permeated liquid from the first extraction pipe of the first membrane filtration unit, a third separation membrane part configured to separate a stored liquid in the third storage tank into a third permeated liquid and a third non-permeated liquid, a third liquid delivery pipe configured to deliver a stored liquid in the third storage tank from the third storage tank to the third separation membrane part, a third non-permeated liquid pipe configured to return the third non-permeated liquid to either one of the third storage tank or the third liquid delivery pipe, a third permeated liquid pipe configured to deliver the third permeated liquid from the third separation membrane part to the second storage tank of the second membrane filtration unit in a subsequent stage, a third extraction pipe through which a portion of the third non-permeated liquid is extracted, a third adjustment unit configured to adjust a flow rate of the third permeated liquid to be substantially constant, and a third liquid scale configured to detect an amount of the stored liquid in the third storage tank; and a third controller unit configured to control an amount of a stored liquid stored in the third storage tank based on measurement values from a third liquid scale of the third membrane filtration unit and the second liquid scale of the second membrane filtration unit in the subsequent stage.

15. The filtration device according to claim 1, further comprising:

a third membrane filtration unit including a third storage tank configured to store therein the second non-permeated liquid from the second extraction pipe, a third separation membrane part configured to separate a stored liquid in the third storage tank into a third permeated liquid and a third non-permeated liquid, a third liquid delivery pipe configured to deliver a stored liquid in the third storage tank from the third storage tank to the third separation membrane part, a third non-permeated liquid pipe configured to return the third non-permeated liquid to either one of the third storage tank or the third liquid delivery pipe, a third permeated liquid pipe configured to deliver the third permeated liquid from the third separation membrane part, a third extraction pipe through which a portion of the third non-permeated liquid is extracted, a third adjustment unit configured to adjust a flow rate of the third permeated liquid to be substantially constant, and a third liquid scale configured to detect an amount of a stored liquid in the third storage tank; and a third controller unit configured to control an amount of a stored liquid stored in the third storage tank based on a measurement value from the third liquid scale of the third membrane filtration unit.

16. The filtration device according to claim 1, wherein the first membrane filtration unit further includes a first water-adding part configured to add water to the liquid to be treated.

17. The filtration device according to claim 1, wherein the second membrane filtration unit further includes a second water-adding part configured to add water to the first permeated liquid.

18. The filtration device according to claim 14, wherein the third membrane filtration unit further includes a third water-adding part configured to add water to the first or second non-permeated liquid.

19. A filtration device comprising:

a first membrane filtration unit including a first storage tank configured to store therein a liquid to be treated, a first separation membrane part configured to separate the liquid to be treated into a first permeated liquid and a first non-permeated liquid, a first liquid delivery pipe configured to deliver the liquid to be treated from the first storage tank to the first separation membrane part, a first non-permeated liquid pipe configured to return the first non-permeated liquid to either one of the first storage tank or the first liquid delivery pipe, a first permeated liquid pipe configured to cause the first permeated liquid to flow from the first separation membrane part, a first extraction pipe through which a portion of the first non-permeated liquid is extracted from either one of the first liquid delivery pipe or the first non-permeated liquid pipe, a first adjustment unit configured to adjust a flow rate of the first permeated liquid to be substantially constant, and a first liquid scale configured to detect an amount of a stored liquid in the first storage tank;

a second membrane filtration unit including a second storage tank configured to store therein the first permeated liquid from the first permeated liquid pipe of the first membrane filtration unit, a second separation membrane part configured to separate a stored liquid in the second storage tank into a second permeated liquid and a second non-permeated liquid, a second liquid delivery pipe configured to deliver the stored liquid in the second storage tank from the second storage tank to the second separation membrane part, a second non-permeated liquid pipe configured to return the second non-permeated liquid to either one of the second storage tank or the second liquid delivery pipe, a second permeated liquid pipe configured to cause the second permeated liquid to flow from the second separation membrane part, a second extraction pipe through which a portion of the second non-permeated liquid is extracted from the second non-permeated liquid pipe, a second adjustment unit configured to adjust a flow rate of the second permeated liquid to be substantially constant, and a second liquid scale configured to detect an amount of the stored liquid in the second storage tank;

a first controller unit configured to control an amount of a stored liquid stored in the first storage tank based on measurement values from the first and second liquid scales of the first and second membrane filtration units; and a second controller unit configured to control an amount of a stored liquid stored in the second storage tank based on a measurement value from the second liquid scale, wherein based on a preceding-stage measurement value from the first liquid scale of the first membrane filtration unit and a subsequent-stage measurement value from the second liquid scale in the second membrane filtration unit, the first controller unit stops a flow of the first permeated liquid of the first membrane filtration unit.

* * * * *